(12) United States Patent
Miller et al.

(10) Patent No.: US 6,735,604 B2
(45) Date of Patent: May 11, 2004

(54) METHOD FOR STORING AND RETRIEVING DATA OBJECTS

(76) Inventors: Arthur O. Miller, 210 Valley Club Cir., LR, AR (US) 72212; James A. Miller, P.O. Box 68, New Ulm, TX (US) 78950

( * ) Notice: Subject to any disclaimer, the term of this patent is extended or adjusted under 35 U.S.C. 154(b) by 184 days.

(21) Appl. No.: 09/973,659

(22) Filed: Oct. 9, 2001

(65) Prior Publication Data

US 2003/0163473 A1 Aug. 28, 2003

(51) Int. Cl.[7] .............................................. G06F 17/30
(52) U.S. Cl. ...................... 707/201; 707/104.1; 707/203
(58) Field of Search .............................. 707/104.1, 201, 707/203

(56) References Cited

U.S. PATENT DOCUMENTS

| | | | | |
|---|---|---|---|---|
| 5,799,151 A | | 8/1998 | Hoffer | ................... 395/200.34 |
| 5,987,454 A | * | 11/1999 | Hobbs | ........................... 707/4 |
| 6,035,294 A | | 3/2000 | Fish | ............................... 707/2 |
| 6,195,652 B1 | | 2/2001 | Fish | ............................... 707/2 |
| 6,243,699 B1 | | 6/2001 | Fish | ............................... 707/2 |
| 2003/0163473 A1 | * | 8/2003 | Miller et al. | ................ 707/100 |

* cited by examiner

Primary Examiner—Charles Rones
(74) Attorney, Agent, or Firm—Polasek, Quisenberry & Errington, L.L.P.

(57) ABSTRACT

The invention applies the economies of scale to data processing and provides automated methods of collecting, categorizing, indexing, storing and retrieving large amounts of data from a wide variety of sources. The invention discloses the use of location and industry templates to categorize documents and other data objects. Location and industry data for each document is translated into a set of assignment numerals that are used to create a header number. Each document or data object is indexed and stored in a data warehouse in accordance with the header number. Subsequently, documents and data objects are retrieved from the data warehouse using the index of header numbers and the location and industry templates.

25 Claims, 27 Drawing Sheets

Fig. 2

The Location Template

Template Number
L-000000321

| Scan Line: | Column 1<br>Primary Location<br>Nations: | Column 2<br>Secondary Locale<br>States/Provinces: | Column 3<br>Cities within a<br>State or Province | Column 4<br>Specific Locations<br>near cities | Column 5<br>Precise<br>Location | Scan Line: |
|---|---|---|---|---|---|---|
| 1 | Afghanistan 001 | | | | | 1 |
| 2 | Argentina 002 | | | | | 2 |
| 3 | Australia 003 | | | | | 3 |
| 4 | Brazil 004 | | | | | 4 |
| 5 | Bulgaria 005 | | | | | 5 |
| 6 | Canada 006 | | | | | 6 |
| 7 | China 007 | | | | | 7 |
| 8 | France 008 | | | | | 8 |
| 9 | Germany 009 | | | | | 9 |
| 10 | Italy 010 | | | | | 10 |
| 11 | Japan 011 | | | | | 11 |
| 12 | Mexico 012 | | | | | 12 |
| ⋮ | ⋮ | | | | | ⋮ |
| 51 | U. Kingdom 051<br>Great Britain<br>England<br>British Isles<br>Britain<br>The British Isles | | | | | 51 |
| ⋮ | ⋮ | | | | | ⋮ |
| 57 | United States 057<br>US | Alabama 057001<br>Alaska 057002 | Anchorage002001<br>Nome 002002<br>Sitka 002023 | | | 57 |
| ⋮ | ⋮ | ⋮ | ⋮ | | | ⋮ |
| 100 | Venezuela 100 | Kentucky 057017 | ⋮ | | | 100 |
| ⋮ | ⋮ | ⋮ | | | | ⋮ |
| 200 | Yemen 200 | Texas 057043 | Austin 043001<br>Dallas 043002<br>Ft. Worth 043003<br>Houston 043004<br>Lubbock 043005 | Pasadena 04300401 | Pasadena<br>specific<br>location<br>0430040100 | 200 |
| ⋮ | ⋮ | ⋮ | | | | ⋮ |
| 399 | Zaire 399 | ⋮<br>Wyoming 057050 | | | | 399 |

Fig. 3

The Industry Template
(The example shown is for the Agriculture Industry)

| Scan Lines | Column 1<br>Broad Industry Name/Category | Column 1A<br>Secondary names or synonyms for the industry | Column 2<br>The broad category of an industry function | Column 3<br>Industry functions or products | Column 4<br>Specific operations or functions | Column 5<br>The "how-to" of a function or operation | Scan Lines |
|---|---|---|---|---|---|---|---|
| 1 | Agriculture 002 | Farming 00201 | | | | | 1 |
| 2 | | Agronomy 00202 | | | | | 2 |
| 3 | | Husbandry 00203 | | | | | 3 |
| 4 | | Geophonics 00204 | | | | | 4 |
| 5 | | Hydroponics 00205 | | | | | 5 |
| 6 | | Crops 00206 | Wheat 0020601 | | | | 6 |
| 7 | | Cultivation 00207 | Corn 0020602 | | | | 7 |
| 8 | | Harvest 00208 | Beans 0020603 | Soy Beans 002060301 | | | 8 |
| 9 | | Soil 00209 | Tomatoes 0020604 | String Beans 0302 | Planting 002060301 | | 9 |
| 10 | | ... | Okra 0020605 | Butter Beans 0303 | Fertilize 002060302 | | 10 |
| 11 | | Other words that mean Agriculture 00230 | Cotton 0020606 | Navy Beans 0304 | Time 00206030204 | | 11 |
| 12 | | | Rice 0020607 | Lima Beans 0305 | Soil 00206030204 | Preparation 01 | 12 |
| 13 | | | Potatoes 0020608 | Kidney Beans 0306 | Stringing 06030205 | PH Factor 02 | 13 |
| 14 | | | Oats 0020609 | Black Beans 0307 | Packaging 06030206 | Moisture 03 | 14 |
| 15 | | | ... | Coffee Beans 0308 | Marketing 06030207 | Temp. 04 | 15 |
| 16 | | | | Jojoba Beans 0309 | Cooking 06030208 | Composting 05 | 16 |
| 17 | | | | | | Aerating 06 | 17 |
| 18 | | | | ... | ... | Plowing 07 | 18 |
| 19 | | | Zucchini 0020691 | | | Disking 08 | 19 |
| 20 | | | | Every other kind of Beans 0399 | Anything that is done to string beans | | 20 |
| 21 | | | | | | 00206030020401 = Soil prep. to plant string beans in Pasadena, TX. | 21 |
| 22 | | | | | | | 22 |
| 23 | | | | | | | 23 |
| 24 | | | | | | | 24 |
| 25 | | | | | | | 25 |

Fig. 5B  LOCATION AND INDUSTRY KEY WORD STORAGE UNIT (8)

(30) INDUSTRY TEMPLATES ... NUMBER ... NAME ... LANGUAGE

| LANGUAGE | ENGLISH | SPANISH | JAPANESE | GERMAN | CHINESE | FRENCH | PORTUGUESE | ITALIAN | URDU | SCAN LINE NUMBER |
|---|---|---|---|---|---|---|---|---|---|---|
| COLUMN NUMBER | 01 | 02 | 03 | 04 | 05 | 06 | 07 | 08 | "N" | |
| INDUSTRY NAME | | | | INDUSTRY TEMPLATE NUMBERS | | | | | | |
| ACCOUNTING | 001 | | | | | | | | | 001 |
| AGRICULTURE | 002 | | | | | | | | | 002 |
| CONSTRUCTION | 003 | | | | | | | | | 003 |
| INSURANCE | 004 | | | | | | | | | 004 |
| MEDICAL | 005 | | | | | | | | | 005 |
| OIL AND GAS | 006 | | | | | | | | | 006 |
| ... | ... | | | | | | | | | ... |
| TRANSPORTATION | 036 | | | | | | | | | 036 |
| ... | ... | | | | | | | | | ... |
| TAXES - TAX LAW | 049 | | | | | | | | | 049 |
| ... | ... | | | | | | | | | ... |
| ZOOLOGY | 099-999 | | | | | | | | | 099-999 |
| LANGUAGE COL. | 01 | 02 | 03 | 04 | 05 | 06 | 07 | 08 | 09 | SCAN LINE NUMBER |
| SCANLINE NO.s | 001 | 002 | 003 | 004 005 006 | | | 036 | 049 | 9999 | 001 |
| LOCATION NO.s | 003 | 002 | 011 | 009 | 007 | 008 | 004 | 010 | | |
| | 006 | 012 | | | | | | | | |
| | 051 | | | | | | | | | |
| | 057 | | | | | | | | | |

(31)   (30)

FROM FIG. 1 (25)

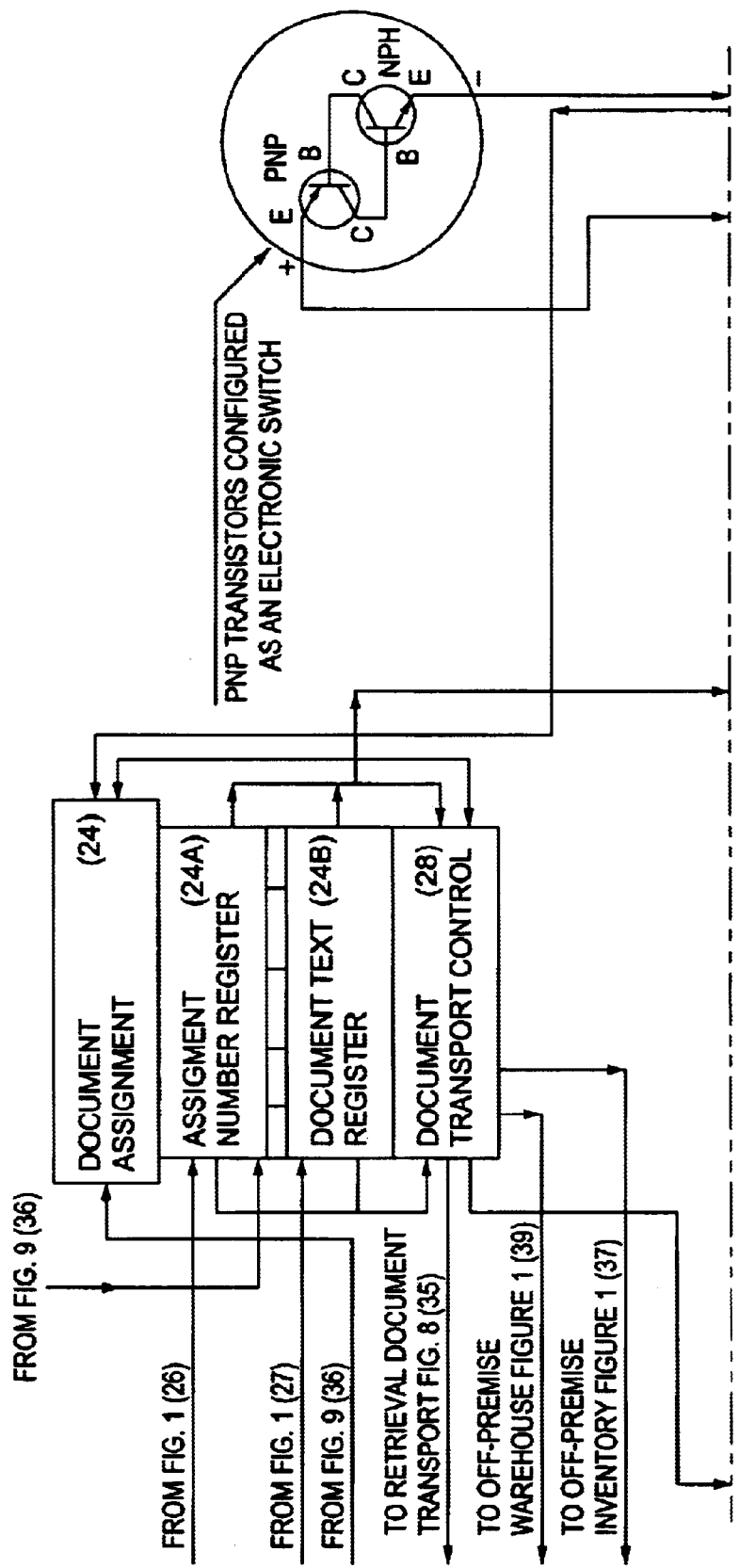

Fig. 7

Supermine™ Data Search Questions

1. Please provide your name or firm name. _____
2. Please provide your Supermine™ Account number. _____
3. Select the Supermine™ service you want:
   - Help from a Supermine™ analyst.     = Level 1 _____
   - Access to direct Supermine™ polling.    = Level 2 _____
   - Direct access into Supermine™ storage.   = Level 3 _____
4. Supermine™ needs to know the Nation _____
   - State or Province _____
   - City _____
   - Community or specific location that applies to your data request _____
5. What is the primary industry or field of knowledge relating to your data request? _____
6. What aspect of this industry are you interested in? _____
7. What specific function or operation within this industry are you interested in? _____
8. What language is the most likely to be used in the documents? _____
9. Please write five words that are specific to, and/or commonly used, within the industry you are interested in.

_____ _____ _____ _____ _____

10. Write one sentence stating what you are looking for. _____

_____

11. Please provide:
    The address to which you want the requested documents sent or downloaded: _____

Fig. 7A

Supermine™ Data Search Questions

1. Please provide your name or firm name.   <u>Mega Company</u>
2. Please provide your Supermine™ Account number.   <u>00321450</u>
3. Select the Supermine™ service you want:
   Help from a Supermine™ analyst.
   Access to direct Supermine™ polling.   _____
   Direct access into Supermine™ storage.   <u>Level 3</u>
4. Supermine™ needs to know the Nation   <u>US</u>
   State or Province   <u>Texas</u>
   City   <u>Houston</u>
   Community or specific location
   that applies to your data request   <u>Pasadena</u>
5. What is the primary industry or field of knowledge
   relating to your data request?   <u>Agriculture</u>
6. What aspect of this industry are you interested in?   <u>Planting a crop</u>
7. What specific function or operation within this
   industry are you interested in?   <u>Planting beans</u>
8. What language is the most likely to be used in the
   documents?   <u>English</u>
9. Please write five words that are specific to, and/or
   commonly used, within the industry you are
   interested in.   <u>String beans</u>
   <u>Snap beans</u>   <u>Pole beans</u>   <u>Soil preparation</u>   <u>Plant time?</u>

10. Write one sentence stating what you are looking for.
    <u>I need information concerning soil preparation and planting time for</u>
    <u>raising a crop of string beans near Pasadena, Texas</u>

11. Please provide:
    The address to which you want the requested documents sent or
    downloaded: _____

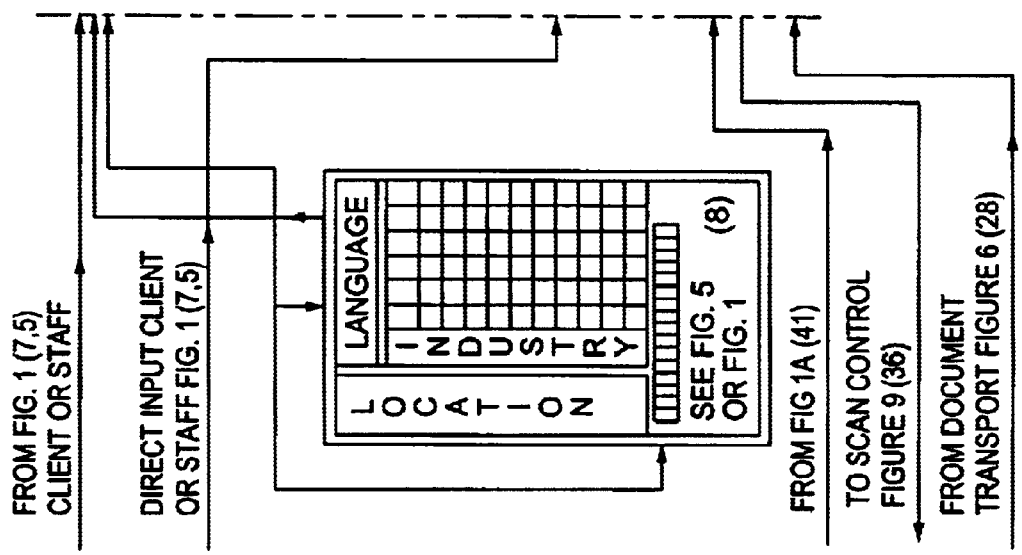

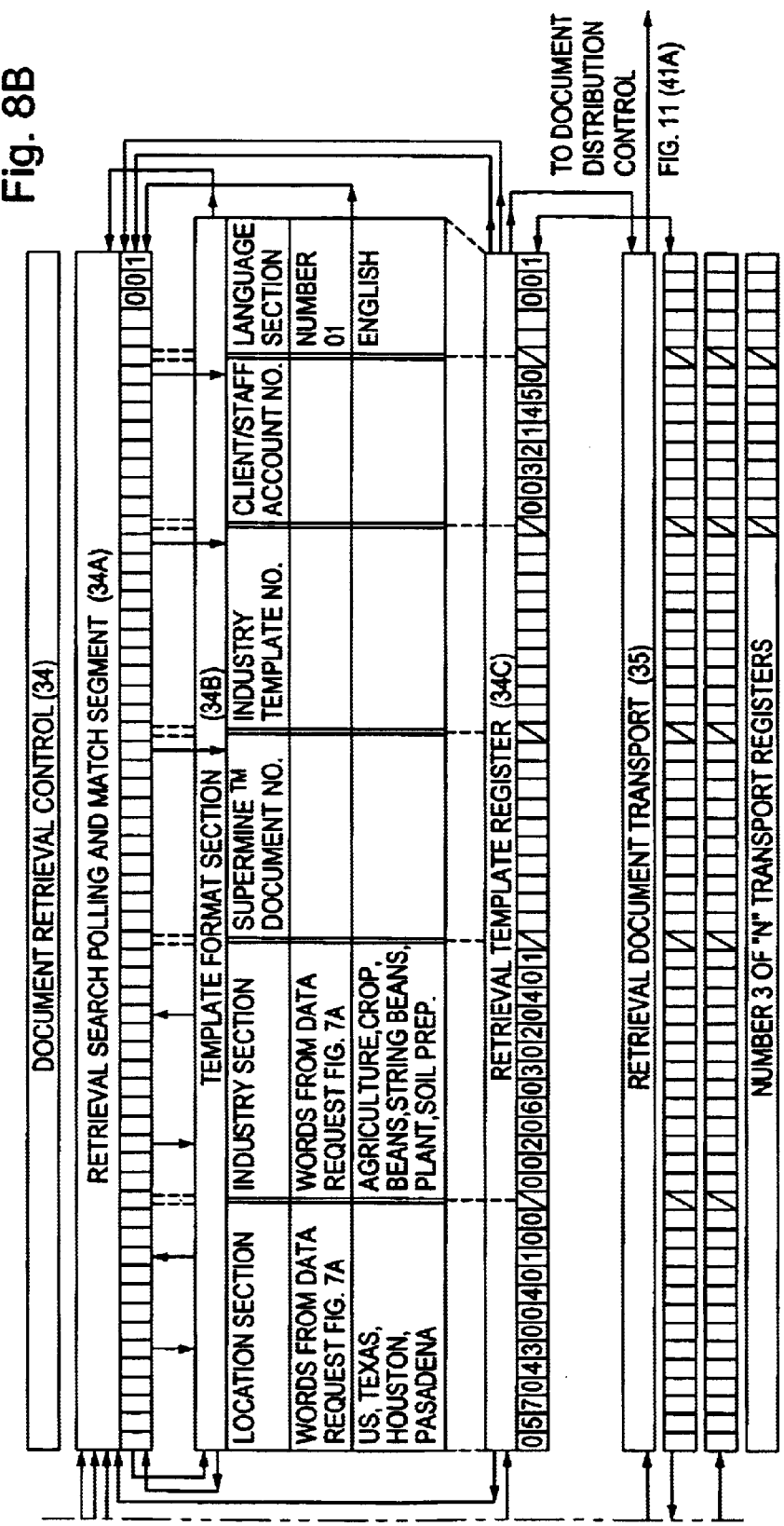

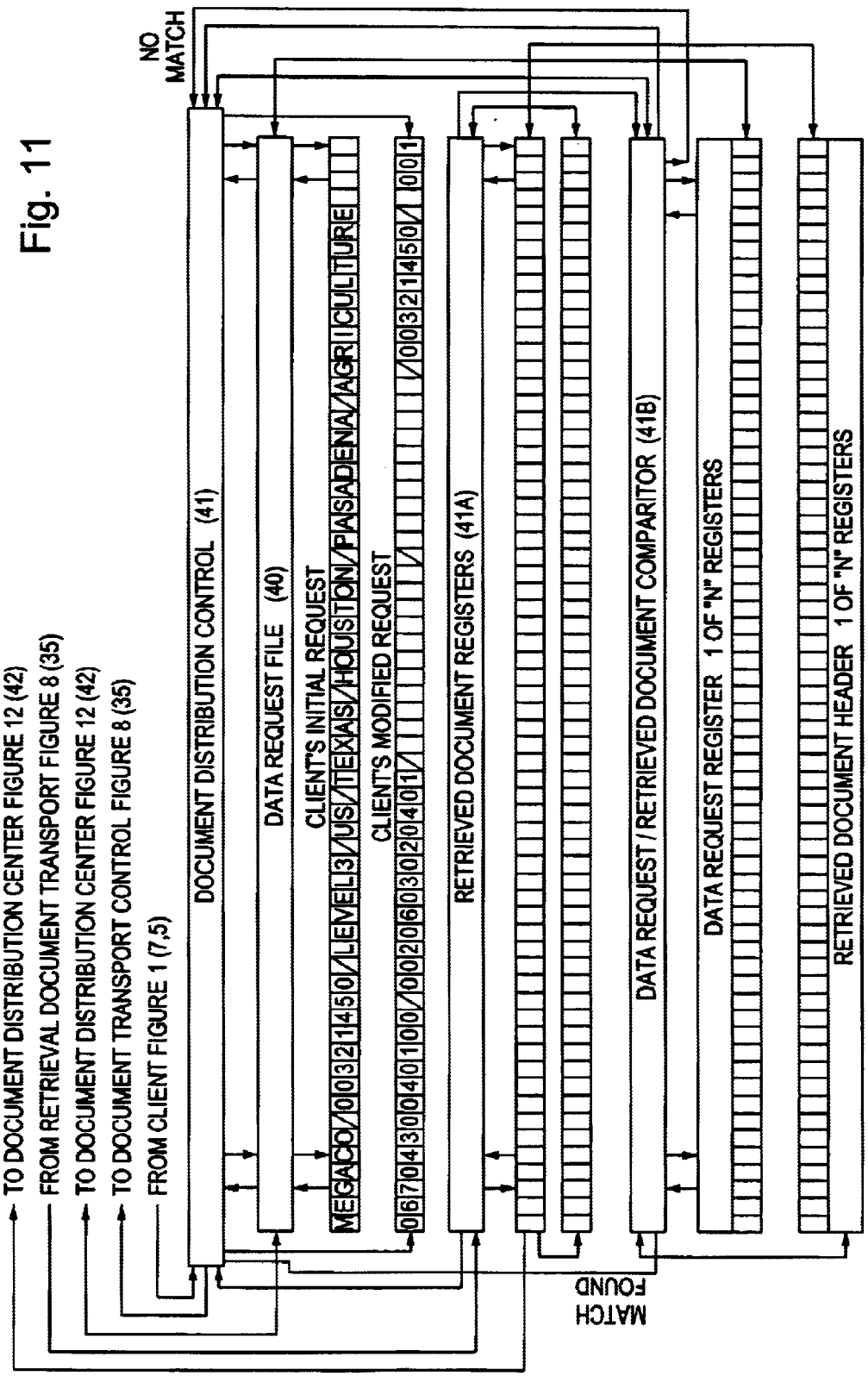

METHOD FOR STORING AND RETRIEVING DATA OBJECTS

BACKGROUND OF THE INVENTION

1. Field of the Invention

The invention relates to data processing including automated methods of collecting, categorizing, indexing, storing and retrieving large amounts of data from widely diverse sources. It includes advances in the art of screening, refining and formatting data and an automated method of storing and retrieving the refined data by location, industry, document number, etc. and getting the retrieved documents to the requesting party.

2. Description of the Related Art

The explosion of knowledge the past twenty years has resulted in thousands of storage devices in diverse locations throughout the world that contain millions of documents in virtually all fields of endeavor. In addition, there are thousands of locations connected to the internet that make available other millions of documents relating to information, intellectual properties, educated opinions, educational material, and similar assets, hereinafter broadly referred to as "Data". The development of economical high-speed computers with high volume storage capacity led to an explosion of the information technology industry. A natural outgrowth of this development was the Internet and Web Sites that linked thousands of databases and made millions of documents available to the Internet and other public data storage and transport systems. Techniques for polling and retrieving data contained in these databases are well known in the industry. In addition, the capability of using Key Words to search through the Internet and other data transport media through various types of search engines such as Web Browser, Yahoo, Google, GoTo, Inktome, Alta-Vista and others is also well known.

Virtually every library, college, research organization, hospital, political entity, weather bureau, large business etc. have locations on the Internet. Most have made large amounts of data available to the public. The net effect is a huge amount of data available in the public domain that covers virtually every phase of human endeavor. Another huge reservoir of data is available from thousands of sources for a fee for access to the database. A third, and largely untapped source is printed matter, professional publications, magazines, libraries etc. The business world has long recognized that information and knowledge is power and has tangible value. We use that power to gain a competitive edge and/or reduce operating costs. The cost of searching, downloading, screening, storing, formatting and making the intelligence available to humans has become very expensive. In addition, the sheer mass of data dictates long hours of downloading, reading and rewriting to sort out what is needed from the extraneous data. For an individual or business trying to gather, store and use information, the mass of data has become overwhelming.

Because of the high cost of collecting, storing and retrieving data, it has a negative value until it is available to humans for intuitive analysis. The following analogy will make this fact clear. Consider a library book, where a human, highly competent in some specific area of knowledge, reduces his knowledge to writing and publishes a book. If no other human knows where the book is, there is no transfer of information and the book is of little value. Eventually it finds its way into a library where it is categorized, indexed by title, subject matter, and author and assigned to a specific aisle, shelf location and shelf position. A person searching for this information may have had to search through many libraries, bookstores, publishing houses, industrial publications and educational institutions before finding what he/she needed. This search grows more expensive and time consuming as the number of databases and volume of information grows exponentially. When the book is located, either electronically or verbally, the library has an organized method of locating the information requested. The applicant is told that the information is stored in aisle xx, cabinet xxx, shelf x, and is given the title name. These activities are expensive and time consuming and therefore have a negative economic value until the applicant is able to use the information contained in the book. The Supermine™ system makes the collection, storage and distribution of data economical and readily available.

In addition to knowledge being power, another axiom of the business world is that time is money. Where there was once a scarcity of information and data there is now a huge glut of material on virtually every subject one can name. When the need arises for a business to obtain facts relating to a specific problem or objective, employees are required to search hundreds of sources and spend hours screening, reading and collating to find the information needed. More hours are needed to assemble the data into usable form. Several days spent in this process may mean the difference between success and failure.

A need has thus developed for a system of economically utilizing the vast amount of intelligence and knowledge that exists worldwide. This need entails a means of gathering the data in mass amounts, screening, filtering, categorizing, indexing and storing it with minimal human intervention. In addition, a means of making the data available by location, type information, industry application, and by the level of detail requested by humans is needed. Further, the data must be made readily available to people from widely diverse locations using different languages, and it must be done without time consuming clerical operations. That capability does not exist in industry today.

The agriculture industry is used in this disclosure to provide a simplistic explanation of the design and flexibility of the Supermine™ system. However, a comprehensive world-wide system could be built by coordinating the Supermine™ system as described in this disclosure with the developing Satellite Global Positioning System. By using the concepts taught in this disclosure, the Mercator Projection Charts could be used as the basis for constructing Supermine™ system Location Templates using Latitude and Longitude data from the Global Positioning System to describe precise locations instead of the names of Nations, States and Cities. This system provides a virtually unlimited potential for collecting, classifying, indexing, storing and retrieving data that can be efficiently associated with precise locations. This disclosure teaches methods of associating any industrial data with any of these precise locations. The methods of accomplishing this and the unique flexibility of the Supermine™ System is described and demonstrated in the disclosure. The present invention discloses a system that solves many of the problems inherent in the present state of the art.

SUMMARY OF THE INVENTION

In one embodiment, the present invention provides a method of storing data objects in a data warehouse including receiving a data object, identifying a geographic location to which the data object is related, associating a numeric representation with the geographic location, identifying an industry to which the data object is related, associating a numeric representation with the industry and indexing the data object in the data warehouse based on a header number, wherein the header number includes the numeric representations of the geographic location and industry. One feature of this embodiment may be providing a location template having a plurality of columns, the columns corresponding to nations, states and cities. Further, the embodiment may include searching the data object for a term stored in a column of the location template, the term representing a specific nation, state, or city. Another feature of this embodiment may be providing an industry template having a plurality of columns, the columns corresponding to industry names and industry functions. Yet another feature may be searching the data object for a term stored in a column of the industry template, the term representing a specific industry name or industry function. Still another feature may be storing the numeric representations of the geographic location and the industry in specific slots in a register designated for the header number. Other features of this embodiment include providing location templates associated with different languages and providing industry templates associated with different languages. This embodiment has other features, such as the header number including a unique document number or a numeric representation of a date on which the data object was received. The next feature may be storing the data object in a location of the data warehouse that is associated with the header number.

In a second embodiment, the invention discloses a method of retrieving a data object stored in a data warehouse including receiving a request for the data object that is stored in the data warehouse, parsing the request to identify a geographic location to which the data object is related, associating a numeric representation with the geographic location, parsing the request to identify an industry to which the data object is related, associating a numeric representation with the industry, generating a header number that includes the numeric representations of the geographic location and the industry, searching a header number index of the data warehouse for the header number, identifying the data object based on the header number, and retrieving the data object from the data warehouse. One feature of this embodiment may be providing a location template having a plurality of columns, the columns corresponding to nations, states and cities and searching the request for a term stored in a column of the location template, the term representing a specific nation, state or city. A second feature may be providing location templates associated with different languages and searching the request by utilizing a location template associated with a specific language identified in the request. Another feature may be providing an industry template having a plurality of columns, the columns corresponding to industry names and industry functions and searching the request for a term stored in a column of the industry template, the term representing a specific industry name or industry function. Yet another feature of this embodiment may be providing industry templates associated with different languages and searching the request by utilizing an industry template associated with a specific language identified in the request. This embodiment may also include the feature of searching the request for a first matching term in a first list of terms, associating a first numeric representation with the first matching term, and searching the request for a second matching term in a second list of terms, wherein the searching for the second matching term is limited to a subset of terms, the subset of the second list of terms being associated with the first matching term. The next feature may include the first list of terms comprising a column corresponding to nations in a location template, and the second list of terms comprising a column corresponding to cities in a location template; or the first list of terms comprises a column corresponding to industry names in an industry template, and the second list of terms comprises a column corresponding to industry functions in an industry template. This embodiment may also include a feature wherein the header number further includes a unique document number or a numeric representation of a date on which the data object was received. The next feature of this embodiment may be retrieving the data object from a location of the data warehouse that is associated with the header number.

In a third embodiment, the invention discloses a computer system comprising a microprocessor, a storage device coupled to the microprocessor, the storage device adapted to store software routines, and a software routine stored on the storage device to be executed by the microprocessor, wherein the software routine comprises instructions to perform a method of storing data objects in a data warehouse. Said method comprises, receiving a data object, identifying a geographic location to which the data object is related, associating a numeric representation with the geographic location, identifying an industry to which the data object is related, associating a numeric representation with the industry, and indexing the data object in the data warehouse based on a header number, the header number including the numeric representations of the geographic location and the industry.

In a fourth embodiment, the invention provides a computer system comprising a microprocessor, a storage device coupled to the microprocessor, the storage device adapted to store software routines, and a software routine stored on the storage device to be executed by the microprocessor, wherein the software routine comprises instructions to perform a method of retrieving a data object stored in a data warehouse. Said method comprises receiving a request for the data object that is stored in the data warehouse, parsing the request to identify a geographic location to which the data object is related, associating a numeric representation with the geographic location, parsing the request to identify an industry to which the data object is related, associating a numeric representation with the industry, generating a header number that includes the numeric representations of the geographic location and the industry, searching a header number index of the data warehouse for the header number, identifying the data object based on the header number, and retrieving the data object from the data warehouse.

In another embodiment, the invention discloses a storage device readable by a machine, tangibly embodying a program of instructions executable by the machine to perform a method of storing data objects in a data warehouse, said method comprising receiving a data object, identifying a geographic location to which the data object is related, associating a numeric representation with the geographic location, identifying an industry to which the data object is related, associating a numeric representation with the industry, and indexing the data object in the data warehouse based on a header number, the header number including the numeric representations of the geographic location and the industry.

In still another embodiment, the invention provides a storage device readable by a machine, tangibly embodying a program of instructions executable by the machine to perform a method of retrieving a data object stored in a data warehouse, said method comprising receiving a request for the data object that is stored in the data warehouse, parsing the request to identify a geographic location to which the data object is related, associating a numeric representation with the geographic location, parsing the request to identify an industry to which the data object is related, associating a numeric representation with the industry, generating a header number that includes the numeric representations of the geographic location and the industry, searching a header number index of the data warehouse for the header number, identifying the data object based on the header number, and retrieving the data object from the data warehouse.

In yet another embodiment, the invention discloses a method of operating an electronic switch including receiving a plurality of data objects, storing the data objects in a plurality of data comparitors, receiving a first signal indicating that all of the comparitors are busy, receiving an additional data object, providing a holding area for data objects, storing the additional data object in the holding area, receiving a second signal indicating that a comparitor is free, and storing the additional data object in the comparitor.

An objective of Supermine™ is to have the capability of collecting seemingly unrelated data objects, such as documents, in wholesale amounts, categorize the data objects by geographic location, industry, and fields of study or specific functions and make them economically available as needed. Another objective of the disclosed invention is that the received data objects be categorized, screened to eliminate extraneous and duplicated data and indexed to enable rapid storage and retrieval. A further objective of the disclosed invention is that the retrieval mechanisms enable Industry Analysts, Supermine™ staff and qualified clients to easily extract data objects or documents containing data indexed by location, language, industry, function, or field of study with little intervention by humans. These objectives are accomplished via the following series of operations exclusive to Supermine™. These and many other objectives and advantages of the present invention will be apparent from the claims and from the detailed description presented below in connection with the accompanying drawings.

DESCRIPTION OF THE DRAWINGS

FIGS. 1A-1 to 1A-3 show a block diagram showing how the Supermine™ System reacts to a client's request for data, retrieves stored documents from the Supermine™ Storage Warehouse and delivers them to clients, Supermine™ staff and analysts in accordance with an embodiment of the invention.

FIG. 2 is a table depicting an illustrative Location Template in accordance with an embodiment of the invention.

FIG. 3 is a table depicting an illustrative Industry Template in accordance with an embodiment of the invention.

FIGS. 5A–5B show a table depicting a Location and Industry Key Word Template Storage Unit in accordance with an embodiment of the invention.

FIGS. 6A–6B show a block diagram showing a method of moving a newly acquired document into an assigned location and industry warehouse storage position in accordance with an embodiment of the invention.

FIG. 7 is an illustrative data search questionnaire in accordance with an embodiment of the invention.

FIG. 7A is an illustrative data search questionnaire, including answers, in accordance with an embodiment of the invention.

FIGS. 8A–8B show a table depicting an illustrative Document Retrieval Control Unit in accordance with an embodiment of the invention.

FIG. 11 is a block diagram showing an illustrative Supermine™ Document Distribution Control in accordance with an embodiment of the invention.

DETAILED DESCRIPTION OF THE INVENTION

Figure 1A:
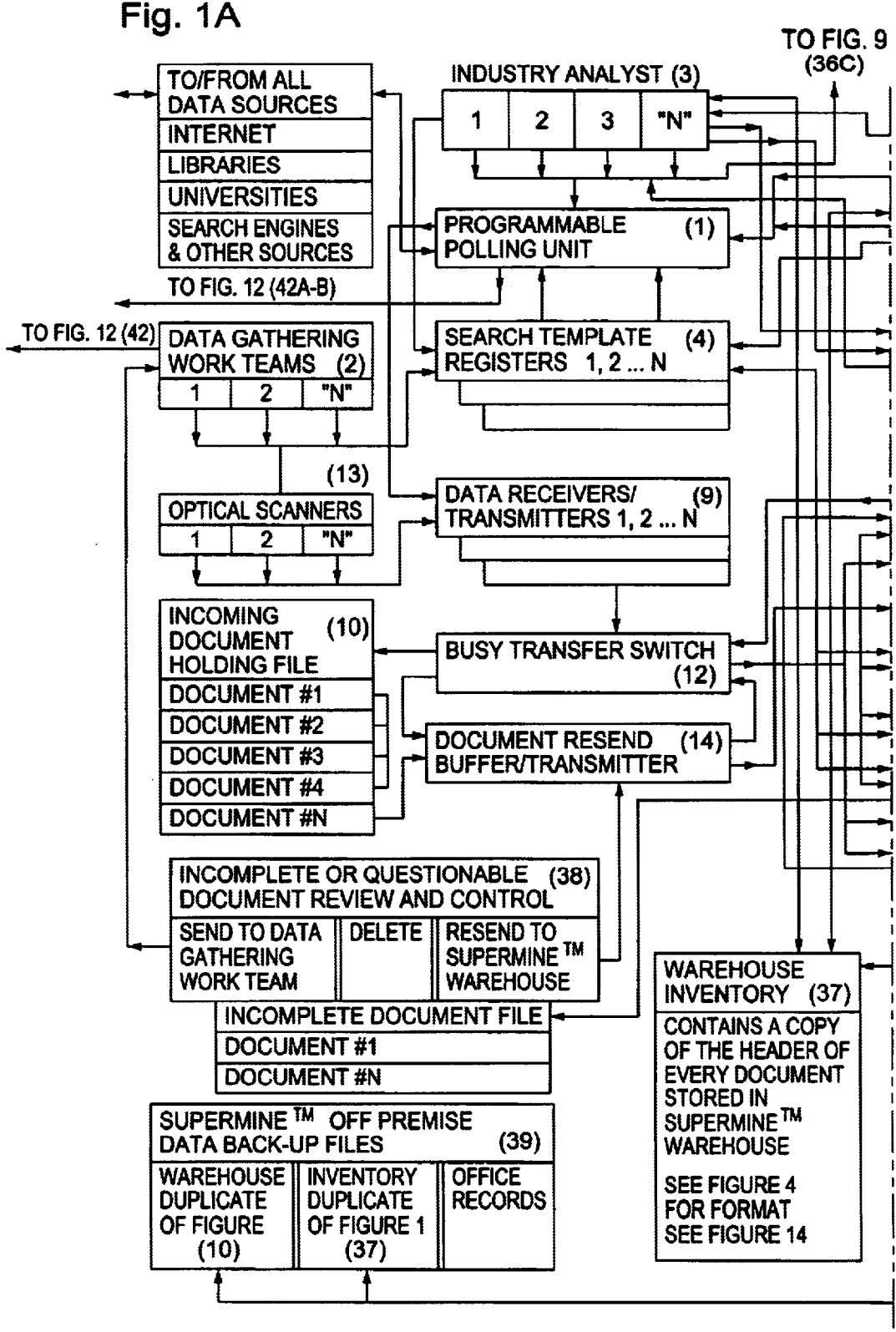
FIGS. 1A–1C show a block diagram of the Supermine™ system showing the data acquisition components and the data flow through the system in accordance with an embodiment of the invention.

The present invention provides a method of applying the economics of scale to the information technology and data fields just as the economies of scale and volume are utilized in other industries such as manufacturing, sales or transportation. It teaches a method of electronically capturing, cataloging, indexing, storing, formatting and retrieving large volumes of raw data from thousands of diverse sources and locations with little need for human intervention. The invention accomplishes this by providing a unique means of electronically "reading" a document incoming from a semi-automated polling unit and gathering enough information to determine the document source, subject matter and language. These data are electronically translated into a set of assignment numerals to place documents in a data storage warehouse or direct them to an industry analyst or client as desired.

Each Supermine™ warehouse storage location contains stored data relating to a particular Nation, State or Province, City and specific locations in that city as desired. Each nation storage location contains the assignment methodology and storage capacity to store and retrieve data concerning up to 999 different industries within a State within that Nation, i.e. the oil and gas industries, telecommunications, timber, pharmaceuticals, manufacturing, transportation, trucking, hospitalization, medical, agriculture, construction, accounting/bookkeeping and similar endeavors. The individual storage positions for each industry within the warehouse are capable of storing vast amounts of data in a manner enabling rapid and economical retrieval. This is made possible by a unique digitally indexed template that serves as a "warehouse-loading scheme" and, in conjunction with other components, provides a menu of available documents and where they are located within the storage warehouse. The templates also provide a means of searching through other storage locations for data that may relate to information in other fields.

Block Diagram Description of the Supermine™ System

A preferred embodiment of the method and system of the present invention is set out below. It should be understood that many of the sensing, timing, copying, deleting, document moving and control functions are done in software. Sufficient schematics of significant components, bit registers, buffers, look-up tables and gating circuits are shown in the drawings to enable understanding the concepts, configuration and operation of the Supermine™ system. FIGS. 1A–1C and 1A–1 to 1A–3 comprise block diagrams of a system enabling the application of the economics of scale to the information technology industry. The Supermine™ mass data gathering process begins with a semi-automatic polling unit (1) that responds to commands from a data gathering team (2) and from any of a multiplicity of Industrial Analysts (3) who are experts in different industry disciplines.

Each Supermine™ analyst or staff member has two methods of accessing and activating the programmable polling unit (1). The first method is used to search for a document known to relate to a specific location. This is done by way of the direct connection from the analyst (3) to the polling unit (1). The second method is used when the analyst needs new data from a particular location within a Nation, State or City relative to a specific industry or field of study that is not already contained in the Supermine™ data warehouse. The analyst selects the template needed from the Location and Industry Word Template Storage, FIGS. 1A–1C, (8) or FIGS. 5A–5B, and copies it into one of a multiplicity of Search Template Registers (4) that serve the polling unit (1). The analyst can then direct the polling unit (1) to search for documents relating to the data on that template. In addition, clients who have purchased access and have been issued proprietary passwords and routing codes can access Supermine from remote locations. The Routing Code Screening Unit (5) controls the level of access to Supermine™. A series of Incoming Protocol Converters (6) are provided for customers using different computer protocols and machine languages. These converters have an incoming section and an outgoing section to prevent transmission delays. When a customer makes an initial request for data, the Incoming Protocol Converter (6) recognizes the protocol used and converts it into the machine language used by Supermine™. The incoming request is routed to a Security and Screening Unit (7) that returns a query menu, FIG. 7, to the customer that, when answered, (See FIG. 7A) confirms the client's identity, location, the level of access the customer has purchased, the address where the data is to be returned and the preferred language. When the security, billing and the data request have been satisfied, the customer is routed to another security gate requiring Daily Passwords and Routing Codes (5).

When the customer satisfies these security measures he has four options depending on the level of access to Supermine he has purchased. First, he can choose to speak to an individual Industry Analyst (FIGS. 1A–1C, (3)) for data gathering information and assistance in polling the world's Internet and other sources to locate the specific data needed. Alternatively, he may directly activate the polling unit FIGS. 1A–1C, (1) to search the Internet for the data by inputting his answers to the Data Search Questionnaire (FIG. 7A) directly into the Search Template register (4) of the programmable polling unit (1). Otherwise, he can use a template provided by Supermine™ that is specific to his data request and input it directly into the Document Retrieval Control Unit, FIGS. 8A–8B (34), to search through Supermine™ for the data needed. Finally, he can complete the Supermine™ menu questionnaire and copy it into the Document Retrieval Control Unit, FIGS. 8A–8B (34), to retrieve documents directly from the Supermine™ warehouse.

Figure 1B:
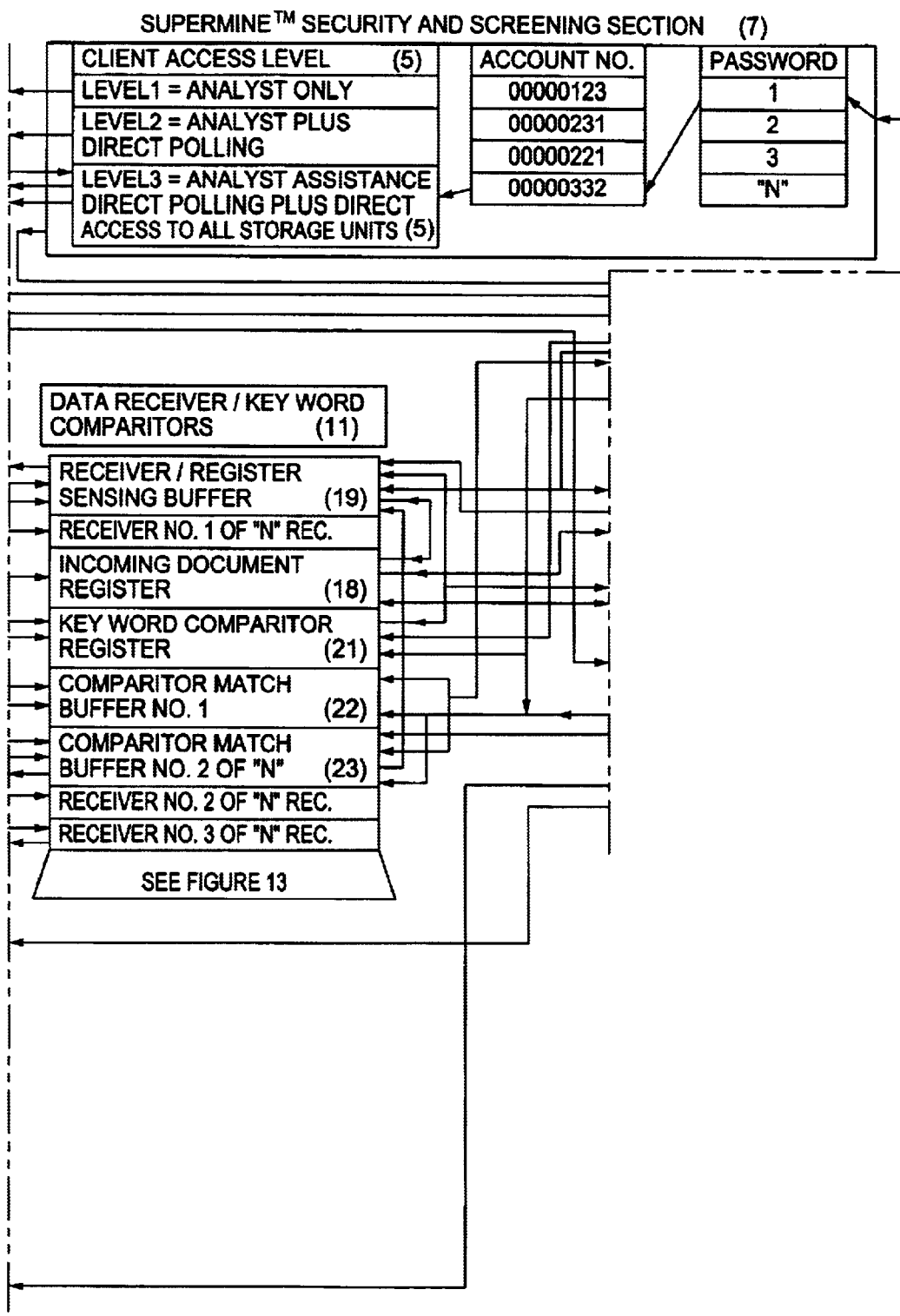
Figure 1C:
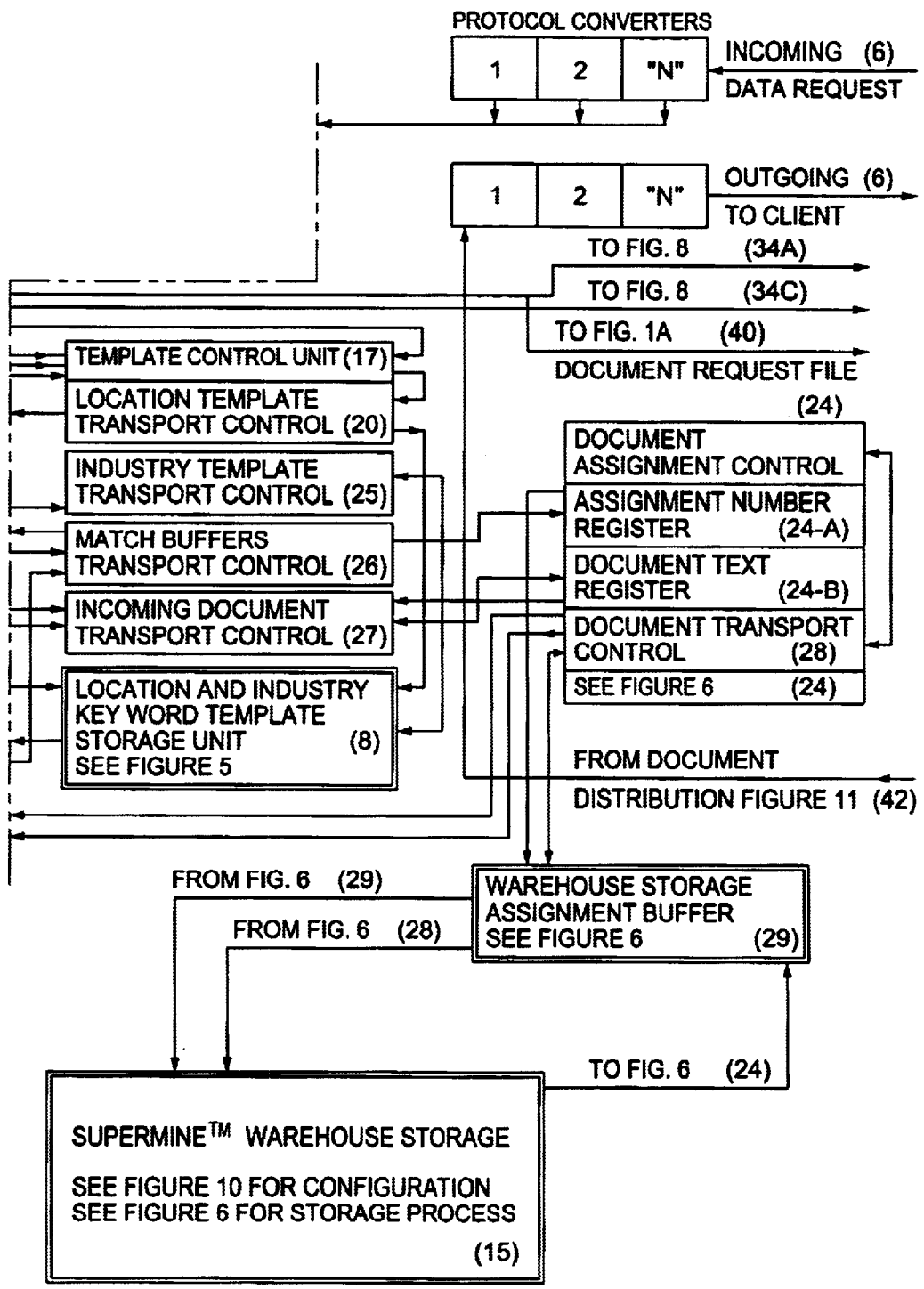

Referring to FIGS. 1A–1C, Data received as a result of polling the Internet and other sources is not presented to a hard copy printer or to a human as is done in the present state of the art. Instead, the incoming raw data is presented to one of a multiplicity of Data Receiving/Transmitters, (9) that temporarily accept the incoming documents, assigns a unique Supermine™ number and the date received. These identifying data are the beginning of a "header" that will stay with the document as long as it remains in Supermine™. The Data Receiver/Transmitter (9) then transmits the data into one of two parallel paths. This "splitting" process is controlled by a Busy Transfer Switch, (12) that directs the incoming data into a Data Reader/Key Word Comparitor, (11), FIGS. 13A–13C, or into the Incoming Document Holding File, (10) depending on the dynamic data load presented to the Data Reader/Key Word Comparitor, (11).

Another source of data that will reside in Supermine™ comes from printed matter, news articles, publications from Universities and Medical Schools, Trade Publications etc. A number of high speed Optical Scanners (13) have been provided to provide efficient inclusion of these data into Supermine™. The output of the optical scanners is electronically presented to the Data Receiver/transmitters (9), and other components, in digital format and is processed the same as data from other sources. This substitute method is used for hard-copy documents, news and industry journal articles that are to be stored in Supermine™.

The disclosed system is designed to poll, receive, index, store and retrieve huge volumes of data from multiple sources throughout the world. The system design is to provide Data Receiving/Transmitters (9) and other components in sufficient multiples to continually accept and disburse data from and to all sources without delays. As previously mentioned, the incoming document is assigned a "header" and transmitted to the Data Receiver/Key word Comparitor (11), or FIGS. 13A–13C. There the document is "read" electronically and, as the reading progresses, each word is compared with the key words of templates that have been inserted into the comparitor. Since the holding time per document varies as to the number of words in the document, there is a possibility that the Data Receiver/Key Word Comparitors (11) may become overloaded. To solve that problem, a Busy Transfer Switch (12) is provided.

The operation of the Busy Transfer Switch (12) is as follows. When the last available Data Receiver/Key Word Comparitor (11) is seized for an incoming document, a signal is sent to the Receiver Busy Sensing Buffer (19) which sends a command to the Busy Transfer Switch (12) to switch the next incoming document to the Incoming Document Holding File (10) where it is stored in the order assigned by the Data Receiver/Transmitter (9). The Incoming Document Holding File (10) is designed to automatically move the lowest numbered document in its file to the Document Resend Buffer Transmitter (14). A signal is sent to the Busy Transfer Switch FIGS. 1A–1C (12) when an idle receiver is detected by the Receiver/Register Sensing Buffer FIGS. 1A–1C (19). This switch is programmed to "look" into the Document Resend Buffer/Transmitter (14) and trigger it to send any document in the buffer to the input of the next available Receiver/Comparitor (11) for further processing.

At this point all incoming data presented to the Data Receiver/Transmitters (9) continue to be sent to the incoming Data Document Holding File (10) in the manner previously described as long as there is a document held in the Document/Resend Buffer Transmitter (14). When the last document stored in the Document/Resend Buffer Transmitter (14) has been sent to the Data Receiver/Key Word Comparitor (11) thus indicating that the Incoming document Holding File (10) is empty, the Document Resend Buffer/Transmitter (14) sends a command to the Busy Transfer Switch (12) to again open the path from the Internet or Optical Scanners (13) directly into the Data Reader/Key Word Comparitors (11). This condition remains in effect until the last available Data Receiver/Key Word Comparitor (11) is seized and the process just described is repeated. The above-described sequence provides a means of maintaining continuous data acquisition and serves as a "Traffic Cop" to assure that no data is lost because of overloaded Data Receiver/Key Word Comparitors (11). This completes the explanation of how data are received from the Internet or the Scanners (13) and sent to the Data Receiver/Key Word Comparitors (11), or FIGS. 13A–13C.

Figures 1, 1A:
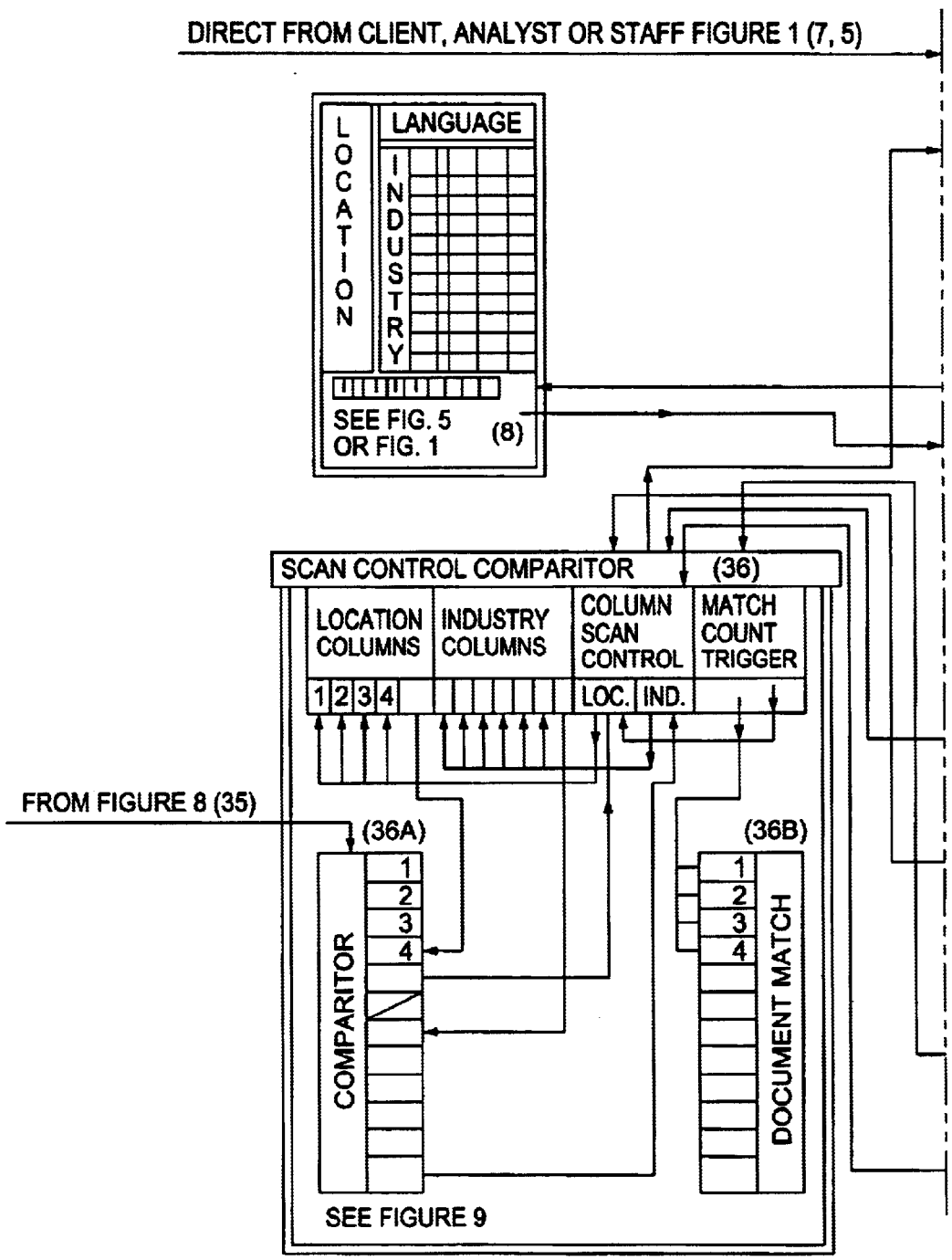

The process of electronically reading incoming documents presented to the Data Reader/Key Word Comparitor (11), or FIGS. 13A–13C, will now be described. Referring to FIG. 1, the Data Receiver/Transmitter (9) receives the incoming document from the polling unit (1) or from the Optical Scanners (13) where a unique Supermine™ document number and the date received is recorded as a "header" for the document. These data are put into the header in a specific order that is standard for all Supermine™ registers, operations and functions. The Receiver/Key Word Comparitor register (21), a component of the Data Receiver/Key Word Comparitor (11), is programmed to read this header that will become a permanent part of the document. At this point in the process, the particular industry template that will "match" the incoming document is unknown. For that reason, the industry template number is not added to the header until document selection is complete.

Figures 1, 1A, 2:
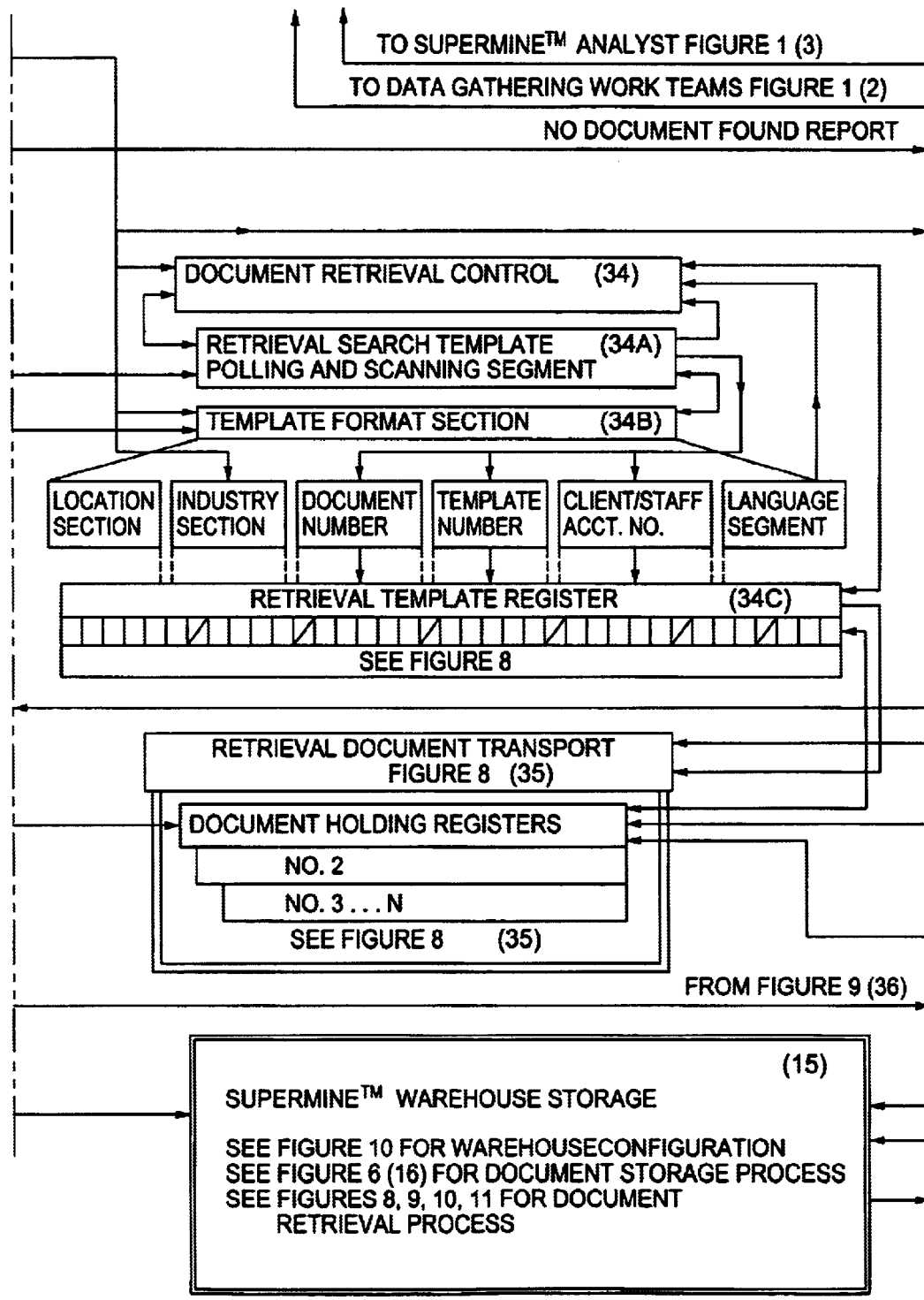
Figures 1, 1A, 2, 3:
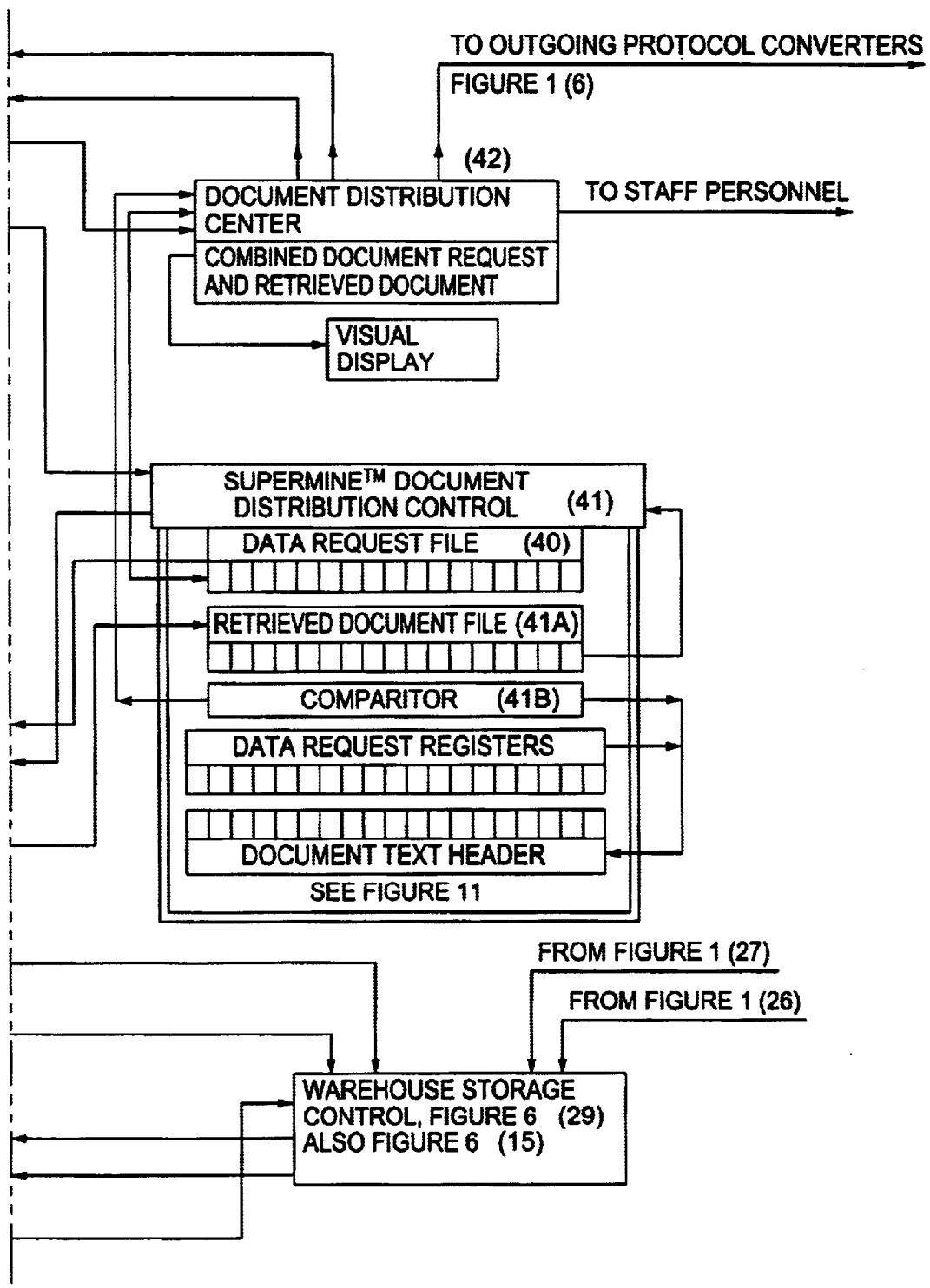

The process of segregating incoming documents by location begins with the use of the location templates, shown in FIG. 2. In like manner the process of identifying documents by language, industry, fields of interest within the industry, and also by functions, operations or other details begins with the Industry Templates Figure (3). Referring to FIGS. 2 and 3, as each Location and Industry Template is constructed by the Analyst, (3), it is copied into the Location and Industry Word Template Storage Unit, FIGS. 1A–1C (8), or FIG. 5 in the proper language column by commanding the Template Control Unit (17) to save the templates into the column for the language used in the template. The Template Control Unit (17), in conjunction with the various components of the Data Receiver/Key Word Comparitor (11), enables Supermine™ to associate any Location Template, FIG. 2, with any Industry Template, FIG. 3. Further, the design of the Location and Industry Key Word Template Storage Unit (8) makes it possible to associate any location template with any industry template in the language most commonly used at the location that was detected by electronically "reading" the document.

Referring to FIGS. 1A–1C the Data Receiver/Key Word Comparitor (11) receives the incoming document as previously described. The comparitor section of the Data Receiver/Key Word Comparitor (11) is comprised of a Receiver/Incoming Document register (18) that accepts the incoming document, and a Receiver/Key Word Comparitor register (21) that contains the template with the key words that are "matched" against words in the incoming document to determine subject and origin of the incoming document. Also included in the Data Receiver/Key Word Comparitor (11) are Comparitor Match Buffers (22, 23-"n"). Comparitor Match Buffers 22 and 23 are "paired" registers that store the numerals that correspond to the matching words found by the Receiver/Key Word Comparitor (21). The purpose for paired buffers is to prevent storing partial documents or those referring to duplicate industry functions. It also solves the problem of different locations having the same names, i.e. Pasadena, Tex. and Pasadena, Calif. The Buffers are configured to accept the primary matching words in the first buffer, number 22, with all extraneous matching words going into buffer number (23). Buffers 24 and 25 are paired as are buffers 26 and 27 etc. These registers are integral parts of the Data Receiver/Key Word Comparitor (11) and are provided in sufficient multiples to process all incoming documents without delay. Primary matching words are defined as those having the proper relationship with the template column and template scan line where the matching word was detected.

When document "reading" is complete, the content of buffer number (22) is sent to Supermine™ storage. The content of buffer (23) is sent to the Document Review file FIGS. 1A–1C, (38) where it is reviewed by the Data Gathering Work Teams FIGS. 1A–1C (2) and either made acceptable for storage or deleted. A Template Control Unit (17) is designed to receive signals from the Data Receiver/Key Word Comparitor (11) and respond by copying and transporting templates and documents between various Supermine™ components. It serves both types of templates with the same register equipment. This begins with copying the location template from the template storage unit (8) into the Receiver/Key Word Comparitor Register (21), a component of the Data Receiver/Key Word Comparitor (11).

The incoming document is received into the Incoming Document Register (18). When the complete document has been stored in the register, a "document complete" signal is sent to the Receiver/Register Sensing Buffer (19) which generates "location template start" signal into the Template Control Unit (17) which activates the Location template Transport Control (20) causing it to enter the Location Template Storage file (8) at position one of the location template storage unit. For this disclosure, the template stored in location template position one of the Template Storage Unit (8) is number fifty-seven (057). This is the number of the nation storage location for the United States (FIG. 2). The Location Template Transport Control (20) is programmed to copy the numbers "057" into the Nation scan line slots in the Receiver/Comparitor Match Buffer (22) and then copy the entire content of Location Template 057 into the Receiver/Key Word Comparitor (21), a component of Data Receiver/Key Word Comparitor No. 1 (11).

When the complete incoming document is stored in the Incoming Document Register (18) and the Location Template 057 is stored in the receiver Key Word Comparitor Register (21) the search for matching key words begins. Each word in the incoming document is "read" and electronically compared with words on the template. Each word that is found in the incoming document that is also on the template is translated into numerals obtained from the Location and Industry Key Word Template Storage Unit (8), or FIGS. 5A–5B.

When the comparitor completes scanning, translating and registering all locations mentioned in the incoming document, a "location scan complete" signal is sent from the Receiver/Key Word Comparitor (21) to the Receiver/

Register Sensing Buffer (19). This commands the Receiver/Register Sensing Buffer to scan the location register slots of the Receiver/Comparitor Match Buffers (22 and 23) to determine whether there are numbers in all location slots in at least one of those two registers. If so, the Receiver/Register Sensing Buffer uses that information to determine that location scanning is complete. The Receiver/Register Sensing Buffer (19) temporarily stores the numbers 057 and sets a "location scan complete" bit. It then signals the Template Control Unit (17) to select and delete the location template copy in the Receiver/Key Word Comparitor (21). The Receiver/Register Sensing Buffer (19) senses the empty register in the Receiver/Key Word Comparitor (21) and signals the Template Control Unit (17) to load the Industry Template into the Receiver/Key Word Comparitor (21). This process results in selecting an Industry template that is written in the language of the location detected when the incoming document was searched for location words.

The Receiver/Register Sensing Buffer (19) is programmed to sense the empty register in the Receiver/Key Word Comparitor (21) and send a command to the Template Control (17) to activate the Industry Template Transport Control (25). It also sends the Location numbers "057" to the Template Control Unit (17) causing it to command the Industry Template Transport Control (25) to enter the Location and Industry Template Storage Unit FIGS. 5A–5B at the Language Column 1 and scan through the Language Column Register (31) looking for the Location numbers "057". For the purposes of the explanation, it finds the numerals "057" in Language Column 1, FIGS. 5A–5B, (30), the English Language version of all Industry Templates. The Industry Template Transport Control (25) sets the template counter to prevent selecting that template again until all others have been scanned. It then copies the first template listed in column 1 into the Receiver/Key Word Comparitor Register (21) where a scan search is made looking for any matching Key words. This results in the document search being made with templates using the English language. Scanning, word matching and converting key words into numerals that are then inserted into the Comparitor Match Buffers (22–23) for the Industry words in the incoming document proceeds just as in the scanning for location words.

Circuitry and programming is provided to copy the number of the template that "matched" the incoming document into the template segment of the header register when the industry scanning and word matching is complete. Provision is made in the program to combine the header from Comparitor Match Buffer (22) and the text from the Incoming Document Register (18) and copy them into the Document Assignment Control FIGS. 1A–1C, (24) or FIGS. 6A–6B. There the header is inserted into Assignment Number Register, FIGS. 1A–1C, (24-a) and the document text is inserted into the Document Text register FIGS. 1A–1C, (24-c). This is a paired register combination that makes it possible to combine the header and the text into one document or to transmit then as separate documents. This is done to facilitate populating the remote Supermine™ Warehouse and the remote Supermine™ inventory of FIGS. 1A–1C, (39) or FIG. 14.

When the document header has been received into the Assignment Number Register (24-a) and the text has been received into the Document Text Register (24-b), "document received" signals are sent to the Document Assignment Control FIGS. 1A–1C, (24). This causes the Document Assignment Control to generate a command to the Document Transport Control FIGS. 1A–1C, (28) to copy the combined document and header into the Warehouse Storage Assignment Buffer FIGS. 6A–6B (29) where it is further processed into the correct Warehouse Storage Location. When the document and header were received into the Warehouse Storage Assignment buffer FIGS. 6A–6B (29), a "document received" signal was transmitted to the Document Assignment Control FIGS. 1A–1C, (24). This generated a command from the Document Assignment Control FIGS. 1A–1C, (24) to the Document Transport Control FIGS. 1A–1C, (28) to copy the combined content of the Assignment Number Register (24-a) and the Document Text Register (24-b) into the off premise Supermine™ Warehouse Storage Unit FIGS. 1A–1C, (39) which is an exact duplicate of the on premise Warehouse.

A "document received" signal was returned to the Document Transport Control FIGS. 1A–1C, (28) from the off premise Supermine™ Warehouse Storage Unit FIGS. 1A–1C, (39). This triggered a command to copy the content of the Assignment Number Register FIGS. 1A–1C, (24-a) into both the off premise and the on premise inventory units, FIGS. 1A–1C, (37, 39). This populated the on premises Warehouse and Inventory and the off premises versions of both those units.

When the header and text of the document was removed from the Comparitor Match Buffer (22) the text stored in the Incoming Document Register (18) and the header stored in the paired Comparitor Match Buffer (23) was also copied into the Document Review and Control Unit FIGS. 1A–1C, (38) where all incomplete, duplicated or questionable documents are sent for review. There the Data Gathering work teams make the decision whether to complete the document and store it in Supermine™ or to delete it. This completes the explanation of block diagram FIGS. 1A–1C that describes, in general terms, the data acquisition, electronic "reading", the method of indexing, assignment and storing documents in the Supermine™ Warehouse. The above identification, assignment, indexing and storage system is unique to Supermine™ and forms the basis for retrieving documents containing specific data from among thousands or perhaps millions of stored documents and delivering those documents to the person who requested them.

Full Description of the Supermine™ System

Figure 10A:
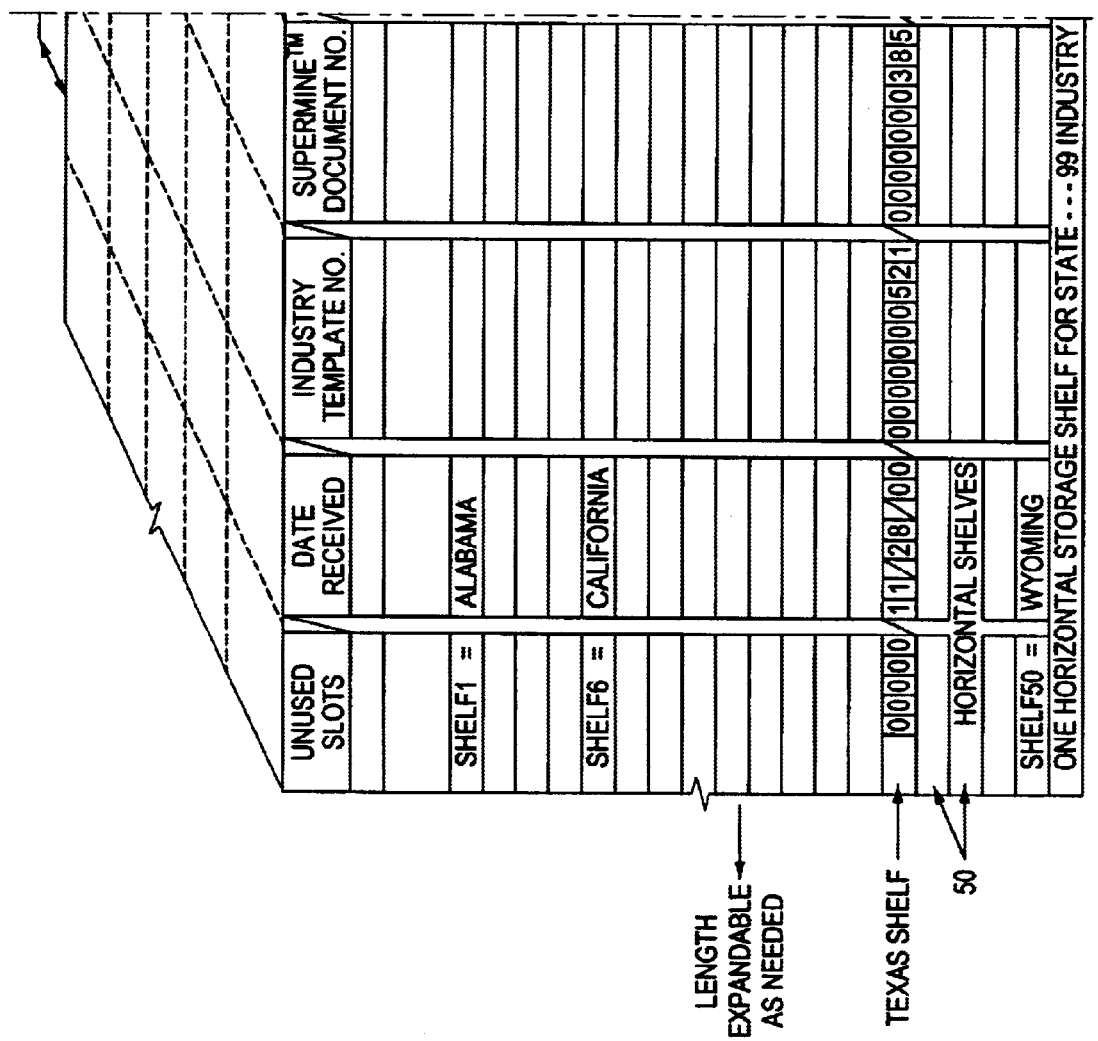
FIGS. 10A–10B show a three-dimensional table depicting an illustrative data warehouse in accordance with an embodiment of the invention.
Figure 10B:
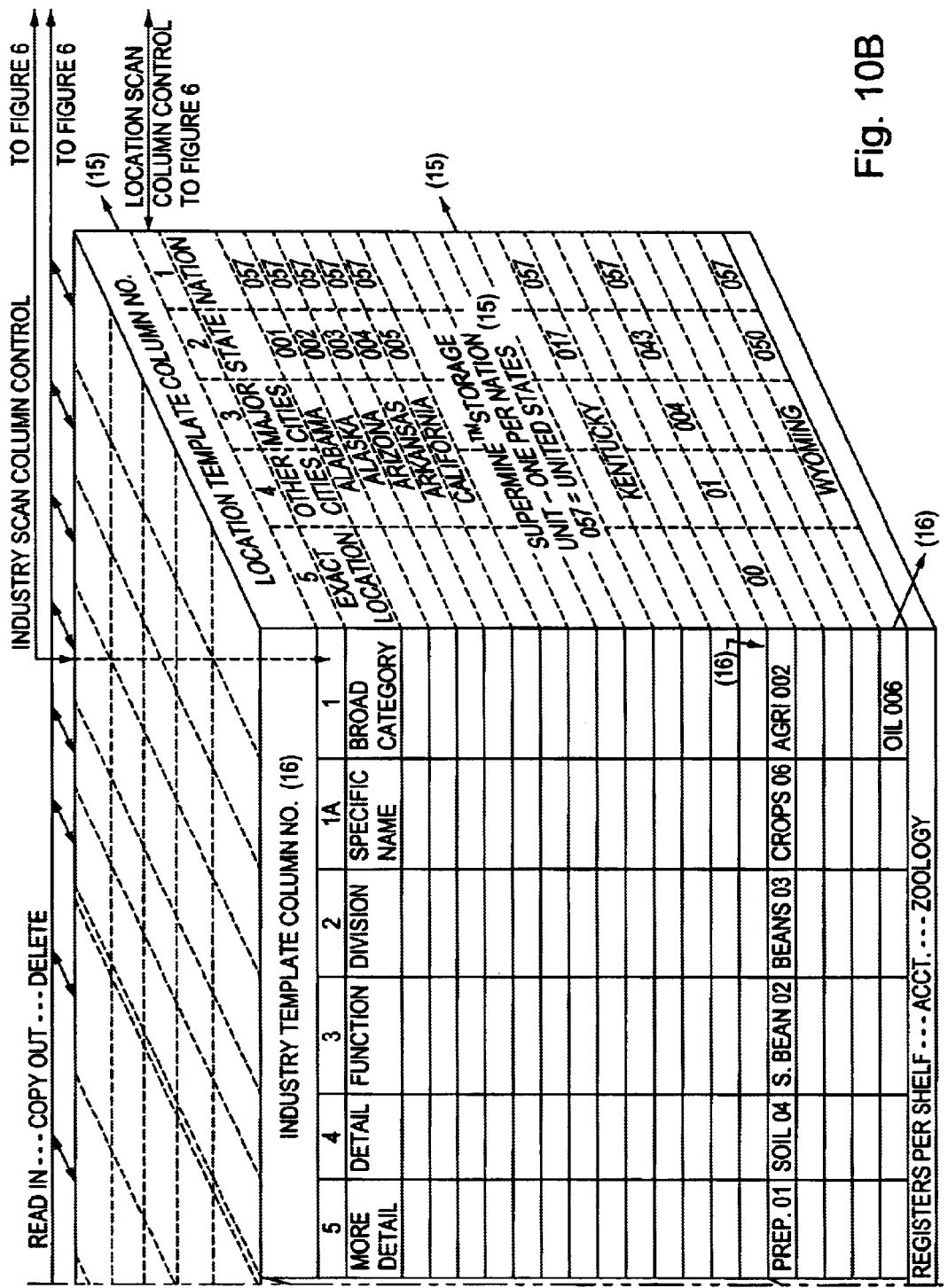

Block Diagrams 1 and 1A described in general terms how the Supermine™ System can randomly or selectively poll the Internet and other locations to acquire, electronically "read" the documents to discern origin, subject matter, language etc. and assign a control number to the document. Further the Block Diagrams have described how that document is processed through the Supermine™ System to store it in a Supermine™ Warehouse, retrieve it from the Warehouse and deliver it to a customer who has requested the document with no human intervention except downloading the retrieved document to the client. Since putting documents into the Supermine™ Warehouse, and retrieving specific documents from that warehouse is the focal point of most of this disclosure, the explanation should begin with the Warehouse itself. Referring to FIGS. 10A–10B, a word picture will be helpful to appreciate the size and configuration of the data warehouse that would be required to store hard copies of the data it contains. Visualize a hypothetical warehouse with 1000-foot high ceilings covering two square miles.

Referring to FIGS. 2 and 10A–10B, assume that within that warehouse there are 399 freestanding shelf structures 100 feet wide and 1000 feet high each named for a nation. Aisles ten feet wide separate the shelf structures. The 399 separate nation shelf structures are numbered alphabetically from Afghanistan (001) through Zaire (399). This number listing corresponds to column 1 of FIG. 2 that is a location template to be described later. The freestanding structure for the United States is numbered 057 on that template. Referring to FIGS. 10A–10B, the freestanding shelf structure for each Nation has horizontal shelves from floor to ceiling 10,000 feet long and 1000 feet high divided vertically into 999 segments 10 feet wide and 100 feet deep each named for a State or Province within the Nation. The alphabetically listed state or province names are numbered to correspond to column 2 of the Location Template. This provides for ultimately storing data for up to 999 different industries in each nation location storage unit. These segments are further subdivided to accommodate 999 smaller segments each named for the major cities within the states or provinces and representing column 3 of the location template. Each of these smaller segments is further subdivided into 100 discrete locations within, or near the major cities and are represented by column 4 of the location template FIG. 2. These can be made as specific as desired by adding more columns to the template. All freestanding shelf structures are identically configured as to storage locations. They differ only as to size. Obviously the storage capacity of the shelf structures for Afghanistan and Zaire would be less than those for the US, the United Kingdom, Japan and Germany etc.

Figure 6B:
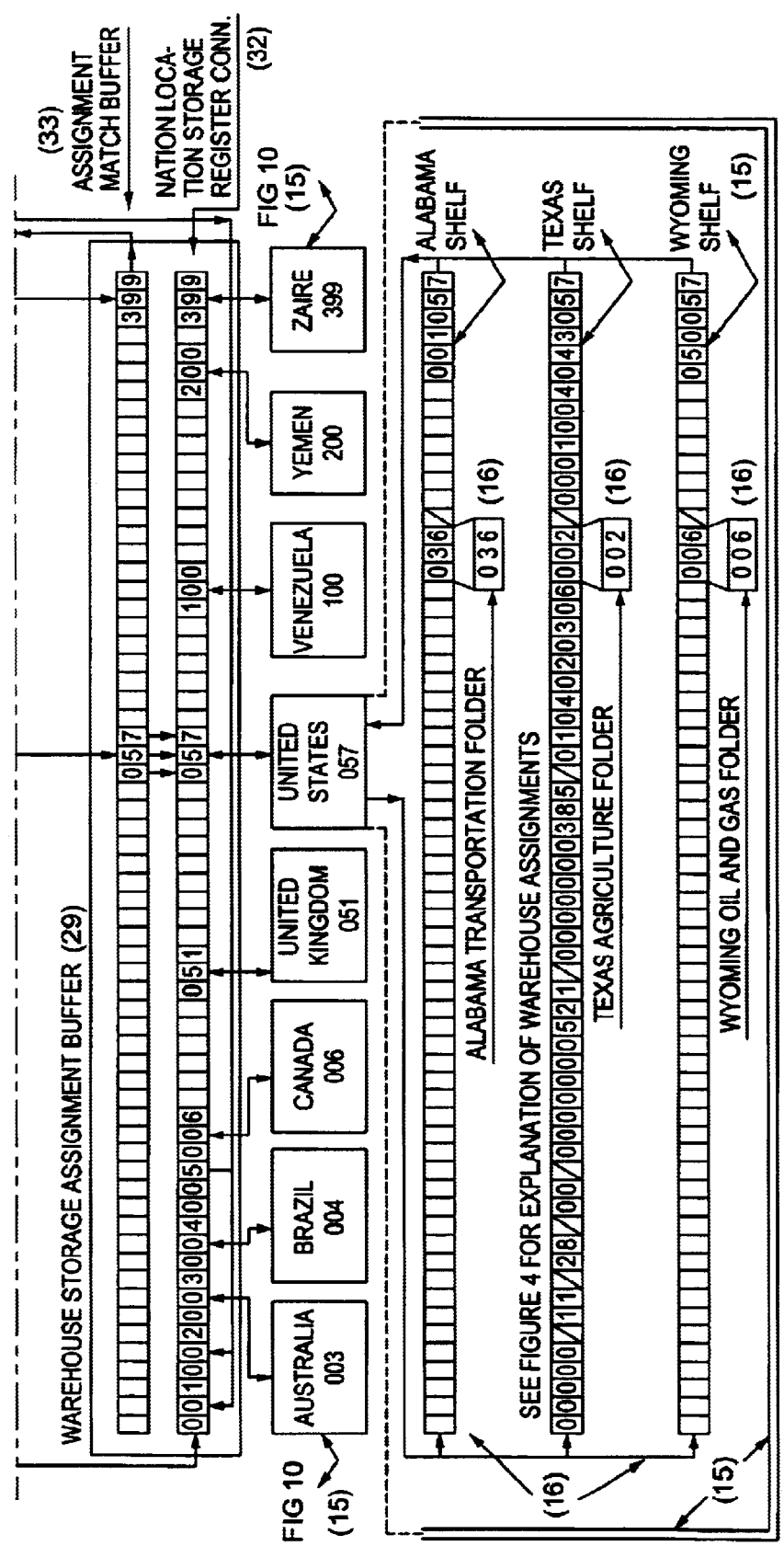

A look at the configuration of the location template, FIG. 2, will be the same as an overhead view of the divisions of the individual shelves of each freestanding storage unit. The above hypothetical warehouse obviously is not a practical building installation, but does suggest a huge matrix containing thousands of discrete addresses capable of containing millions of electronically stored documents. Referring to FIGS. 6A–6B, the matrix is a huge data storage warehouse, FIGS. 10A–10B, that is divided by Nation, States or Provinces within the Nation, major cities within that state or province and specific communities or locations associated with the major city, each identified by a discrete number. These numbers are part of a "header" for each stored document to identify exactly where that document is stored in the Supermine™ warehouse FIGS. 10A–10B. Each of these Location Storage segments house all available data relative to the many industries that make up the economy in the Nation represented by the Warehouse storage location. For example, as shown on FIGS. 6A–6B, there is one warehouse storage location for Australia, one for Brazil, one for Canada, one for the United States etc. The warehouse storage location for the United States carries the assignment 057 because that is the scan line of FIG. 2 that contains the United States. This system is designed to be expandable up to 999 separate locations.

Still referring to FIGS. 6A–6B, observe that the industry storage positions (16) are contained within those Nation, State, City and specific warehouse storage spaces (15). There is assigned an industry storage number 001 for Accounting/Bookkeeping, 002 for Agriculture, 006 contains all available data relative to the Oil and Gas industries and number 999 contains all available data on the field of Zoology. All documents that contain data relative to any industry or field of study relating to Australia or those that originated in Australia are stored in location 003. All documents to go into the Australia storage location carry the prefix "003". All documents relating to the United States will carry the prefix "057" All documents that relate to the Nation Zaire will carry the prefix "399". Any Industry document relating to the Oil and Gas industries in the United States will carry the prefix 057006. If that same Industry document related to drilling for oil in Zaire, it would carry the header numerals of 399006. All warehouse storage locations identify where the industry documents are stored. There can be a full range of industry documents stored in each of the warehouse storage locations.

There can be ninety-nine Industry data storage folders, expandable to 999, stored in each State, City or Specific Location warehouse storage position. There will be a data storage folder for the Accounting/Bookkeeping industry numbered 001. There will be a data storage folder for the Agriculture industry numbered 002. The Oil and Gas industry is numbered 006 with Zoology numbered 099. The Industry Template, FIG. 3, corresponds to an overhead view of how the Industry registers are configured within the location templates. Column 1 is a listing of the type industry, i.e. Accounting, Agriculture, Oil and Gas, Transportation, Taxes etc. There is an Industry template for each of these industries, and all are configured the same. To fully understand how these objectives are achieved it is necessary to leave FIGS. 10A–10B for a time and refer to the figures explaining construction and use of the Supermine™ templates. Referring to FIG. 2, the numbering scheme for the location templates is used as the configuration pattern for the Supermine™ document storage warehouse that provides a discrete storage address for any Industry document retained in the warehouse.

The disclosed system is designed to acquire data from anywhere in the world and process it to make it available, as desired, to anywhere in the world. Obviously any system with these objectives must begin with a means of identifying the location where the document originated, how it pertains to that location, the application of the field of study to that specific location and the language used in the document. FIG. 2 teaches a template listing many locations around the world that are likely to need a bi-lateral exchange of data. Obviously this numbering system could be in machine language, as is done further into the categorizing process. For purposes of illustration, the Nations in column 1 are listed alphabetically from Afghanistan to Zaire with Afghanistan being assigned the number 001 and Zaire being assigned the number 399. This means that the Supermine™ System is equipped to take data from, and transmit to, 399 different Nations. In actual practice, the literal nation location template is selected and processed in the order of the most frequent usage. As previously mentioned, the numbers derived from the industry template will become part of the header for any document originating or relating to a particular Nation. In addition, the analyst numbers each industry template as it completed. That template number will be included in the header for all documents selected for storage using that particular industry template. The individual template number is one component of the "header" that forms the basis for the Supermine™ inventory and document retrieval system.

Referring to FIG. 2, Column 1, for this disclosure Australia will carry the number 003 in its header, Canada will be number 006 and the United States will carry the prefix 057 on all documents originating in, or relating to the United States or to an industry located in the United States. For purposes of clarity, column 1 of the template is called the primary location of the document. Supermine™ needs to know, within a Nation, what state or territory the document pertains to. Column 2 is the secondary location. For the United States, all 50 states are secondary locations. Therefore the State of Alabama carries the prefix of 057001. The 057 is for the United States, and the 001 is for the State of Alabama. In like manner the State of Texas would carry the prefix 057043 telling us that Texas is the 43$^{rd}$ state listed alphabetically. Now we need to know to what city or large area within the State or Province the document relates.

Referring to FIG. 2, a few of the cities within Texas are listed to illustrate the Location Template. Houston is the fourth city in column 3. This list could be 999 cities as needed. Therefore the city of Houston, in the State of Texas in the United States would carry the numerals 057043004. To carry the example further, Pasadena, Tex., as a suburb of Houston, would be part of a list of locations near the larger city of Houston. If we assume that Pasadena was the first location listed as a suburb of Houston, it would carry the numerals 05704300401 in the header of any document relating to Pasadena, Tex. The zeros to the left of the significant numbers are to accommodate growth without redesigning the thousands of digit registers used in Supermine™. Referring briefly to FIGS. 10A–10B, notice the numbers on the Location Storage assignments (15). The storage location for the United States carries the numeral 057. Any document referring to Pasadena, Tex. would be found on the Texas scan line 043 in that storage location.

Now referring again to FIG. 2, column 1 lists the Nations in alphabetical order. Notice that the United States is found on scan line 57=057. Now look at column 2. Starting on the column 1 scan line 57 for the US, the States are listed in column 2 in alphabetical order. For clarity, the scan lines for columns 3 through 5 are not shown. However, Alabama begins at the US scan line 57 of column 1 and begins a scan line for column 2. Texas is found on column 2 scan line 43. That identifies Texas as 043. Begin at the Texas scan line 043 and move across into column 3. Notice that the Texas cities begin on that scan line and are listed alphabetically. Notice that Houston is the fourth city listed, thus the number 004. The same procedure follows in the other columns. There is a listing of all Nations, States within the Nations, all major Cities within those States, Provinces or Territories, and the larger locations or specific sites near, or in, those cities. Obviously this numbering system could identify more specific locations by simply adding additional numbers to the templates. The Supermine™ location listing is very large and requires huge amounts of computer memory. For this reason, the numbering and document assignment system will be code compressed or compandored to reduce the space required. There are many methods of encoding or compressing the bit stream such as Binary Coded Decimal, Packet Switching Techniques, Code Compression etc. However, the principle remains the same.

In the illustration for this disclosure there are individual templates for all 399 Nations from Afghanistan to Zaire, all corresponding to 399 Storage locations. FIGS. 10A–10B, (15). In the event the storage location for larger nations such as the United States, The United Kingdom or Japan becomes two thirds full, provisions can be made to program the Template to accept an auxiliary location numbering. This scheme can apply to all Location Storage positions, FIGS. 10A–10B, (15) or to the Industry folder assignments FIGS. 10A–10B, (16). These storage compartments are actually huge folders in a large computer. A series of folders containing the data for the industry or fields of study resides in every Location Storage Unit, (FIGS. 10A–10B, 15). It is here that the position of each number in the numbering scheme becomes important. For that reason the first thirteen digits plus one space of all document assignments are reserved for location digits.

| For example: | | | Corresponds to Template: |
|---|---|---|---|
| Numeral Position 1 | 0 | | |
| | | X Nation Id. | Column 1 |
| | | X | |
| Numeral Position 2 | 0 | | |
| | | X Identifies the State or | Column 2 |
| | | X Province within a Nation | |
| Numeral Position 3 | 0 | | |
| | | X Identifies the City or | Column 3 |
| | | X area within a State | |
| | | X or province | |
| Numeral Position 4 | 0 | | |
| | | X Identifies specific | Columns 4 |
| | | locations near cities. | ---"n"= |
| | | | Small locations |

Each column of both the location templates and the industry templates has its own scan lines. Referring to FIG. 2, note that column 1 shows scan lines numbered from 1 through 399. The purpose is to enable the scanner to "remember" where a particular nation was found in the scanning process and begin at that point for future scans rather than beginning at the top of the scan at Afghanistan on every scan. In like manner, (not shown for clarity) column 2 has scan lines from one through fifty (one line per state) for the same reason. When the State of Texas was found on scan line 43, the scanner could "remember" that and begin scanning for Texas cities at Column 2 scan line 43 rather than scanning down from Alabama and progressing through all other intervening states before getting to Texas. In like manner, Column 3 has its own scan lines as do the other columns. The same concept is used in FIG. 3. This numbering scheme is also shown graphically on FIG. 4. This completes the basic numbering scheme for the Location Template (FIG. 2).

Referring to FIG. 3, as explained below, the storage locations carry the same numbering scheme as the template columns of the Industry or field of knowledge Template. In the agricultural example, only one segment of the total industry is shown, however, the format for other segments and other industries is the same and a similar template is constructed for each of them. Because of the worldwide operation of Supermine™, industry templates carry the prevalent language of the Nation relevant to the content or origin of incoming documents. As is the case for the Location Template (FIG. 2) the Industrial Template (FIG. 3) will be the Industry numbering scheme defining the discrete assignment of each document within the warehouse storage location. Documents will be stored in the Industry Data Storage folders (FIGS. 10A–10B, 16) that reside in the Nation storage units FIGS. 10A–10B, (15).

Refer briefly to FIGS. 6A–6B (16). Notice that there is a storage folder for Alabama, Number 001. There is a folder for the Transportation industry (036) in Alabama. There is a folder for Wyoming, 050, that includes a folder for the Oil and Gas Industries (006) in Wyoming. There is a folder for Agriculture (002) in Texas. There is a separate Template for each of these industries and in addition; each industry template is duplicated in the most prevalent language of all Nations represented in the storage Warehouse. The Analysts who prepares the templates determines the specificity of detail stored for these industries by his use of the columns of the template. He also adds a discrete number to every template as it is completed.

The above information can be understood by referring to FIG. 3. Column 1 refers to the digit position in the broad (or primary) industry category. In this particular case the agriculture industry was used as an example. The primary industry category will be recorded in the column 1 position the secondary in the column 2 position etc. Referring temporarily to FIGS. 10A–10B, (16), note that the warehouse storage location for agriculture is numbered "002". All documents relating to agriculture carry the primary number of "002" and are always in the column 1 position regardless of their warehouse location FIGS. 10A–10B, (15). There are agriculture documents (002) in the location storage position for Kentucky, (017) and agriculture documents (002) in the storage location position for Arkansas, (004). Since there are many synonyms for agriculture, all commonly used terms for the agricultural industry are listed under column 1A on the agricultural template. For example, a document that discusses hydroponics will be listed in column 1A and will be numbered (05). A document discussing crops will be numbered (06). A document discussing the harvest will be numbered (08) etc.

Industry Template Column 2 lists the specific aspect of the agricultural industry being discussed in a document. Assume that the 385$^{th}$ document received at Supermine™ discusses the String Bean crop in Pasadena, Tex.
The location header will be numbered:
   057 designating the United States
   043 designating the State of Texas
   004 designating the City of Houston, Tex.
   01 designating the community of Pasadena, Tex.

The numbers 05704300401 would tell the computer to store the incoming document in Location 057 at the addresses 04300401, which is assigned to Houston, Tex. and the suburb of Pasadena, Tex. When the words "crops" or "harvest" or similar words are detected by the Data Receiver/Key Word Comparitor, FIGS. 13A–13C, (21) the comparitor puts the numerals 00206 in the header for the document thus designating that the document refers to the Agriculture industry, that it will be stored in Industry folder 002 and that it will be further located in the "crops" location numbered "06". When the words "bean, or beans" are detected, the comparitor FIGS. 13A–13C, (21) adds the numeral "03" to the header sequence thus designating that the crop being discussed in the document refers to the bean crop.

Figure 13C:
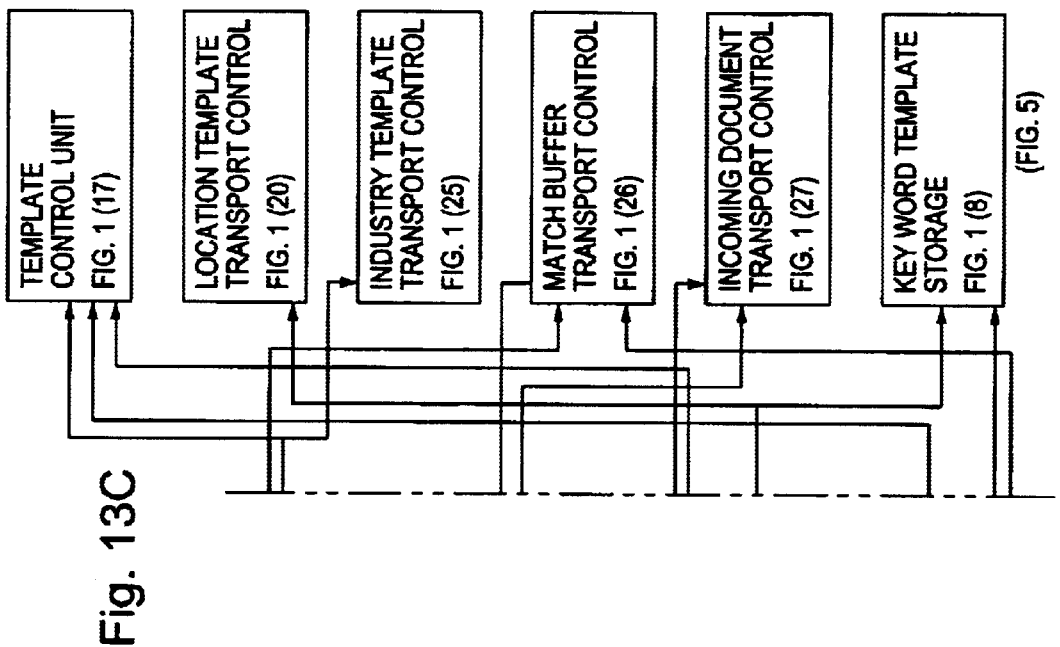
FIGS. 13A–13C show a block diagram showing an illustrative Data Receiver/Key Word Comparitor in accordance with an embodiment of the invention.
Figure 13A:
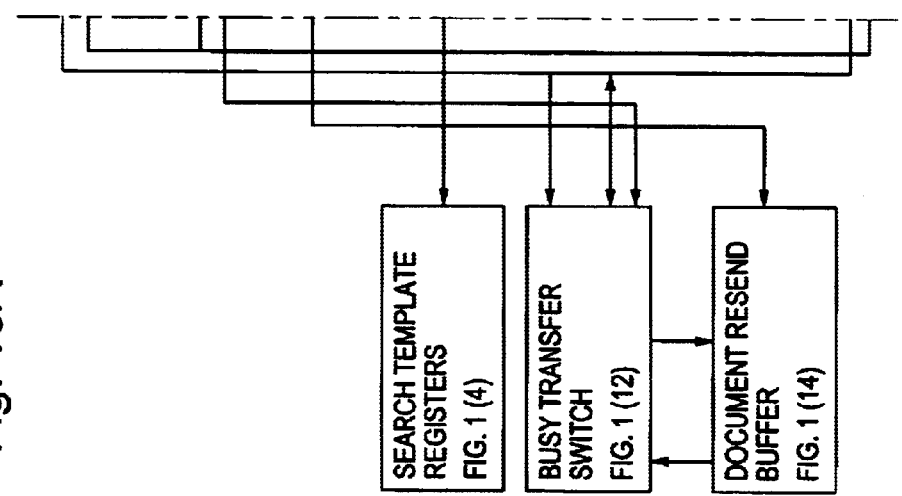
Figure 13B:
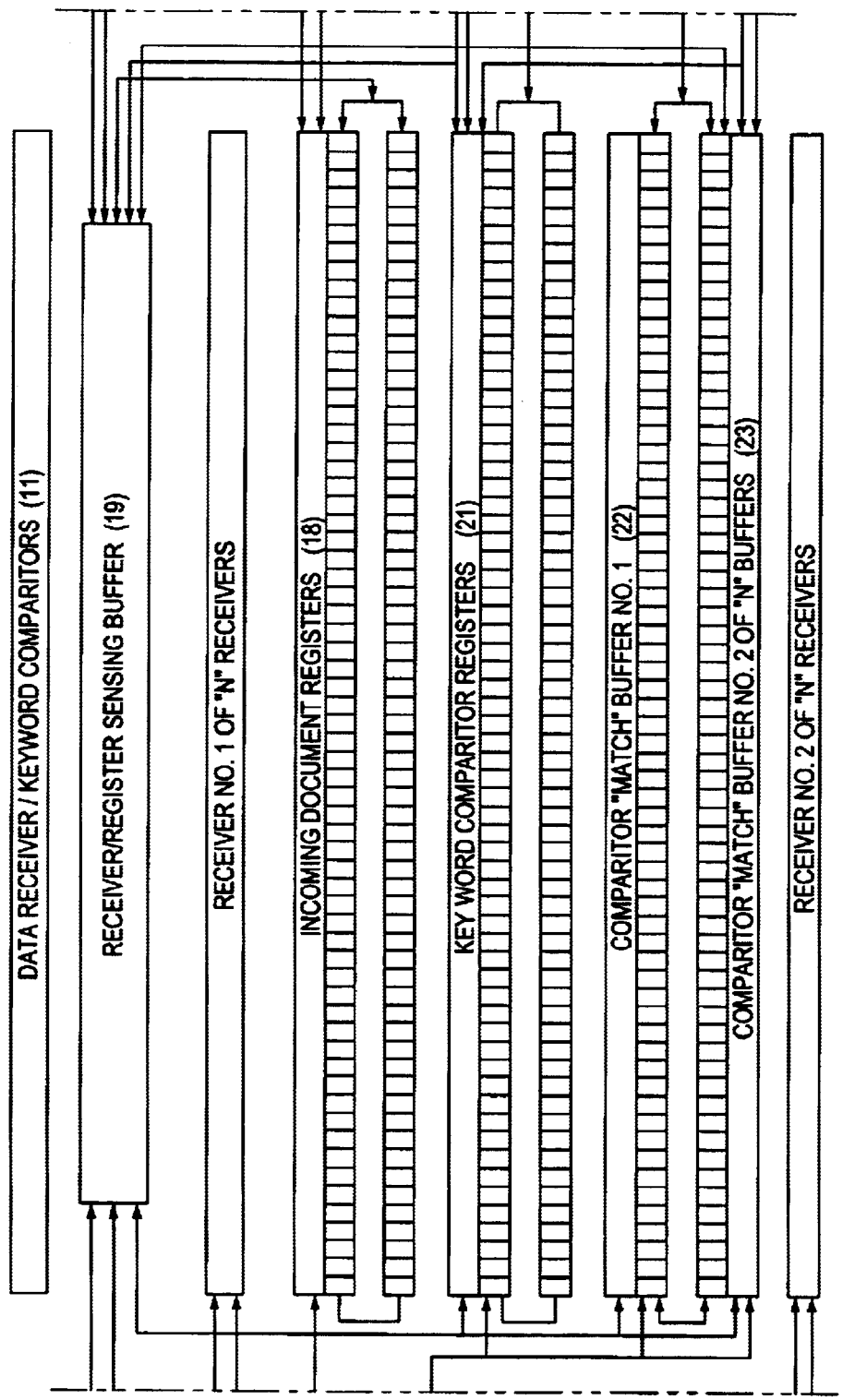

To carry the example further, when the Data Receiver/Key Word Comparitor, FIGS. 13A–13C (21) detects the word "string" or the words "String Beans" the comparitor adds the number 02 to the sequence thus designating that the crop in Houston, Tex. that is being discussed in the document is the string bean crop. This is where the sequence would usually end. However, to carry the example further, (still referring to FIG. 3) if the document discussed the suitability of the soil in Pasadena, Tex. for planting string beans, the number 04 would be added to the number sequence probably followed by one or more of the factors shown in column 5 of FIG. 3. Therefore, an incoming document that discussed how to prepare the soil in Pasadena, Tex. to get the best string bean crop would be assigned the numbers:
   057004300401 sends the document to warehouse Location 057=the US, 043=Texas, 004=Houston, the 01=Pasadena, Tex.
   002=assigns the document to the Agriculture folder within the US storage (057).
   00206=the topic is "crops"
   0020603=the crop being discussed is "beans".
   002060302=the type beans is "string beans".
   00206030204=the topic relating to string beans is how to plant them.
   0020603020401=how to prepare the soil in Pasadena, Tex. for planting string beans.

Therefore, a document that discussed planting string beans in Pasadena, Tex. would carry the header: 0570430040100/0020603020401/. If the document is selected for storage, the Supermine™ document number and the template number will also be included in the header. There is a location template for all locations for which data is collected and stored. These are "one time" templates that change only when locations are deleted or added within Supermine™. The industry, or fields of study templates are "living documents" that are updated periodically to keep current with progress and innovations within an industry or field of study. The quality of the industry templates will determine the quality of the Supermine™ product. For that reason, they are proprietary. Security measures are provided by this invention to protect these intellectual properties. Refer to FIGS. 1A–1C, 7, and 5A–5B.

The invention, and these templates are not limited or restricted as to content or utilization of the storage locations or the industry folders. Only the depth of knowledge and ingenuity of the analyst who prepares the template limits the quality, variety and level of detail stored in Supermine™. Templates can be prepared to range from a broad, generic type to one identifying or describing a fine grain, highly detailed work operation. Provision is made for controlling the degree of detail collected before a document is sent to warehouse storage. Adding or reducing the number of columns on the template to "match" the level of detail wanted does this. The more columns, the greater the detail. Fewer columns used result in more documents collected covering greater scope of the industry. Referring to our previous example, if only columns one and two were to be used on the polling search template, all agricultural documents that mentioned any variety of beans would be accepted into the comparitor. Since our analyst needed only the data relating to planting string beans in a specific location, the agriculture template copied into the Key Word Comparitor Register FIGS. 13A–13C, (21) contained a full set of numbers in all columns. This prevented storing any documents except those referring to planting string beans in Pasadena, Tex.

The industrial world has the potential for exponential growth. National boundaries are virtually disappearing where international commerce is concerned. The language barrier is a huge impediment to this growth. Documents arrive at Supermine™ using many different languages. Using humans to translate them is very expensive and time consuming. Having humans translate documents is not compatible with Supermine™ mass data acquisition and distribution operation. Supermine™ solves this problem by collecting and disbursing data from and to multiple sources worldwide at very high speeds without using humans to read and make decisions relative to language or translating documents. Location Templates (FIG. 2) and Industry Templates (FIG. 3) have been designed to overcome much of the language barrier. A template can be selected from Supermine™ that conforms to the language used in the incoming document. The location and language of the incoming document is immediately identified and a Location Template (FIG. 2) associated with the pertinent Industry Template (FIG. 3). This action is completed in the short interval between identifying the location and language that pertains to an incoming document and the beginning of the scans matching key words of the Industry Template (FIG. 3) with words in the incoming document.

Figure 5A:
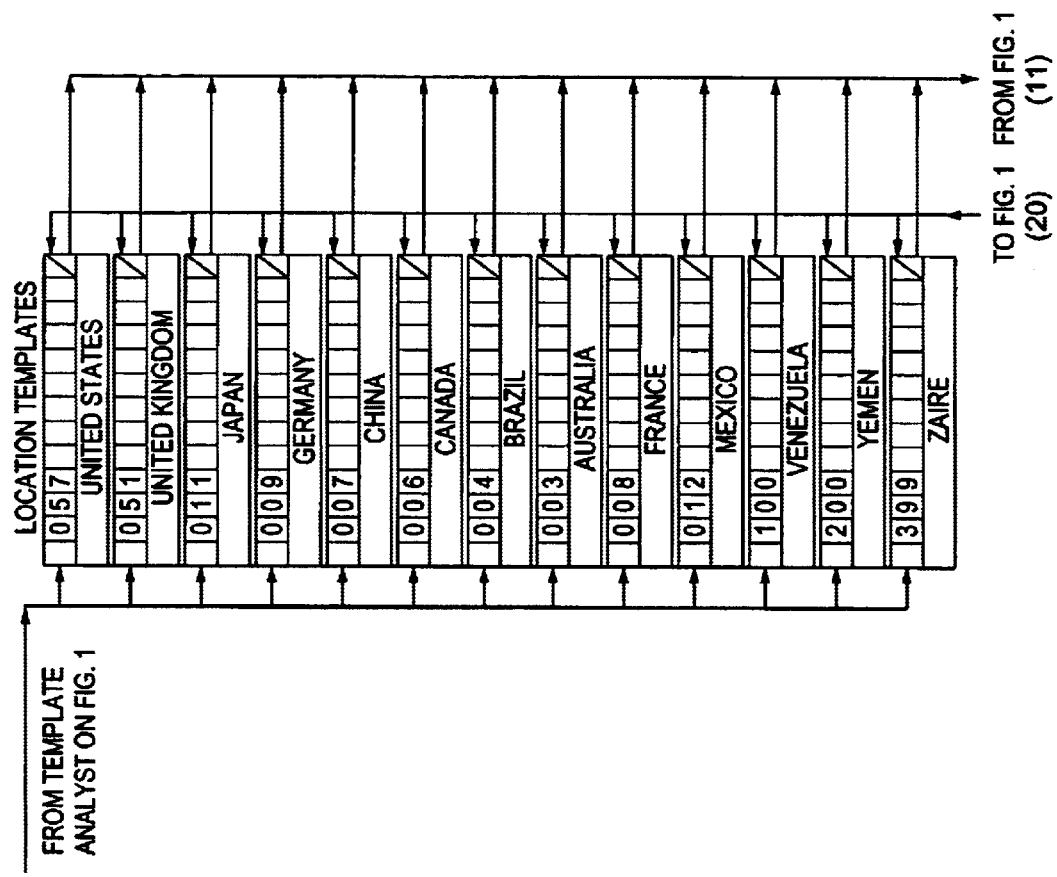

Supermine™ accomplishes these functions with a unique Location and Industry Key Word Template Storage Unit FIGS. 5A–5B that overcomes much of the language barrier and greatly reduces document transit time. Referring to FIGS. 5A–5B, the Location and Industry Key Word Template Storage Unit FIGS. 5A–5B (8) is a three-section matrix that contains every template used in Supermine™. The first section contains the permanent copy of all Location Templates listed in the order of the greatest activity for the location of origin for incoming documents. The first, number 057, represents the United States, number 051 represents the United Kingdom; number 011 is for Japan etc. These numbers correspond to the warehouse storage locations of FIGS. 10A–10B and 6A–6B, (15) as previously explained. All assignment and storage is done electronically.

The nation names shown opposite the nation numbers and the industry names opposite the industry numbers in FIGS. 5A–5B are also used in the document retrieval process and will be explained later. The second section of the matrix is arrayed in columns; one column for each language to be accommodated by Supermine™. Column 01 of the matrix contains an English language version of every Industry Template (FIG. 3) used in Supermine™. Column 02 is a Spanish version of every Industry Template used in Supermine. The same templates are listed in column 03, with the exception that they are in the Japanese language. For clarity in this disclosure, the example shows that there can be 999 different Industry Templates (FIG. 3) in each of 1 through "N" columns depending on the number of languages to be accepted in Supermine™. All 999 templates will be identical except for language.

The third segment of the Industry side of the Location and Industry Key Word Template Storage Unit FIGS. 5A–5B (8) is actually a large register that contains the electronic equivalent of the numerals of every National location served by Supermine™. The register is designed to conform to the column numbers of the language section. For example, the first segment of the register corresponds to the English column 01. The location numerals for every English speaking nation (location) are inserted in the register in the English-speaking segment, i.e. column 1. The second segment, column 02, lists the same Industry Templates (FIG. 3) in the Spanish language and the location numerals for all Spanish-speaking nations (locations) are inserted in column 02, etc. The location numerals for all locations that use the Urdu language are inserted in column "n". The operation and use of this matrix will become apparent as the description progresses.

The method of polling and receiving data from many sources and getting those data into a Data Receiver/Key Word Comparitor FIGS. 13A–13C (11) has been described. In addition, the design of the location templates, FIG. 2, the industry templates FIG. 3, and the basic configuration of the Location and Industry Key Word Storage Unit FIGS. 5A–5B were explained. The configuration and operation of the warehouse location assignments were further explained on FIGS. 10A–10B, (15). The Data Storage folder configurations for each industry, FIGS. 10A–10B, (16) have been explained. Notice that each location and industry template is numbered within the Location and Industry Template Storage Unit FIGS. 5A–5B, (8) and that these numbers correspond to the warehouse location assignment of FIGS. 10A–10B, (15). The example used in the disclosure shows that there could be as many as three hundred ninety nine location templates with a corresponding warehouse storage location FIGS. 10A–10B, (15) for each Location Template.

The first location template listed on FIGS. 5A–5B (8) is number 057 for the United States. This is because the warehouse storage location, FIGS. 10A–10B, (15) for the US is the most heavily used. The second location template listed is for the United Kingdom and is the second most frequently used location. This order follows through all location template assignments in the order of usage. The purpose of this is to reduce scanning time during location template selection. It would be inefficient to scan through Afghanistan before scanning the more heavily used locations because the probability of a document referring to that location is much lower than industrialized locations such as the United States, The United Kingdom, Canada, Australia, Germany, Japan, etc.

The templates stored in the Location and Industry Key Word Template Storage Unit FIGS. 5A–5B (8) are stored in machine language. Since all "reading" is done electronically the plain language names for locations, industries and industry functions must be converted into numerals to store and retrieve documents from the warehouse Nation locations, FIGS. 10A–10B, (15). (See client data request answers on FIG. 7A). The Location and Industry Template Storage unit FIGS. 5A–5B, (8) is configured and programmed to function as a conversion look-up table to accomplish this purpose.

Referring still to FIGS. 5A–5B, observe that the location section carries both the location name and the corresponding numeral identification. In like manner the industry section carries both the name of the industry and the numeral equivalent. These names and numbers are electronically linked in the program so that when a scan search is made using the plain language name, the result is a reply to the polling unit using the numeral equivalent of the name. For example, if a scan search was made using the words "US" or "United States", the scanner would send back the numerals "057". Conversely if the scan were made using the numerals "057" the resulting reply would be "US" or "United States". In like manner if a scan were to be made using an industry name such as "Agriculture" the scanner would send back the numerals "002" and vice-versa. The scanners are under the control of the Template Control Unit (17) of FIGS. 1A–1C. If the volume of traffic between a non-English speaking Nation and the United States becomes so great as to become a problem, a language conversion process could be inserted between the Protocol Converters, FIGS. 1A–1C, (6) and the Security Screening Unit, FIGS. 1A–1C, (7) to facilitate communication with the analyst.

When the scan begins, the numerals 057 in location slots one, two and three, (the primary location slots) are the only numerals available in the Receiver/Key Word Comparitor FIGS. 13A–13C (21) register for comparison with the incoming document. All secondary and other slots are closed at this time. If there are no nation words in the document referring to the United States, the Receiver/Key Word Comparitor FIGS. 13A–13C (21) "steps" over to column 2 (the secondary location slots) of the location template and begins a scan for any state names in the US. If none are found the Comparitor then scans for city words in column three. After the third scan, a "no match" signal is sent to the Receiver/Register sensing Buffer FIGS. 13A–13C (19) which sends a command to the Template Control Unit FIGS. 1A–1C (17) to delete the contents of the Receiver/Key Word Comparitor FIGS. 13A–13C (21) register and re-enter the Location And Industry Key Word Template Storage Unit FIGS. 5A–5B (8) at position two of the Location Template listings which is for the United Kingdom. The above process is repeated until a Nation location is detected and the scan is continued as described later. In the event there is no indication of the nation location or any state or major city that would indicate a location, the following default action takes place.

The Location Template Transport Control FIGS. 1A–1C (20) and the Industry Template Transport Control FIGS.

1A–1C (25) have an internal counter that "makes busy" the templates selected to prevent selecting them a second time in another scan until all other templates have been scanned. It then "steps" to the next template number. This innovation assures that all templates are selected and scanned for that document before repeating a template selection. That selection sequence is retained as long as the same document remains in the Receiver/Incoming Document Register FIGS. 13A–13C (18).

When the Template Transport Control FIGS. 1A–1C (17) counter reaches 399, indicating that all templates have been scanned with no document location found, the Receiver/Key Word Comparitor FIGS. 13A–13C (21) register sends a "no match" signal to the Receiver/Register Sensing Buffer FIGS. 13A–13C (19) which commands the Template Control FIGS. 1A–1C (17) to delete the last location template in the Receiver/Key Word Comparitor FIGS. 13A–13C (21) and to again enter the Location and Location And Industry Key Word Template Storage Unit FIGS. 5A–5B (8) at position one of the Location Template listings which is for the United States. The Template Control FIGS. 1A–1C (17) checks that the template selection counter is at 399 template scans, and enters the template storage to select the United States as the default location. It again sends the numerals 057 into the Receiver/Key Word Comparitor Register FIGS. 13A–13C (21) immediately followed by the entire 057 location template. This template remains in the comparitor until the incoming document location scanning and comparing is complete. When the Template control Unit FIGS. 1A–1C (17) is commanded by the Receiver/Register Sensing Buffer FIGS. 13A–13C (19) to clear the incoming document from the Receiver/Incoming Document Register FIGS. 13A–13C (18), it also resets the counters in both the Location and Industry Transport Controls FIGS. 1–1C (20, 25).

Assuming that we now have a legitimate location template stored in the Receiver/Key Word Comparitor register FIGS. 13A–13C (21), the following action continues. When the Receiver/Register Sensing buffer FIGS. 13A—13C, (19) receives the signal that the Location template is stored in the Receiver/Key Word Comparitor FIGS. 13A–13C, (21) it is programmed to close all register slots in the Receiver/Comparitor Match Buffers FIGS. 13A—13C (21 and 22) except those reserved for the Supermine™ document number and the date the document was received. When the Receiver/Register Sensing Buffer FIGS. 13A–13C, (19) senses that these slots are filled, it re-opens all Location and Industry slots in the register.

When the complete location template has been received, the comparison of key words in the location template with any key words in the document begins as the template is "read" into the Receiver/Key Word Comparitor Register FIGS. 13A–13C (21) The first words in any incoming document are the Supermine™ number and the date received. All registers are programmed to give these numerals an automatic "match" and to insert them into the Receiver/Comparitor Match Buffers FIGS. 1A–1C (22, 23) as part of the header for the document being scanned. All numerals are inserted into the Receiver/Key Word Comparitor Match Buffers FIGS. 13A–13C (22, 23) in specific positions to prevent errors or duplications. For a better understanding of this technique, refer to the configuration of the Receiver/Comparitor Match Buffers (22-"n") of FIG. 4.

Figure 4:
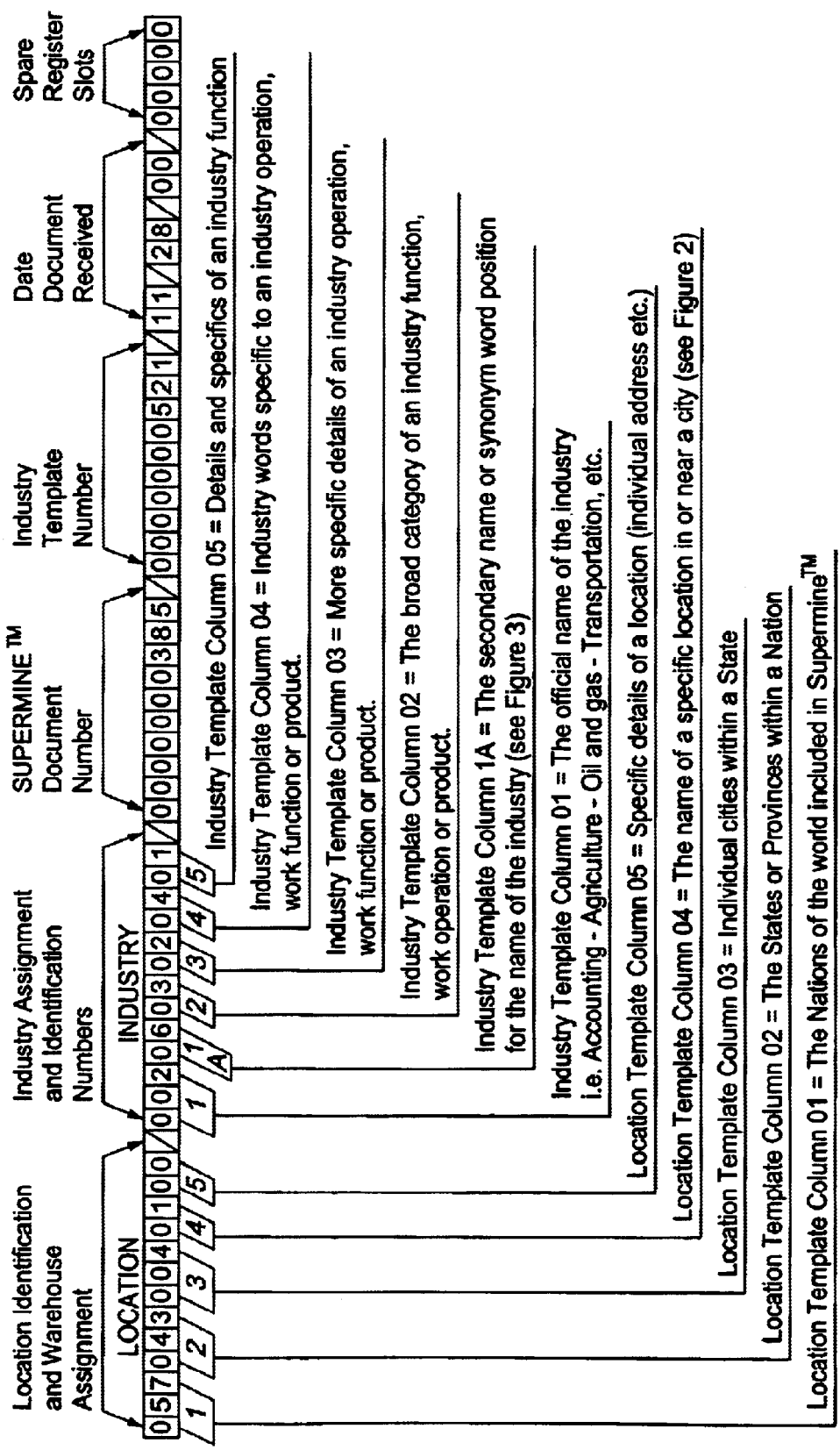
FIG. 4 is a table depicting the placement of numerals derived from the names of locations and industries into specifically assigned scan line slots in a Comparitor Match Buffer in accordance with an embodiment of the invention.

Refer to FIG. 4 for a graphic explanation of the header. From left to right, the first thirteen-register spaces plus one separator symbol (/) space are dedicated to identifying the location information of the document. This will be the document assignment into the Supermine™ warehouse.

The next thirteen-register positions plus one space symbol (/) are reserved for designating the Industry, functions and processes that occur within that industry. These will determine the Industry assignment for the document within the Location assignment. The next ten register-spaces plus one space symbol (/) are reserved for recording the Supermine™ document number. This number is put on the document when it is received by the Data Receiver Transmitter FIGS. 1A–1C (9). The next ten-register spaces plus one space symbol (/) are reserved for the number of the template actually used to identify the document ultimately selected. This number, in connection with the Supermine™ number on the document, forms the basis of a method of document retrieval and an inventory system. It is placed in the document header after it is determined that the document will be selected and stored in the warehouse. The next nine-register positions are reserved for the date that the document was received with the remaining 5 spaces in the register containing zeros to indicate unused spare.

The date received, and the Supermine™ document number are inserted into the header of every incoming document by the Data Receiver/Transmitter FIGS. 1A–1C (9) and are placed at the top of every document. The Receiver/Register Sensing Buffer FIGS. 13A–13C, (19) controls the opening and closing of register slots to assure getting the incoming data into the proper Comparitor Match Buffer slots. These data are always automatically placed in the same slots in the Receiver/Comparitor "Match" Buffer FIGS. 13A–13C (22) and in the Receiver/Comparitor Match Buffer FIGS. 13A–13C (23) for use in the Document Review File FIGS. 1A–1C, (38).

To accommodate growth without re-programming all registers, all numeral slots are filled from right to left with the least significant number entered first and the most significant number entered last. The remaining header numeral slots are filled with zeros by the Data Receiver/Transmitter FIGS. 1A–1C (9) as it makes the header assignment. This prevents insertion errors and makes it easy for the Receiver/Register Sensing Buffer FIGS. 13A–13C (19) to sense that the header numeral and date slots are filled. This also makes it possible for the Receiver/Key Word Comparitor FIGS. 13A–13C (21) to automatically copy these numerals into the proper slots in the Receiver/Comparitor Match Buffers FIGS. 13A–13C (22-"n"). This is accomplished by programming the Receiver/Register Sensing Buffer FIGS. 13A–13C (19) to open and close the Receiver/Comparitor Match Buffer FIGS. 13A–13C (22, 23) numeral slots in a controlled sequence to assure the desired numerals are inserted in the register at the proper time and in the proper sequence.

For example, all Receiver/Comparitor Match Buffer FIGS. 13A–13C (22) register numeral slots are normally closed. When an incoming document has been received into the Incoming Document Register FIGS. 13A–13C (18), a "document complete" signal is sent from the Incoming Document Register FIGS. 13A–13C (18) to the Receiver/Register Sensing Buffer FIGS. 13A–13C (19. This causes the Receiver/Register Sensing Buffer FIGS. 13A–13C (19) to activate the Template Control Unit FIGS. 1A–1C (17) and at the same time, open the three numeral slots in the Comparitor Match Buffers FIGS. 13A–13C (22, 23) that are reserved for the nation location digits. It also opens the correct register slots for the Supermine™ document numbers, and the date slots. A shown in FIG. 4, if the document header number happened to be 385, the ten slots would contain the numerals and symbol 0000000385/. When the Receiver/Register Sensing Buffer FIGS. 13A–13C

(19) senses that all eleven digits have been received, it opens the nine spaces in the register of the Receiver/Comparitor Match Buffer FIGS. 13A–13C (22, 23) that are reserved for the date the document was received. If the document was received Nov. 28, 2000 the numerals inserted in the date slots of the register would look like this: 11/28/00/. At this time in the document scanning process the Comparitor Match Buffer FIGS. 13A–13C (22), also see FIG. 4, would look like this:

05 70000000000/0000000000000/0000000385/ 0000000521/11/28/00/00000

All other register slots remain closed until the Receiver/Register Sensing Buffer FIGS. 13A–13C (19) detects that the "nation" location slots, the Supermine™ number and date slots are filled, it then closes these register slots and opens the ten slots for the State, City, Community etc. plus one space slot. When the above sequence is complete, the Receiver/Key Word Comparitor Register (21) begins the search for words in the document stored in the Receiver/Incoming Document register FIGS. 13A–13C (18) that "match" words used in the template. This operation is very similar to the "Find" command of PC operation with the exception that the comparitor is programmed to "look" at the first word of column 2 of the Location Template that is in the Receiver/Key Word Comparitor Register FIGS. 13A–13C (21) then search through the bits that are stored in the Incoming Document Register FIGS. 13A–13C (18) for a word that matches the first word of the location template.

For example, refer to FIG. 2. The first location template selected for scan and copied into the Receiver/Key Word Comparitor Register FIGS. 13A–13C (21) is number fifty-seven that is the assigned number (057) for the United States. The Receiver/Comparitor Match buffers FIGS. 13A–13C (22, 23) already contain the numerals 057 in the column 1 (nation) slot of the register. Therefore, the scan actually begins in column 2 for the individual states in the US. The first word of column 2 of FIG. 2 is "Alabama". The comparitor searches the incoming document for the word "Alabama" and not finding a match, then "looks" at the second word of the template that is "Alaska". Not finding a match, the search continues until the comparitor makes the 43$^{rd}$ attempt and finds a match with the State of Texas. The comparitor "marks" scan line forty-three (43) where Texas was found and inserts the numerals forty-three (043) into the column 2 slot of the Receiver Comparitor Match Buffers FIGS. 13A–13C (22, 23) and shifts to column 3 of FIG. 2.

To prevent having the comparitor scan and search through all cities in all states beginning with Alabama until it gets down to Texas, the comparitor is programmed to begin scanning column 3 at the scan line where it found the State of Texas, which was scan line 43 of the location template. Starting on scan line 43, Column 3 of the location template, the first city in Texas on the template is "Austin," no match is found. The cities of Dallas, and Fort Worth are scanned but no match was found. On the next scan, the comparitor found the word "Houston" in the document. It immediately inserted the numerals "004" in the column 3 register slots of the Receiver/Comparitor Match Buffers FIGS. 13A–13C (22, 23) following the forty-three (043) for the State of Texas. On the column 4 scan, the comparitor found a match for the community of Pasadena, Tex., which is a close suburb of Houston. When the match was found, the comparitor inserted the numeral one (01) into the column 4 slot of the Receiver/Comparitor Match Buffers FIGS. 13A–13C (22, 23). When the comparitor "stepped" to column five (5) it found that there was nothing entered in this column on this particular template. The comparitor inserted zeros (00) in the column five (5) slot of the Receiver/Comparitor Match Buffers (22, 23) and signaled "location scan complete" to the Receiver/Register Sensing Buffer FIGS. 13A–13C (19). This is a command for the Receiver/Register Sensing Buffer FIGS. 13A–13C (19) to "look" into the location slots of the Receiver/Comparitor Match Buffers FIGS. 13A–13C (22 and 23) to determine whether there are numbers in all location slots in either Receiver/Comparitor Match Buffers FIGS. 13A–13C (22 or 23). If so, the Receiver/Register Sensing Buffer FIGS. 13A–13C (19) uses that information to know that location scanning is complete. It temporarily stores the "057" location number and at the same time, it sets a "location scan complete bit" and activates the sensing unit to send a signal to the Template Control Unit FIGS. 1A–1C (17) to delete the copy of the location template in the Receiver/Key Word Comparitor FIGS. 13A–13C (21).

The following describes the process of determining the language used in the incoming document. The Receiver/Register Sensing Buffer FIGS. 13A–13C (19) is programmed to sense the empty register in the Receiver/Key Word Comparitor FIGS. 13A–13C (21) and send a command to the Template Control FIGS. 1A–1C (17) to activate the Industry Template Transport Control FIGS. 1A–1C (25). It also sends the Location numbers "057" to the Template Control Unit FIGS. 1A–1C (17) causing it to command the Industry Template Transport Control FIGS. 1A–1C (25) to enter the Location and Industry Template Storage Unit FIGS. 5A–5B at the Language Column 1 and scan through the Language Column Register (31) looking for the Location numbers "057". For the purposes of the explanation, it finds the numerals "057" in Language Column 1, FIGS. 5A–5B, (30), the English Language version of all Industry Templates. The Industry Template Transport Control FIGS. 1A–1C (25) sets the template counter to prevent selecting that template again until all others have been scanned. It then copies the first template listed in column 1 into the Receiver/Key Word Comparitor Register FIGS. 13A–13C (21) where a scan search is made looking for any matching Key words. For purposes of this explanation, none were found on scan line 001 (Accounting). A "scan complete" signal was sent from the Receiver/Key Word Comparitor FIGS. 13A–13C (21) to the Receiver/Register Sensing Buffer FIGS. 13A–13C (19) that is programmed to "look" into the Receiver/Key Word Comparitor Register FIGS. 13A–13C (21) to determine the condition of the register. It finds the Location template slots filled, but since it has set a "scan complete" bit from the Receiver/Key Word Comparitor Register FIGS. 13A–13C (21) it again stores the Location numbers "057", sets an "industry scan complete" bit and signals the Template Control Unit FIGS. 1A–1C (17) to delete the content of the Receiver/Key Word Comparitor Register FIGS. 1A–1C (21). Again, the Receiver/Register Sensing Buffer FIGS. 1A–1C (19) senses the empty Receiver/Key Word Comparitor Register FIGS. 1A–1C (21) and sends the Location Numbers "057" along with a command to the Template Control FIGS. 1A–1C (17) to activate the Industry Template Transport Control FIGS. 1A–1C (25). This causes the Industry Template Transport Control to enter the Location and Industry Template Storage Unit FIGS. 5A–5B at the language column register FIGS. 5A–5B, (31) and search for a match with the numbers "057". A match is found at scan line 2 of the Language Column 1 which is for the English language.

Because Industry Template "001" (Accounting) had already been selected, rejected and made unavailable to the next scan, Template number "002" for Agriculture is the next template selection. This corresponds to the number of the industry warehouse storage location for agriculture. The Industry Template Transport Control FIGS. 1A–1C (25) is programmed to immediately insert the number "002" into the Industry numeral slots, the only slots open at this time, in the Receiver/Comparitor Match Buffers FIGS. 13A–13C (22/23) and then copy the content of Industry Template 002 into the Receiver/Key Word Comparitor FIGS. 13A–13C (21) that is a component of Data Receiver/Key Word Comparitor No. 1 FIGS. 13A–13C (11).

When the industry template has been received, the comparison of key words in the Industry template with key words in the document begins as the template is "read" into the Key Word/Comparitor Register FIGS. 13A–13C (21). In this case, when the Receiver/Key Word Comparitor FIGS. 13A–13C (21) attempts to insert the document header into the Comparitor Match Buffers FIGS. 13A–13C (22/23) it finds these slots already filled with the exception of the slots for the number of the template that are open but empty at this time. It is programmed to "re-scan" when this condition occurs. It re-scans the header positions in the incoming document, and inserts the number of the template being used in the template number slots into the Key Word/Comparitor register FIGS. 13A–13C (21) and proceeds to the document content scan.

Referring to FIG. 3, the Agriculture designation 002 has already been inserted in the Comparitor Match Buffers FIGS. 13A–13C (22, 23). The Receiver/Key Word Comparitor FIGS. 13A–13C (21) begins the scan in column 1 of the template by searching the document for the word "farming". No such word is found. It then "looks" back at the template and begins a search for the word "agronomy," and again no such word is found. This process continues until the sixth scan where the word "crops" is found. It "marks" the scan line (6) and inserts the number six (06) into the Receiver/Comparitor Buffers FIGS. 13A–13C (22, 23) at the Industry column 1A slots in the register.

It should be noted at this point in the operation that the Receiver/Register Sensing Buffer FIGS. 13A–13C, (19) closes the column 1A slots in the register and opens the column 2 slots. This action takes place progressively on every scan until the register is filled. The Comparitor then begins on scan line six of column 2 and searches through the words "wheat" and "corn" with no match found. On the third scan, a match for the word "beans" is found. The Comparitor then marks scan line three and inserts the number three (03) into the Comparitor Match Buffers FIGS. 13A–13C (22, 23) at the column 2 slots of the register, closes those column 2 slots and opens the column 3 slots.

The Comparitor then "steps" to template column 3 and begins searching at scan line three for column three matching words. It searches for "soy beans" and finds no match. It then searches for the commonly paired words "string beans" and finds a match. It "marks" scan line two and inserts the number two (02) into the Comparitor Match Buffers (22, 23) at the column 3 slots of the register. This process is repeated for columns four (4) and five (5). The number four (04) is inserted in the register slot for column 4 and the number one (01) is inserted into the register slot for column 5. The Comparitor has now inserted the figures 0020603020401/ in the industry slots in the Receiver Comparitor Buffer FIGS. 13A–13C (22).

From left to right in the buffer the numbers are inserted as follows:

| | | |
|---|---|---|
| Nation location Id. | 057 | = The location for the US |
| State location Id. | 043 | = The location for the State of Texas |
| City location Id. | 004 | = The location for the City of Houston |
| Community location Id. | 01 | = The location for the Community of Pasadena |
| Column 5 =Vacant = | 00 | |
| The industry category | 002 | = The industry discussed (agriculture) |
| The industry application | 006 | = The application within the industry - Crops |
| The specific of the function | 03 | = The Bean Crop |
| The specific crop | 02 | = The "String Bean" crop. |
| The "what about it" | 04 | = The type soil required for string beans |
| More "what about it" | 01 | = How to prepare the soil for planting string beans |
| Supermine ™ number | 0000000385/ | |
| Template number | 0000000521/ | |
| Date Received | 11/28/00/ = Nov. 28, 2000 | |

Summary=0570430040100/0020603020401/0000000385/0000000521/11/28/00/00000

These fifty nine (59) digits and symbols represent receiving a document on Nov. 28, 2000, numbering it as Supermine™ Document 385, recording the template used to locate the document, 521, learning the language used in the document, English, "reading" it and learning that it pertains to the type soil and how that soil should be prepared if someone is going to plant string beans in Pasadena Tex. in the United States of America, all without a human having seen the document.

Refer to FIGS. 13A–13C for the process of storing documents. When the last slot in column 5 is filled, the comparitor signaled "industry scan complete" to the Receiver/Register Sensing Buffer FIGS. 13A–13C (19). This is a command for the Receiver/Register Sensing Buffer FIGS. 13A–13C (19) to "look" into the Industry slots of the Receiver Comparitor Match Buffer FIGS. 13A–13C (22) to determine whether there are numbers in all active register slots. If so, the Receiver/Register Sensing Buffer FIGS. 13A–13C (19) uses that information to know that industry scanning is complete, and that the industry template stored in the Receiver/Comparitor Register FIGS. 13A–13C (21) can be deleted. At the same time, it sets an "industry scan complete" bit and signals the Template Control Unit FIGS. 1A–1C (17) to delete the copy of the industry template in the Receiver/Key Word Comparitor FIGS. 13A–13C (21). The Receiver/Register Sensing Buffer FIGS. 13A–13C (19) is programmed to sense the empty register in the Receiver/Key Word Comparitor FIGS. 13A–13C (21) and send a command to the Template Control FIGS. 1A–1C (17) to activate the Match Buffer Transport Control FIGS. 1A–1C (26) and command it to copy the content of the Comparitor Match Buffer FIGS. 13A–13C (22) into the Assignment Number Register, a component of the Document Assignment Control buffer FIGS. 6A–6B, (24). This buffer has two registers. The upper register, (24-a) is identical to the Receiver/Comparitor Match Buffers FIGS. 13A–13C (22, 23) (also see FIG. 4), has the same number of slots for numerals and is dedicated to storing the content of the Receiver/Comparitor Match Buffer FIGS. 13A–13C (22).

When the Match Buffer Transport Control FIGS. 1A–1C (26) completes copying the data in the Comparitor Match Buffer FIGS. 13A–13C (22) into the Document Assignment Control buffer FIGS. 6A–6B (24) it sends a "task complete" signal to the Receiver/Register Sensing Buffer FIGS.

13A–13C (19), which commands the Match Buffer Transport Control FIGS. 1A–1C (26) to scan the content of the Assignment Number Register FIGS. 6A–6B (24-a) a component of FIGS. 6A–6B (24) to verify that the content of the Comparitor Match Buffer FIGS. 13A–13C (22) has been copied with no errors. If no errors are found, the Match buffer Transport Control FIGS. 1A–1C (26) sends a "task complete" signal to the Receiver/Register Sensing Buffer FIGS. 13A–13C (19) that commands the Match Buffer Transport Control FIGS. 1A–1C (26) to enter the receiver Incoming document Register FIGS. 13A–13C (18) to copy and store the last ten words of that register into a comparitor segment of the Match Buffer Transport Unit. When the integrity of the data stored in the Assignment Numerals register segment of the Document Assignment Control Buffer has been verified the Match Buffer Transport Control FIGS. 1A–1C (26) signals the Template Control FIGS. 1A–1C (17) to delete the content of Comparitor Match Buffer FIGS. 13A–13C (22), activate the Match Buffer Transport Control FIGS. 1A–1C (26) and command it to copy the content of the Comparitor Match Buffer FIGS. 13A–13C (23) into the Supermine™ Document Review File FIGS. 1A–1C, (38).

When the Match Buffer Transport Control FIGS. 1A–1C (26) completes copying the data in the Comparitor Match Buffer FIGS. 13A–13C (23) into the Document Review File FIGS. 1A–1C, (38) it sends a "task complete" signal to the Receiver/Register Sensing Buffer FIGS. 13A–13C (19) that commands Template Control FIGS. 1A–1C (17) to delete the content of Comparitor Match Buffer FIGS. 13A–13C (23). The receiver/Register Sensing Buffer FIGS. 13A–13C (19) detects the empty Comparitor Match Buffers FIGS. 13A–13C (22–23) and sends a command to the Match Buffer Transport Control FIGS. 1A–1C (26) to copy the last ten words of the incoming document into the Receiver/Key Word Comparitor register FIGS. 13A–13C (21). There the last ten words of the incoming document are compared with those in the Match Buffer Transport control FIGS. 1A–1C (26) to verify that the entire document has been received. If the last ten words of both documents match, the Receiver/Register Sensing Buffer FIGS. 13A–13C (19) sends a command to the Incoming Document Transport Control FIGS. 1A–1C (27) to copy the content of the Receiver/Incoming Document Register FIGS. 13A–13C (18) into the document text segment of the Document Assignment Control buffer FIGS. 6A–6B (24) It also signals the Template Control Unit FIGS. 1A–1C (17) to delete the ten words of the incoming document that were stored in the Receiver/Key Word Comparitor FIGS. 13A–13C (21) to verify that the entire incoming document had been received.

The document text segment FIGS. 6A–6B (24-b) of the Document Assignment Control FIGS. 6A–6B (24) is the same type register as the Assignment Number Register FIGS. 6A–6B, (24-a) but has multiple, series linked segments with the capability of activating the next register in the series when the first register approaches eighty percent fill with an incoming document. This design enables Supermine™ to accept very large documents or the complete texts of books. The document text register segment (24-b) of the Document Assignment Control buffer FIGS. 6A–6B (24) sends a "text received" signal to the Document Transport Control FIGS. 1A–1C (27) which then signals the Receiver/Register Sensing Buffer FIGS. 13A–13C (19) that the document has been copied and to delete the content of the Incoming Document register FIGS. 13A–13C (18). The Receiver/Register Sensing Buffer FIGS. 13A–13C (19) senses the absence of a document in the Receiver/Incoming Document register FIGS. 13A–13C (18) and signals the Busy Transfer Switch FIGS. 1A–1C (12) that Receiver No. 1 is idle and ready for another incoming document.

Referring to FIGS. 6A–6B, the Match Buffer Transport Control FIGS. 1A–1C, (26) has copied the document header from the Comparitor Match Buffer FIGS. 13A–13C (22) into the Assignment Number Register (24-a) of the Document Assignment Control FIGS. 6A–6B (24). At the same time, the Incoming Document Transport Control FIGS. 1A–1C (27) also copied the text of the document into the Document Text register (24-b) of the Document Assignment Control (24). Referring to FIG. 4, the two Document Assignment Control registers FIGS. 6A–6B (24-a, 24-b) are identical to the sixty-four bit Receiver/Comparitor/Match Buffers FIGS. 13A–13C (22, 23) and the register of FIG. 4. At this point the header portion of the Document Assignment Control FIGS. 6A–6B (24-a) register contains the same numerals as those used in previous FIG. 4 explanations.

Referring to FIGS. 6A–6B (24), the two principal registers in the Document Assignment Control FIGS. 6A–6B, (24-a, 24-b) are the Assignment Number Register (24-a) and the Document Text Register (24-b). They are identical with the exception of size. In effect, they are "paired" in a series/parallel configuration that enables the header and the document text to be copied, transported or accessed as a complete document or the header can be accessed singly by accessing the first sixty four slots in the Assignment Number Register. The purpose of this configuration is to enable Supermine™ to transport the content of the Document Assignment Control FIGS. 1A–1C, (24) into the storage facility as one document with the header occupying the first sixty-four bits of the register. Immediately following that operation it is necessary to copy only the header of the document to an active inventory file and into an off premise inventory file that is a duplicate of the on premise unit.

Referring to FIGS. 6A–6B, the following will describe specifically how the Document Assignment Control FIGS. 1A–1C, (24), same as FIGS. 6A–6B (24), moves the incoming document into the proper Nation storage location in a manner to facilitate rapid identification and retrieval. In this same operation, the entire document, including the header, is copied into an off premise back-up storage unit FIGS. 1A–1C, (39) which is a duplicate of FIGS. 6 A–6B and 10A–10B. Referring briefly to FIG. 4, notice the register positions of the location numerals stored in the Receiver/Comparitor Match Buffer (22). The numbers 057, along with the other location numerals, are the first numbers transmitted to the Warehouse Storage Assignment Buffer FIGS. 6A–6B, (29).

Referring to FIGS. 6A–6B, the Warehouse Storage structures for each Nation (folders) described in FIGS. 10A–10B are arranged alphabetically across the mid-portion of the figure. There can be up to 399 individual nation storage locations, each served by multiple Warehouse Storage Assignment Buffers FIGS. 6A–6B, (29) consisting of a multiplicity of sixty-four bit registers (only two of which are shown for clarity). The lower registers are the Nation Storage Location Number Register/Connectors FIGS. 6A–6B (32). These registers have permanent connections to the input of each Nation Storage unit FIGS. 6A–6B (15). Also FIGS. 10A–10B. For example: The input of storage location number three (003) for Australia is permanently connected to the (003) slots in the lower register. The United Kingdom storage location is permanently connected to the (051) slots and the United States storage location is permanently connected to the (057) register slots. The Warehouse Storage Assignment Buffer FIGS. 6A–6B, (29) is unique in that each nation number register segment contains an electronic switch (similar to the PNPN transistor switch used in Time Division Switching and many wave shaping functions) that is normally non-conducting. This controls the path into the Nation Storage Locations (15) holding them non-conducting (open) so no data can be entered into the Nation storage Location via that particular register.

Referring to the circular insert on FIGS. 6A–6B, a pair of PNP transistors is configured to operate as a very fast electronic switch. The negative side of the bias circuit for the switch is connected to the location slots of the Nation Location Storage Number Register/Connector FIGS. 6A–6B (32) and the positive side of the bias circuit is connected to the Assignment Match Buffer Register FIGS. 6A–6B (33). The Assignment Match Buffer Register (33) is paired with the Nation Storage Location Number Register/Connector (32) in a manner to provide a transmission path into the assigned Nation storage location for the document being stored, while holding the input path to all other storage locations open (non-conducting). This assures that the document will be inserted only into the assigned storage location, and no other multiple of the Document Assignment Control FIGS. 6A–6B (24) can enter that specific Nation storage location while transmission is in progress. It should be understood that with this parallel type configuration other pairs of Warehouse Storage Assignment Buffers FIGS. 6A–6B (29) could be actively transmitting into other Nation Storage locations while this is in progress.

The Document Assignment Control FIGS. 6A–6B, (24) commands the Document Transport Control FIGS. 6A–6B, (28) to transmit the document into the Warehouse Storage Assignment Buffer FIGS. 6A–6B, (29). The content of the Document Assignment Control FIGS. 6A–6B (24) begins to fill the Assignment Match Buffer register FIGS. 6A–6B, (33). When the numerals "057" in the match buffer "match" those in the Nation Storage Location Number Register/Connector FIGS. 6A–6B (32) there is a positive enabling pulse applied across the bias circuit for the PNPN switch. This raises the "trigger" voltage causing it to conduct, thereby closing a low impedance transmission path from the Assignment Match Buffer FIGS. 6A–6B, (33) through the "057" slots in the Nation Storage Location Number Register/Connector FIGS. 6A–6B, (32) and into Nation Storage location 057. This enables Supermine™ to insert the complete document only into Storage Location 057 that is, in reality, a huge computer folder. The document, along with the Warehouse Storage Assignment header, must now be inserted into the Nation Storage Location "057" (15) by discrete fields of industry. The positional configuration of the data that was inserted in the Receiver/Comparitor Match Buffer FIGS. 13A–13C (22) makes this much simpler.

For ease of explanation this disclosure assumed that all documents originating or pertaining to the United States were related to one of the fifty States. This may not be true in all circumstances or for all Nations. However, the numbering scheme can be easily extended to more than the fifty states if needed or location storage folders established for other major segments of society in the US or the world. Referring to the Location Template of FIG. 2, in the storage unit for the United States (057) there is a shelf (folder) for each state. These shelves are listed in alphabetical order with Alabama being first (057001) and Wyoming last (057050). Notice that Texas is the 43$^{rd}$ State in Alphabetical order and carries the assignment (057043). Documents are stored on the warehouse nation shelves in the order of the States plus any other shelves that carry numbers not associated with a particular state. The registers associated with each shelf (folder) have electrical connections to a multiplicity of input transmission paths to the Warehouse Storage Assignment Buffers FIGS. 6A–6B (29) that contain the paired Assignment Match Buffers FIGS. 6A–6B, (33) and the Nation Storage Location Register/Connectors FIGS. 6A–6B, (32). Each shelf (folder) for each state is further sub-divided into segments each containing space for registers to contain documents relating to up to 999 fields of endeavor ranging from Accounting through Zoology.

Referring to FIG. 2, this is the Location Template configuration that is a "pattern" for the way the registers are configured within the Storage Locations. As stated before, the primary location column 1 of the location template represents the 399 freestanding storage location units. Column 2, the secondary location column, represents the State or, in the case of other nations, the Provinces. This column corresponds to the horizontal shelves of the freestanding nation storage unit. Looking at template 2 is the same as looking down on the top shelf of FIGS. 10A–10C. This will give an idea of how the horizontal shelves are laid out.

Referring to FIGS. 6A–6B, the lower portion of FIGS. 6A–6B represents the freestanding shelf structure 057 for the United States. Shown inside the 057 structure are three examples of assignment registers that have been "copied" into the 057 shelf structure. The first is for Alabama, the second for Texas and the third for Wyoming. Each state is assigned an entire "shelf" in this warehouse. For this disclosure the warehouse storage unit for the United States (057) contains fifty separate "shelves", FIGS. 6A–6B (16). Consider first the register shelf for the State of Texas, i.e., the center shelf. Note that the register numerals in this example read right to left because they were inserted into the register in a specific sequence from left to right with the 057 numerals the first to be transmitted.

The location shown in the Assignment Register FIGS. 6A–6B (24-a) has the numerals 057 (US) in the first three slots. The numbers for the State of Texas (043) are in the next three slots. This means that there is a large storage shelf (folder) for the State of Texas containing sufficient registers to store documents relating to all 999 fields of industry. In the example shown, the numerals 002 are in the first slots of the Industry segment of the register. This is the number assigned to the agriculture industry. All documents relating to agriculture in Texas will be stored in this specific position on the Texas storage shelf (043). There are other registers on that same Texas shelf that will contain a location 001 for Accounting, a location space (006) for storing documents relating to Oil and Gas, a location 049 for tax data etc., all stored in the specific industry position in the register that conforms to industry column 1 of the industry template.

Referring to FIGS. 2 and 3, the configuration of the scan lines and columns on these templates will compare with the configuration of the storage locations within the shelf locations for the various States. In the example used, the first register shown is for the State of Alabama and carries the numerals 057 plus the numerals 001 in the location slots. This identifies the document with Alabama and it will be listed first in the multiplicity of state registers. Now notice that the first three numerals in the Industry segment of the Alabama register are 036. Now refer briefly to the assignments shown on column 1 of FIGS. 5A–5B (30) and see that the numerals 036 are for the Transportation Industry. This tells us that there will be a storage shelf location (folder) for all documents concerning the transportation industry in the State of Alabama along with as many as 998 other storage locations or folders for other industries.

As a further example, the last register shown on FIGS. 6A–6B carries the numbers 057050 (right to left). This tells us that this register is for the State of Wyoming. The first three Industry slots for this register carry the numerals 006. Now refer to the Industry location assignments on FIGS. 5A–5B column 1 (30) to see that the numerals 006 identify the Oil and Gas Industry. Wyoming will have an Oil and Gas folder for all documents concerning Oil or Gas exploration, drilling, production etc. in the State of Wyoming. There will be a similar folder for Oil and Gas in the folders for the States of Texas, California, Arkansas, Oklahoma and other states having oil and gas industries. In our example of planting string beans in Pasadena, Tex. we previously explained the assignment numbering system below the primary industry numerals (002). The numbering system is the same for all industries. The industry identification of documents can be taken down to very fine grain detail by simply continuing the template numbering schemes. It will be possible to call up documents that describe the type drill bit needed to drill for oil in Odessa, Tex.

In summary, Supermine™ provides a storage warehouse for all nations plus other major divisions as desired. Within that huge warehouse, there are storage shelves (folders) for all states or provinces or major divisions within that nation. Within the folder for all states there are individual folders for the 999 major divisions of industry or fields of endeavor. Each industry folder is further subdivided into the specifics and details of that industry or field of learning or study.

When the complete document has been received, the Document Assignment Control FIGS. 6A–6B (24) commands the Document Transport Control FIGS. 6A–6B (28) to copy the document into the Warehouse Storage Assignment Buffer FIGS. 6A–6B, (29). From here the header and document text pass through the protective "gating circuitry" FIGS. 6A–6B, (33) and are inserted into the proper Nation Location Warehouse Storage Location and the Industry Storage Location within that Nation Location via the Nation Location Storage Register/Connector FIGS. 6A–6B (32). When the Warehouse Storage Assignment Buffer FIGS. 6A–6B, (29) becomes empty, a "document received" signal is returned to the Document Assignment Control, FIGS. 6A–6B, (24). This prompts the Document Assignment Control, FIGS. 6A–6B, (24) to command the Document Transport Control FIGS. 6A–6B, (28) to create a "select all" command to copy the content of the Assignment Number Register FIGS. 6A–6B (24-a) (the document header) into the on premise Supermine™ inventory unit, FIG. 14. This is also FIGS. 1A–1C, (37).

Figure 14:
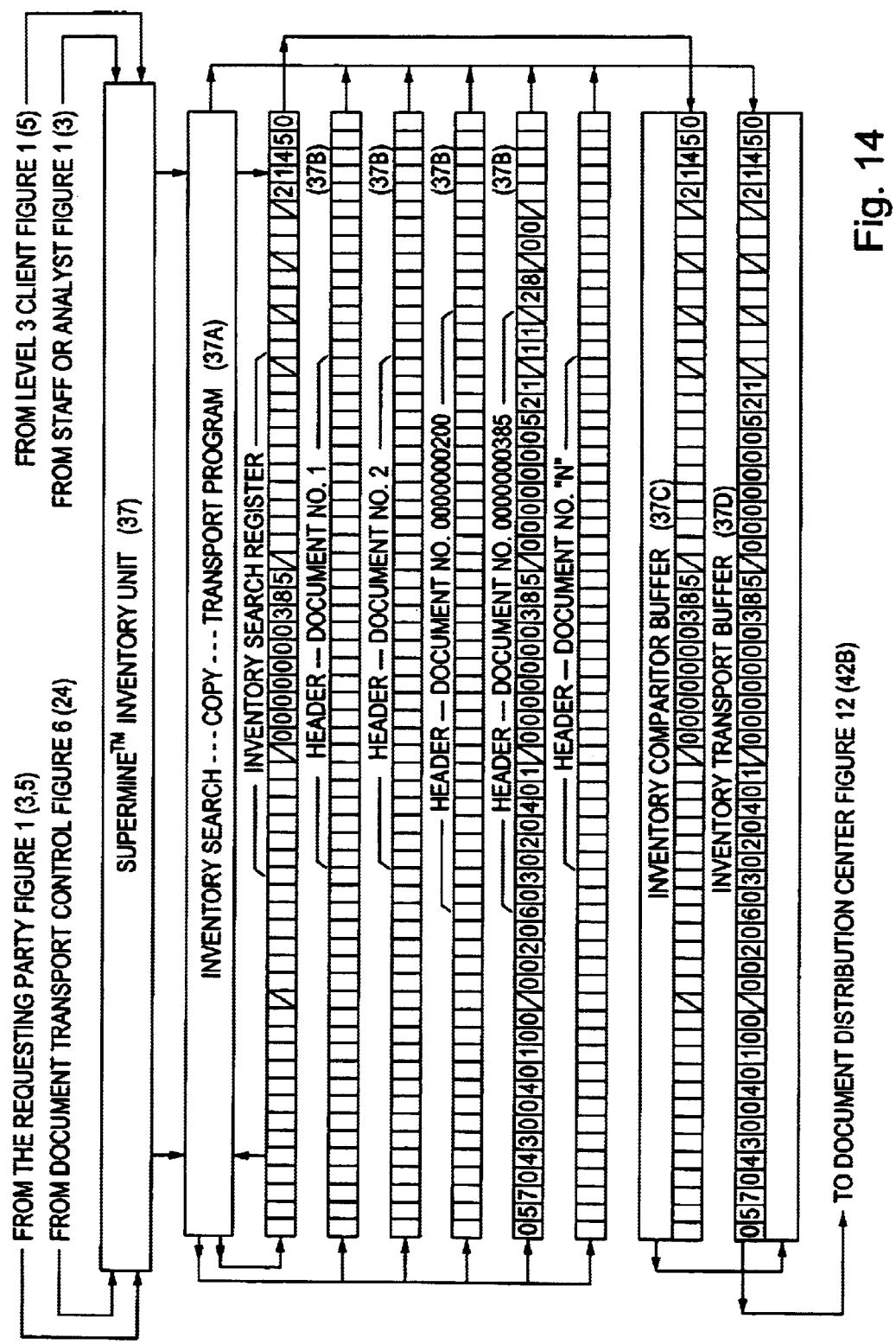
FIG. 14 is a block diagram showing an illustrative Supermine™ inventory storage facility in accordance with an embodiment of the invention.

The Supermine™ Inventory Unit FIG. 14 (37) returns a "document received" signal to the Document Assignment Control, FIGS. 6A–6B, (24). This prompts the Document Assignment Control, FIGS. 6A–6B, (24) to command the Document Transport Control FIGS. 6A–6B, (28) to create a "select all" command to copy the content both the Assignment Number Register FIGS. 6A–6B (24-a) (the document header) and the Document Text register, FIGS. 6A–6B (24-b) into the off premise Supermine™ Storage Warehouse FIGS. 1A–1C, (39). The off premise warehouse is a duplicate of the warehouse of FIGS. 10A–10B and is populated exactly the same as described above. The remote Assignment Match Buffer (off premise duplicate of FIGS. 6A–6B, (33)) returns a "document received" signal to the Document Assignment Control, FIGS. 6A–6B, (24) which sends the "document received" signal to the on premise FIGS. 6A–6B, Document Assignment Control (24). This prompts the Document Assignment Control FIGS. 6A–6B, (24) to signal the Document Transport Control FIGS. 6A–6B (28) to enter the Assignment Number Register (24-a) and to copy the 64-bit header into the Supermine™ off premise Inventory Unit, FIGS. 1A–1C, (37). The off premises inventory unit returns a "document received" signal to the Document Assignment control FIGS. 6A–6B, (24), same as FIGS. 1A–1C (24). This triggers the Document Assignment Control, FIGS. 6A–6B, (24) to delete the content of the Assignment Number Register FIGS. 6A–6B (24-a) and the Document Text Register FIGS. 6A–6B Figure (24-b) making them ready for another document.

These operations insure that every document stored the Supermine™ Warehouse also has the header for that document stored in the Supermine™ Inventory Unit, FIGS. 1A–1C, (39). In addition, every document stored in Supermine™ Warehouse has a copy of the document stored in the remote, off premise Supermine™ Warehouse FIGS. 1A–1C (34) and the off premise Inventory Unit FIGS. 1A–1C (39). The method of storing documents in, and retrieving documents from, these off premises back-up facilities is duplicated with those for the primary Supermine™ installation. The use of multiple components such as the Data Receiver/Key Word Comparitor FIGS. 13A–13C (11), Template Control Units FIGS. 1A–1C (17), Document Assignment Control Units FIGS. 6A–6B (24), and liberal provisioning of registers and buffers at all stages of the process enable Supermine™ to process incoming documents in parallel operation rather than serially. This results in a continuous document acquisition operation unhindered by overloaded or busy components.

At this point of the disclosure we have described how Supermine™ can insert a pre-prepared template into a polling unit programmed to poll the internet or other data sources, find a document relative to a specific subject, receive the incoming document in any one of several languages, note the date received, assign a unique Supermine™ document number, electronically "read" the document and convert key words contained in the document into fifty-nine numerals and symbols and use them to store the document in a storage location for a specific nation. Further, we have explained how the documents can be indexed to identify the industry and the specifics of the industry that are mentioned in the document. We have explained how to copy the document, along with the identifying header, into a specific location in a specific State within the storage location. This is done without a human ever seeing or handling the document.

The Document Retrieval Process

Referring to FIGS. 1A–1 to 1A–3, the Supermine™ document retrieval process begins with the client who has the option of purchasing three levels of access. Referring to FIGS. 1A–1C, 7, and 5A–5B, access level one enables clients to enter Supermine™ at the analyst level and obtain assistance from the analyst or a staff member in taking data from Supermine™ Access level two enables client access to the analyst plus direct access to the programmable polling unit. This level of access grants clients access to the Supermine™ search templates and allows them to copy templates directly into the Search Template Registers, FIGS. 1A–1C, (4). These templates "trigger" the programmable polling unit FIGS. 1A–1C, (1) to search the Internet and other sources for documents that "match" the key words of the search templates. The resulting documents are processed into Supermine™ storage as previously described. The method of delivering those documents to the client, analyst or staff member who requested the document is described in the retrieval process. Access level three is virtually unlimited access to Supermine™ including direct access to analyst assistance, the programmable polling units and the capability of retrieving documents directly from Supermine™ warehouse as described in this disclosure.

This disclosure teaches an efficient means of electronically communicating with Supermine™ to specify the data needed. The time required to locate, access and retrieve documents is greatly reduced by using questionnaires that lead the client, Supermine™ staff or analyst to reduce the data request to concise key words, in a specific order, that describe the essentials of the data needed. This eliminates the majority of human intervention when clients desire access or stored data. We have previously explained that the information contained in the Sixty-Four Bit Comparitor Match Buffer FIGS. 6A–6B (22) (the document header) has been made an integral part of the document that was processed through the Supermine™ system. The document was stored in specific Supermine™ locations using the location and industry numbers that were developed in the storage process. This enables Supermine™ to retrieve the document by "finding" any combination of those assignment features.

Referring to FIG. 4 and to the six segments of the Sixty-Four-Bit Comparitor Match Buffer FIGS. 13A–13C (22), the Supermine™ system is designed to provide several ways to select the document for retrieval. These are:

1. By the Nation, State, City, Community or specific location numbers (i.e., the first fourteen slots in the register).
2. By the Industry, and various functions of that industry (i.e., the next fourteen slots in the register).
3. By the Supermine™ document number (i.e., the next eleven slots in the register).
4. By the number of the industry Template that was used in the Receiver Key Word Comparitor Register (21) to "read" and select the incoming document for storage (i.e., the next eleven slots in the register).
5. By the date the document was received if used in combination with other identifying data. If only date received slots are used for retrieval, it could result in an output of all documents that were acquired and stored on the date specified. The five vacant register slots shown as spare on the FIG. 4 drawing are used in some applications for client or Supermine™ employee identification numbers or to determine the language used in the incoming document.

These fifty-nine numerals and symbols being inserted into predetermined positions in a specific order enable Supermine™ to use mathematical probabilities to sharply reduce document retrieval time and to exponentially increase the success rate of document retrieval. Clients, Industry Analyst and Supermine™ staff members access Supermine™ at all hours, seven days/week/fifty-two weeks/year from all over the earth using a wide variety of computer protocols, program platforms and languages. In high speed, high volume data transactions it is essential that client retrieval time per document be held as low as possible. In addition to using mathematical probabilities, Supermine™ also utilizes unique circuitry and hardware configurations to reduce document retrieval time by reducing scanning time in look-up tables etc.

Block Diagram FIGS. 1A–1 to 1A–3 describes how documents stored in Supermine™ Warehouse are identified, located and retrieved from the Warehouse Storage Units and made available to clients, Supermine™ staff and Analysts. A primary objective of Supermine™ is to automate, insofar as possible, the document retrieval process. This begins with providing clients and staff members with a questionnaire that will enable them to input their requests for data directly into Supermine™. For a better understanding of this procedure a description of the design and use of the questionnaire is in order at this point in the disclosure.

Referring to FIG. 7, the questionnaire is designed to obtain words from the clients that are commonly used in the industry or field of knowledge or the area of commerce he is interested in. The analyst who prepared the templates and the questionnaires are experts in those industries and are intimately acquainted with their terminology. They prepared the search templates and questionnaires using key words specific to those industries. In the retrieval process these key words are converted into numerals that are inserted into the various registers. In addition, the search templates and the questionnaires are designed to elicit answers in the same order that the resulting numerals are inserted into those registers. FIG. 7 is a prototype of a data search questionnaire that clients, staff and analyst use to search for documents containing information they need. It is designed to reduce language barriers and verbal communication between Supermine™ analysts and clients retrieving documents from Supermine™.

When answered, the questionnaire will provide sufficient information to enable Supermine™ to retrieve any document stored in Supermine™. The information requested by FIG. 7 is self-explanatory with the exception that the order of the questions is important in that this answer sequence is used to prepare a template with the words in specific register slots. These words are then converted into numerical retrieval templates. It should be understood that the templates and questionnaire are not limited to typing the answers into the Retrieval Search Template FIGS. 8A–8B (34-*a*). The document retrieval process can also be voice activated, i.e. "Please say the name of the industry you are interested in now," or controlled by a mechanized answering process, i.e. "If you want a document that originated in the US press one", in the State of Ohio press two etc. When voice recognition has progressed sufficiently to overcome national and regional dialects and widely differing speech patterns, the Supermine™ system will make use of that technology.

Referring to FIG. 7A, every client data request carries a client's account number. While not shown on the FIG. 7A example, every Supermine™ analyst and staff member is also assigned an individual identification number with the same number of digits as the client's account number but having a different number series. These digits are placed in the same FIG. 7A position as the client's account number. The client's answers to the FIG. 7 questionnaire (FIG. 7A) are entered into the Retrieval Search template Polling and Match segment FIGS. 1A–1 to 1A–3, (34-*a*), (also FIGS. 8A–8B) where they are converted into numerals usable as a template to search the warehouse storage unit, FIGS. 10A–10B for the desired document.

Retrieving documents from Supermine™ warehouse begin with the Location and Industry templates. Referring to FIGS. 2 and 3, notice that the template column numbers correspond to the numeral position slots in the Comparitor Match Buffer FIGS. 13A–13C (22). The column numbers also conform to the register slots of FIG. 4. In addition, a specific scan line identifies each major aspect of the template. This technique is used to get the numerals in the correct register slots in the event an incoming document contains a reference to duplicate, or to only one, aspect of the location or the industry. The importance of programming Supermine™ using the columns of the template and the scan line positions to prevent inserting location or industry numerals out of sequence in the registers will become apparent as the retrieval disclosure progresses.

Referring to Block Diagram FIGS. 1A–1C, the client's request for data enters Supermine™ through the protocol converters (6) into the Password gate of the Security Screening unit (7) that is programmed to require the client's password. When the password is properly entered, the security program passes the data request to the Account Number segment of the Security Unit (7). The Security program requests the client's Supermine™ account number. Encoded in this number are digits corresponding to the level of access the client has purchased. Refer to the examples of the client's account numbers shown on FIGS. 1A–1C (7) and notice the arrangement of the account digits. For simplicity, the highest, most significant digit is for level three (00000332). When the number three is in the most significant digit position in the account number the client has purchased access level three. With this configuration there could be many levels of access to different Supermine™ services depending upon the market demand. There are numerous encoding schemes that could be used in conjunction with the account number to denote the access level purchased by the client. The client data request is passed to the Client Access Level Port (5) that distributes the incoming service requests to the proper Supermine™ input device depending upon the access level purchased.

The access paths for the three levels of entry into Supermine™ will now be described. Supermine™ staff and industry analyst are assigned level three and given discrete identification numbers in lieu of an account number. With that exception, data requests from Supermine™ employees are processed the same as data requests from level three clients. If question three of the Supermine™ data request is answered "Level 1" by the client, the data request is passed directly to a Supermine™ industry analyst who uses the address provided by the client to contact and assist the client either directly by voice or by the internet address.

If the client has answered "Level 2" for question three, requesting direct polling capability, the request is routed into the Search Template segment, FIGS. 1A–1C, (4) of the Programmable Polling unit FIGS. 1A–1C (1). Copying the key words provided by the client directly into the polling unit results in a direct poll of the Internet or other sources to search for the data requested. The returned documents, if any, are processed through the Supermine™ system as described in this explanation.

Referring to block diagram 1A, (34), if the client answers "Level 3" on question three of the Supermine™ data request questionnaire FIG. 7A the Client Access Level Unit FIGS. 1A–1C (5) directs the request into two parallel paths: The first path is to the Supermine™ Document Distribution Control, FIGS. 1A–1 to 1A–3, (41) or FIG. 11 that contains (among other units) the Supermine™ Data Request File FIGS. 1A–1 to 1A–3, (40) (also FIG. 11). This file is composed of a multiplicity of paired registers. One register will accept and contain the client's data request in its original form. The other member of the pair will contain the client's FIG. 7A data request after converting the words into numerals has modified it so it can be compared with the pre-prepared templates, FIGS. 2 and 3.

Each Data Request File, FIGS. 1A–1 to 1A–3, (40) contains circuitry and programming to insert incoming data requests into a numbered file arranged to offer stored data requests for comparison in a "first-in-first out" arrangement. In addition, circuitry and programming is provided to prevent selecting and sending the contents of a data request register to the Data Request/Received Document Comparitor FIGS. 1A–1 to 1A–3, (41-b) or FIG. 11 a second time during the comparison process. Once the register has been selected and "no match found", that data request is "marked" and made busy to further comparison until all other stored data requests have been compared. The comparitor function of the Data Request File is described later in the disclosure.

The second path for the client's Data Request is to the Document Retrieval Control FIGS. 8A–8B (34), the same as FIGS. 8A–8B. That unit transmits the client's data request into the Retrieval Search Template section, FIGS. 8A–8B (34-a) which is very similar to the Search Template Register (4) of FIGS. 1A–1C. However, this search template is programmed to search the Supermine™ warehouse instead of the Internet. The Retrieval Document control Template FIGS. 8A–8B (34) is a polling and scanning unit that returns a prompt to the client, analyst or staff member leading them to type the data request FIG. 7A into the Retrieval Template Format section (34-b).

For purposes of the document retrieval disclosure, assume the client or Supermine™ staff person typed the data request answers of FIG. 7A into the Retrieval Search Template (34-b) of FIGS. 8A–8B. The key words from the client's data request FIG. 7A are copied by the Retrieval Search Polling and Match segment, FIGS. 8A–8B (34-a) into Template Format section FIG. 8A–8B (34-b) that receives the key words from the client questionnaire FIG. 7A and places them in the proper register slots to conform to the Supermine™ template format. The order of the questionnaire FIG. 7A replies conforms to the order of placement of the Key Words in the template Format Section FIGS. 8A–8B (34-b). The Template Format section (34-b) is actually a large register formatted in six parts to correspond to the positions of the numerals of the Comparitor Match Buffer of FIGS. 13A–13C and the Assignment Match buffer of FIGS. 6A–6B (33).

The first thirteen slots plus one space of the Template Format Register FIGS. 8A–8B (34-b) are for the Nation/State/City/Community location numerals. The second thirteen slots plus one space is for the industry numerals. The next ten slots plus one space is for the Supermine™ document number. The next ten slots plus one space is for the Industry template number that was used to retrieve the document. Since the date received is already recorded in the header of the requested document, the eight date-received slots in the register are not needed at this point of the retrieval process. For that reason they are used for the account number of the client or the identity number of the industry analyst or the staff employee. In this operation the sixth part of the register, the normally unused slots, is for recording the language used in the document.

As the words are received, they are placed in the proper order and format by the Template Format section FIGS. 8A–8B (34-b) of the Document Retrieval Control Unit FIGS. 1A–1 to 1A–3 (34) or FIGS. 8A–8B (34). Any words that refer to the Nation, State, or Province, City or specific location are "read" into the location section of the register. Industry words are inserted into the industry segment of the register in the proper order. Since there is no word-to-numeral translation needed for the Supermine™ document number and client account or staff identity number they are inserted directly into the Retrieval Template Register FIGS. 8A–8B (34-c) when received by the Retrieval Search Polling and Match segment FIGS. 8A–8B (34-a). The person requesting the document will input the industry template number directly into the Retrieval Template if that number is known at the time of the request. There will, however be times when the industry template number is not known in advance and must be derived by using the FIG. 7A questionnaire.

Referring to FIGS. 8A–8B, when the words from the answers to the data request form FIG. 7A have been inserted into the Template Format Section FIGS. 8A–8B (34-*b*) of the Document Retrieval Control Unit FIGS. 8A–8B (34) a "word complete" signal is sent from the Template Format Segment of (34-*b*) to the Search Template Segment (34-*a*) of FIGS. 8A–8B, (34.). This prompts it to poll the Location and Industry Key Word Template Storage Unit FIGS. 5A–5B, (8) searching for location and industry templates with words matching those in the Template Format segments of FIGS. 8A–8B (34). In this search process, the Search Template FIGS. 8A–8B (34-*a*) sends each word into the Location and Industry Key Word Template Unit FIGS. 5A–5B and receives the numeral that corresponds to that word. The numeral is placed in the correct register slots in the Retrieval Template Register FIGS. 8A–8B, (34-*c*). For example, the Search Template FIGS. 8A–8B (34-*a*) transmits the word "US" into the location portion of the Location and Industry Key Word Template Storage Unit FIGS. 8A–8B, and receives in return the numerals 057. These numerals are stored in the Nation position of the retrieval Template Register FIGS. 8A–8B (34-*c*). When the Nation slots are filled a "nation slots filled" signal is sent from the Retrieval Template Register, FIGS. 8A–8B, (34-*c*) to the Search Template FIGS. 8A–8B (34-*a*) then transmits the word "Texas" into the Location and Industry Key Word Template Storage Unit FIGS. 5A–5B. The scanner in that unit works down through the alphabetically listed state templates and on the scan line for Texas, finds a match and inserts the numerals 043 in the state position of the Retrieval Template Register FIGS. 8A–8B (34-*c*). The same action takes place for the words Houston, and Pasadena. When complete, the Retrieval Register FIGS. 8A–8B, (34-*c*) will contain the numerals 05704300401 in the location register slots.

When all location slots are filled in the Retrieval Template Register FIGS. 8A–8B, (34-*c*) a "location template complete" signal is sent to the Search Template FIGS. 8A–8B (34-*a*) that opens the industry section of the Retrieval Template Register FIGS. 8A–8B (34-*c*) and sends the numerals 057 into the Location and Industry Key Word Template Storage unit FIGS. 5A–5B (8). It will poll the location numbers registers looking for a matching numeral 057 that was inserted by the analyst into the location numbers portion of the Location and Industry Key Word Template Storage, FIGS. 5A–5B. The analyst had previously inserted the 057 at the language column that matched the language used to construct the template. Referring to FIGS. 5A–5B, the Location and Industry Key Word Template Storage Unit, FIGS. 5A–5B is a huge look-up table that contains three interconnected segments. It is programmed to respond with corresponding numerals each time a search is made using words. It will also respond with corresponding words each time a poll is made using numerals.

There are two methods provided for finding the correct language for the document search. If the client types the word "English" into the Retrieval Search Template FIGS. 8A–8B (34-*a*) indicating the language he wants is English, the word "English" is stored in the language section of the Template Format section of FIGS. 8A–8B, (34-*b*) i.e. the last three slots. In this case, when the location numerals have been retrieved from the Location and Industry Key Word Template Storage Unit FIGS. 5A–5B, the Search Template FIGS. 8A–8B, (34-*a*) sends the word "English" into the template storage unit (FIGS. 5A–5B) and receives the numerals 01 in reply which is column 01 of all templates. This column is reserved on all templates for the English language. These numerals are temporarily "set" in the language slots in the Template Format section of FIGS. 8A–8B, (34-*b*) and are transmitted with each word that is sent into the Location and Industry Key Word Template Storage Unit FIGS. 5A–5B. This forces all industry word searches to be made only in column 1 of the storage unit that is reserved for the English language. If the match had been found in column 2, the numerals 02 would have been inserted in the language section of the Template Format section FIGS. 8A–8B (34-*b*) and all searches would be made in the Spanish language etc.

The second method for determining the language is to be used when the client does not indicate what language is used in the data he is searching for. It can also serve as a verification of the other language search method if there is any doubt about the language. The Search Template, FIG 8, (34-*a*), is programmed to transmit the nation numerals 057 into the location numerals register of the Location and Industry Key Word Template Storage Unit (FIGS. 5A–5B) as soon as all location register slots are filled in the Retrieval Template Register FIG. 8, (34-*c*). As mentioned previously, when the industry analyst completed the "US" templates in the English language, he copied the numerals 057 into the nation numerals segment of the Location and Industry Key Word Template Storage Unit FIGS. 5A–5B, at column 01 which is reserved for the English language.

When the Search template FIG. 8, (34-*a*) transmits the numerals 057 into the Location Numbers Register of the Location and Industry Key Word Template Storage Unit FIG., 5, the numbers 057 find a match in language column 01. This stops the polling of the language columns at column 01 and a "match signal" is sent to the Search Template FIG. 8. (34-*a*) which "sets" the numerals 01 into the Retrieval Template Register FIG. 8, (34-*c*) at the language segment slots that were never closed. It cannot enter the 01 column number in the industry position because at that time the industry slots are still closed. When the "location template complete" signal was sent from the Retrieval Template Register FIG. 8, (34-*c*) to the Search Template (34-*a*), that signal was also used by the Search Template to open the industry register slots in the Retrieval Template Register FIG. 8, (34-*c*). When the signal was received that the industry slots were opened, the Retrieval Search Template FIG. 8, (34-*a*) began polling column 01, the English language column, of the template storage unit FIGS. 5A–5B (8) looking for a word match between the words provided by the client that were stored in the industry segment of the Template Format Section (34-*b*) and the industry templates stored in the Location and Industry Key Word Template Storage Unit FIGS. 5A–5B (8).

The Retrieval Search Template FIGS. 8A–8B (34-*a*) transmitted the word "agriculture" into column 01 of the Location and Industry Key Word Template Storage Unit FIGS. 5A–5B (8). On the first scan, since 001 represents accounting templates, no match was found. On scan 2, a match was found for the word "agriculture" and the numerals 002 were returned and inserted into the industry slots of the Retrieval Template Register FIG. 8, (34-*c*). The same action is repeated for the words crops, string beans, soil and planting, with the resulting numerals stored in the Retrieval Template Register FIG. 8, (34-*c*) in the same order as those on the Supermine™ standard register column assignment scheme of FIG. 4. Referring to FIGS. 5A–5B, for drawing clarity, only the Industry Template primary column numbers are shown, i.e. 002. Refer to FIG. 3, the Industry Template, for an understanding that all industry columns, 1, 1A, 2, 3, 4, 5 are included in FIGS. 5A–5B, English column 01 and subsequent language columns 02 through "N". If the language used on the returned Supermine™ data search questionnaire FIG. 7A had specified the Spanish language, no match would have been found in the search of column 01 and the scan would have proceeded to column 02 and all words returned in the Spanish language. When the industry slots are filled, an "industry Template complete" signal is sent from the Retrieval Template Register, FIGS. 8A–8B, (34-c) to the Retrieval Search Template, FIGS. 8A–8B, (34-a). That signal is used to open the Client Account number slots in the Retrieval Template register FIGS. 8A–8B, (34-c).

When the Retrieval Search Template FIGS. 8A–8B, (34-a) senses the open Retrieval Template Register slots in the account number positions, it signals the Template Format Section FIGS. 8A–8B (34-b) to move the client's account number into the account number slots of the Retrieval Template Register FIGS. 8A–8B, (34-c). Note that Supermine™ does not know the Supermine™ document number at this time, and the document we are searching for already has the Supermine™ document number embedded in its header and therefore it is not needed at this point. Also note that the vacant Supermine™ document number and Industry template number are used when the client or staff inputs these numbers directly into the Retrieval Search Template FIGS. 8A–8B, (34-a). The numbers are moved into the Retrieval Template Register FIGS. 8A–8B, (34-c) as previously described. This provides a very efficient document retrieval process for Supermine™ Staff, Analyst and selected clients.

A timing sequence is built into the Retrieval Template Register FIGS. 8A–8B, (34-c) in the event the client does not answer all FIG. 7A questions. When no additional numerals are received into the Retrieval Template Register FIGS. 8A–8B, (34-c) after five milliseconds, a start signal is sent to the Retrieval Document Transport, FIGS. 8A–8B, (35). This start signal causes the Retrieval Document Template Transport FIGS. 8A–8B (35) to copy the content of the Retrieval Template Register FIGS. 8A–8B (34-c) into one of a multiplicity of Scan Control/Comparitors FIGS. 9A–9B, (36).

The data request must be associated with the retrieved document to deliver it to the proper requesting party. This is made possible by creating a parallel path into the inputs of the Scan Control Comparitors FIGS. 9A–9B (36-a) and the Data Request file of FIG. 11 (40). That file is composed of paired registers. The first register already contains the client's original data request that was inserted at the same time the request went into the Document Retrieval Control, FIGS. 8A–8B (34). The second register contains the client's data request as modified by converting words into numerals as just explained. This puts the client request in the same format as the search made in the document warehouse to assure associating the retrieved document with the correct data request. When the document is retrieved from the Supermine™ warehouse FIGS. 10A–10B and 6A–6B it is returned to the Document Distribution Control, FIG. 1 (41) where it is matched with the Data Request Register FIG 11 (40-b) that carries the modified document request.

Figure 9A:
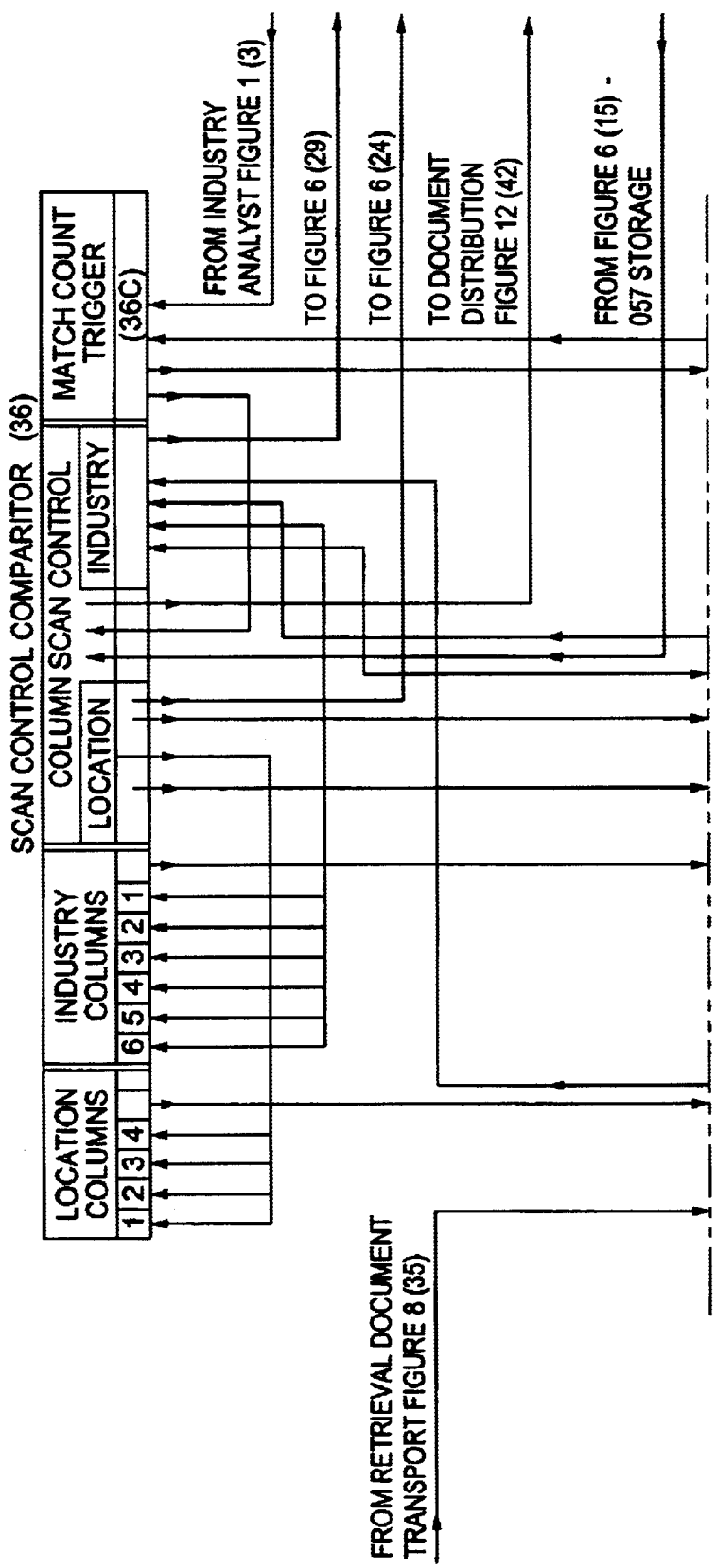
FIGS. 9A–9B show block diagram of an illustrative Supermine™ Scan Control/Comparitor in accordance with an embodiment of the invention.
Figure 9B:
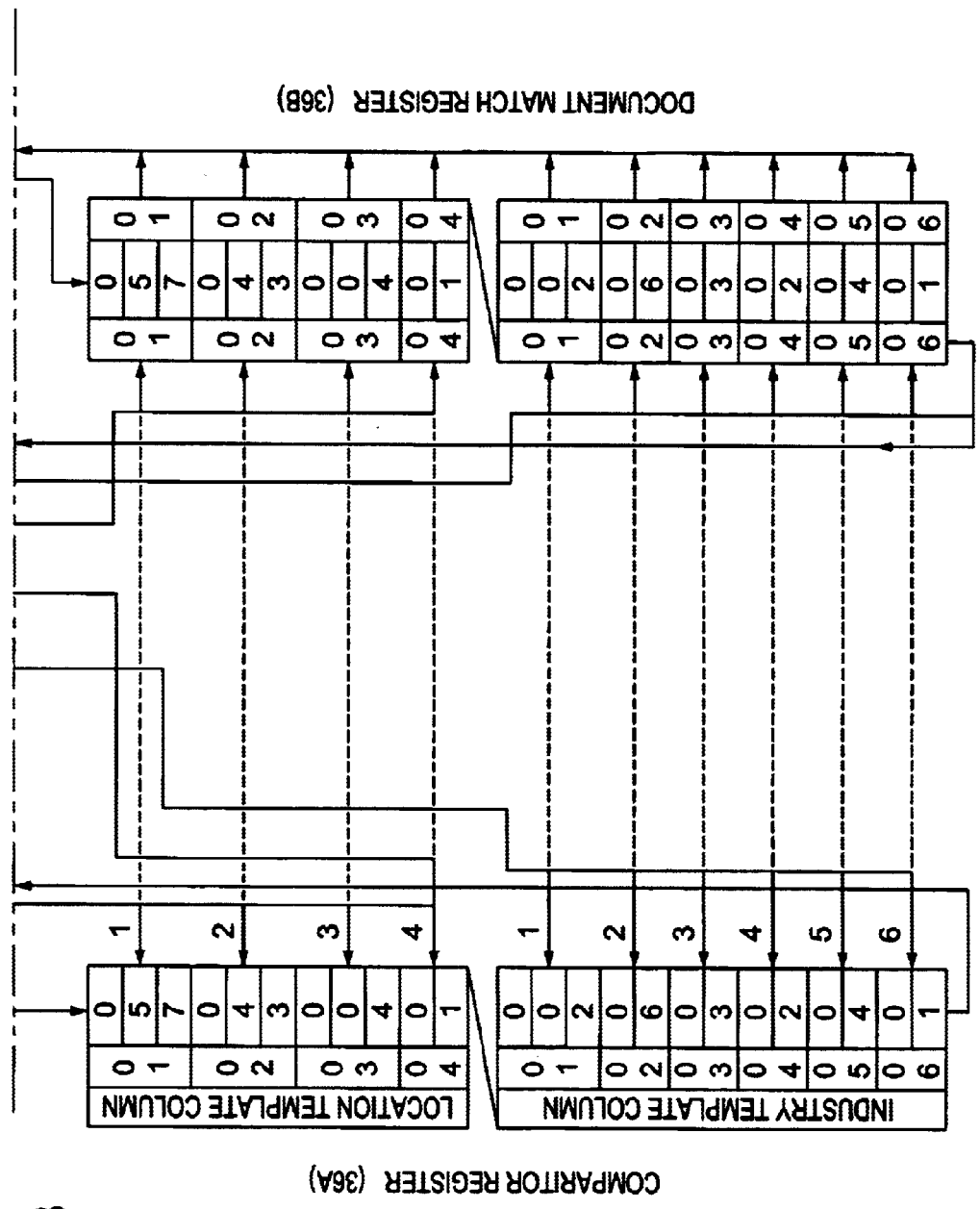
Figure 12A:
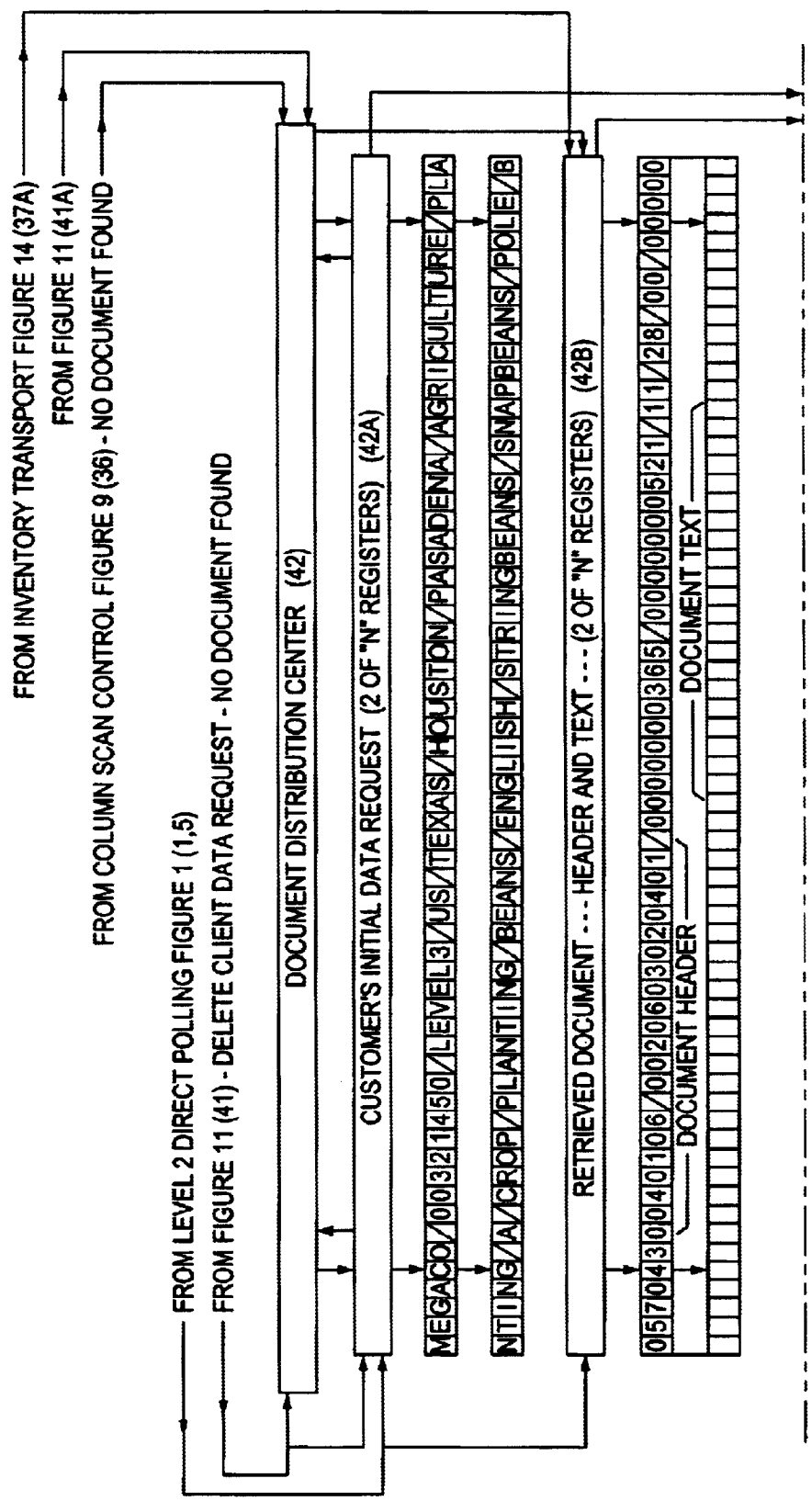
FIGS. 12A–12B show a block diagram showing an illustrative Document Distribution Center in accordance with an embodiment of the invention.
Figure 12B:
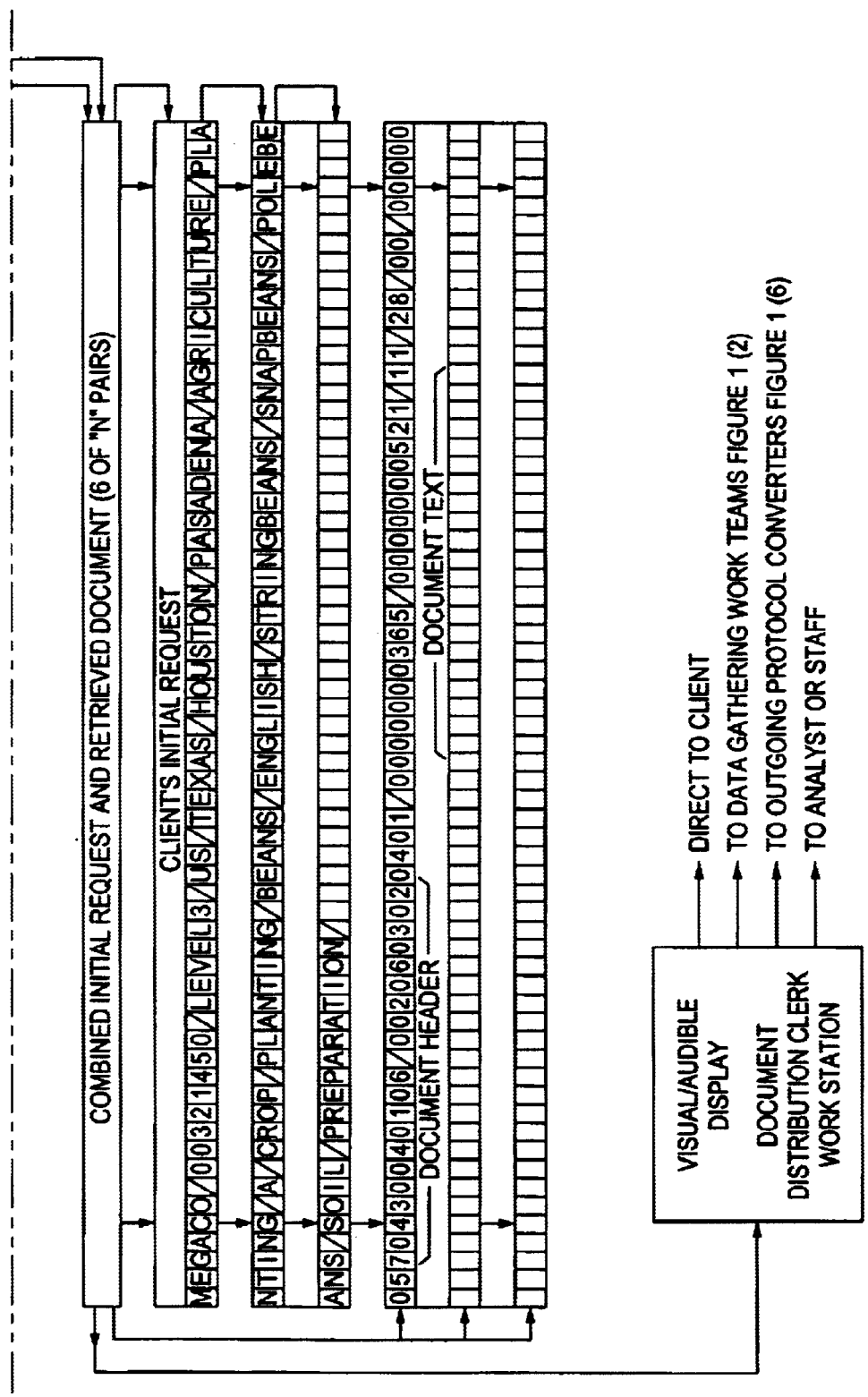

The Scan Control/Comparitors FIGS. 9A–9B, (36) are designed to speed document retrieval by reducing the scan and match time required to select a document from the Nation storage location FIG. 10 (15) and FIGS. 6A–6B and deliver it to the Supermine™ Document Distribution Center FIGS. 12A–12B (42). Referring to FIGS. 9A–9B (36), the Retrieval Document Transport FIGS. 8A–8B (35) copies the content of the Retrieval Template Register FIGS. 8A–8B (34-c) into the input of Comparitor Register FIGS. 9A–9B (36-a). This unit is a component of the Scan Control/Comparitor FIGS. 9A–9B (36). The numerals shown in that register are those derived from the information provided by answers provided by the staff, client or analyst when the data search questionnaire answers, FIG. 7A were inserted and converted into numerals.

As the Comparitor Register of FIGS. 9A–9B (36-a) begins to fill, the Scan Control segment of FIGS. 9A–9B (36) senses the insertion of digits corresponding to column 01 of the location templates (see FIG. 3). As the numerals 057 fill the location column 01 position, the active numerals in the three slots are detected by the location segment of the Column Scan Control in the Scan Control/Comparitor FIGS. 9A–9B (36) and are copied into the Assignment Number Register FIGS. 6A–6B, (24), then inserted into the Assignment Match Buffer FIG. 6, (33). This starts the process of selecting the proper Warehouse Nation Storage Location FIG. 6, (15). When the numerals 057 find a match in the three slots of the Nation Location Number Register/Connector FIG. 6, (32) the connection is completed (as previously described on FIGS. 6A–6B) from the 057 Storage Unit (for the US) to the Column Scan Control FIGS. 9A–9B (36). The location segment of the Scan Control/Comparitor FIGS. 9A–9B (36) copies the numerals 057 into the Document Match Register FIGS. 9A–9B (36-b). The process of elimination has begun. Only documents originating or relating to the US will now be considered because documents on other nation storage shelves have been eliminated. However, the document we seek is still only one of hundreds of thousands that could be in any one of the fifty States in the 057 storage structure.

Continuing to refer to FIGS. 9A–9B, as the numerals 043 for the State of Texas fill column 02 of the Scan Control Comparitor Register FIGS. 9A–9B (36-a) the change in state of the 043 column slots is detected by the location segment of the Scan Control FIGS. 9A–9B (36) and the numerals 043 are copied into the Assignment Match Buffer FIG. 6, (33) that is connected to the 057 warehouse storage shelf. The scanner then "steps" over to the column 2 registers, begins scanning at the scan line for 057 and scans the registers on shelf (folder) 057 in the column 2 position looking for a matching number 043. When a match is detected, the location scan control segment of Scan Control/Comparitor FIGS. 9A–9B (36) copies the numerals 043 into the Document Match Register FIGS. 9A–9B (36-b) at scan line 02. We have now eliminated all documents in states other than Texas. However the document we seek is still one of tens of thousands.

The Supermine™ system uses mathematical probabilities to speed document retrieval. Supermine™ is a high volume, high-speed process making it necessary to hold document retrieval time as low as possible. This need is met by the invention of the "Match Count Copy Trigger" that enables Supermine™ to use mathematical probabilities to speed document retrieval and to control the scope of the document search. This innovation is shown schematically on FIGS. 9A–9B, (36-c). It is made practical because of two important design characteristics of Supermine™:

1. The conversion of all words and letters into numerals and placing them into specific slots in all registers.
2. Designing the headers and registers to correspond to the scan columns and scan lines of the Location and Industry templates. In this way, specific locations and specific aspects of industries are always in their own unique slot positions in all registers and headers.

For an example of this feature refer briefly to FIG. 4. Notice that (left to right) there are thirteen numbers in the first thirteen register slots plus one spacing slot. These fourteen numbers represent the specific location of Pasadena, Tex. as previously explained. The next thirteen slots plus one spacing slot represent the requirements for getting a good string bean crop in Pasadena, Tex. The next ten register slots plus one spacing slot represent the Supermine™ document number with the next ten slots representing the industry template number used to identify and begin storing the document. Any of these segments can be used to retrieve a document.

Referring again to FIGS. 9A–9B, notice that the Retrieval Template Transport FIGS. 8A–8B, (34-c) has "copied" the header numbers into the registers of FIGS. 9A–9B, (36-a) in the exact order that they appear in the search template header and on the document being sought. This is the template that tells Supermine™ where to look for the needed document. The Scan Control Comparitor FIGS. 9A–9B, (36) will use the numbers stored in FIGS. 9A–9B, (36-a) to search through the Supermine™ warehouse looking for a set of numbers that match those of the search template stored in FIGS. 9A–9B, (36-a). When a matching number is found, it is copied into its proper slot in the Document Match Register FIGS. 9A–9B, (36-b). Note that, for drawing clarity, only the location and industry segments of the header are shown in FIGS. 9A–9B, (36-a) and (36-b). In actual operation there will also be a segment for the Supermine™ document number and the Industry template number, and if desired, a segment for the date received. These three added segments to FIGS. 9A–9B, (36-a) and (36-b) will permit retrieving documents using only the Supermine™ document number or the industry template number. The "Match Count Copy Trigger" (FIGS. 9A–9B, (36-c) will have sensors connected to each scan column of each of these segments.

Referring to FIGS. 9A–9B, (36-c), the "Match Count Copy Trigger" has sensors connected to all twenty-four numeral slots in the Document Match Register FIGS. 9A–9B, (36-b). As the scan progresses, every matching number found on the stored document is copied into Document Match Register, FIGS. 9A–9B, (36-b). As each register slot is filled, the probability that the document being scanned is the desired document increases exponentially with every number added. A mathematician would look at the twenty four numbers in the Comparitor Register, FIGS. 9A–9B, (36-a), each to the base 10, and compare them with those same numbers in the Document Match Register, FIGS. 9A–9B, (36-b). At each point in the scan and match process the probability of the two documents having the same header can be calculated.

Refer to FIGS. 9A–9B, (36-c) and notice the control lead coming from the control analyst into the match count trigger FIGS. 9A–9B, (36-c). This control allows the analyst to set the "Match Count Copy Trigger" point at the desired percentage of the probability that the two documents are the same. Reaching that probability percentage setting will "trigger" the Match Count Trigger, FIGS. 9A–9B, (36-c) to command the Column Scan Control to stop the comparison scan and copy all 24 numbers of the stored document header into the Document Match Register FIGS. 9A–9B, (36-b). This configuration allows the analyst to adjust the control program in the "Match Count Copy Trigger" to cause it to trigger when one, two or three segments have matching numbers, or on the overall probability of all segments that the two documents are the same. This not only reduces scan and match time of the retrieval process by an estimated thirty percent, but enables the analyst to control the scope of the search and the amount of detail collected with no degradation of document selection accuracy.

The above process continues with the numerals 004 for the city of Houston, Tex. being inserted and a scan made of the column 3 positions of the registers. A match is found, and the numerals 004 inserted into the Document Match Register FIGS. 9A–9B (36-b). The same operation is completed for the community of Pasadena, Tex.=01. It should be understood that this technique can be used to identify a specific office on a specific floor of the Pasadena, Tex. State Bank or a specific house on a specific street in Pasadena, Tex. by simply adding digit slots to the location registers.

At this point we have increased the probability of locating the specific document we need by eliminating all locations other than Pasadena, Tex. If Pasadena, Tex. were a large farming location, our document could still be one of hundreds or even thousands. As stated earlier, not all clients will provide a perfect reply to the Data Search Questionnaires FIG. 7. There will be searches made that will have only a few slots filled in the registers. For that reason there will be times when all available information contained in the document must be used. To speed document selection by reducing scan time and to further increase the probability that the document in the 057 warehouse storage unit being scanned is the one we seek, the order of filling the industry slots in the Comparitor Register FIGS. 9A–9B (36-a) is reversed. The industry specific slots 06, 05, 04, etc. are filled first. This causes the Scan Control/Comparitor FIGS. 9A–9B (36) to scan these slots first, i.e. in reverse order. Instead of scanning through the broad industry categories and working down to the industry specifics, the Scan Control Comparitor FIGS. 9A–9B (36) now "looks" first at the specifics of the document. This greatly reduces scan time and increases the probability of selecting the desired document much earlier.

When all corresponding slots match, both filled and empty, the Column Scan Control segment of the Scan Control/Comparitor originates a "select all" command and enters the register selected in the 057 storage location and copies the entire document, both header and text, into the holding registers of Retrieval Document Transport of FIGS. 8A–8B (35). If no additional text data is received after a five millisecond delay, the Retrieval Document Transport FIGS. 8A–8B (35) originates a "select all" command and copies the header and text into the Retrieved Document Registers, FIG. 11, (41-a) of the Document Distribution Control Unit, FIG. 11 (41).

Referring to FIG. 11, the Retrieved Document Registers FIG. 11, (41-a) are in a series, parallel configuration that enables the header and text to be selected and copied together or in separate segments. This permits selecting the first 64 bits that comprise the header of the document and comparing those bits with the modified clients request that is stored in the Data Request File FIG. 11, (40) in the client's modified request register. After a five-millisecond delay to assure that the entire document was received, the Retrieved Document Registers, FIG. 11, (41-a) sends a "document received" signal to the Document Distribution Control Unit, FIG. 11, (41). This unit is programmed to return a command to the Retrieval Document Transport FIGS. 8A–8B, (35), to delete the copy of the document in the Retrieval Document Transport FIGS. 8A–8B, (35). This was the document that was transported (copied) to the Document Distribution Control FIG. 11, (41). It then activates a program that will copy the 64-bits of the Retrieved Document register FIG. 11, (41-a) (the document header) into the Retrieved Document Header Register segment of the Document Request/ Retrieved Comparitor FIG. 11, (41-b). This begins the process of comparing the retrieved document header with the client's request that was modified to conform to the Supermine™ document storage numbering system.

When the document is received a signal is returned to the Document Distribution Control Unit FIG. 11, (41). This signal activates a program that enters the Data Request File, FIG. 11 (40) that contains the modified client data requests, selects the oldest data request on file, and copies it into the Data Request Register segment of the Data Request/ Received Document Comparitor FIG. 11, (41-b). The Comparitor is activated by a "document received" signal from the Retrieved Document Header segment of the Comparitor (41-b). It is programmed to electronically compare the header of the retrieved document with the modified data request register in the Data Request segment of the comparitor.

If no match is found, a signal is sent from the Comparitor FIG. 11 (41-b) to the Document Distribution Control, FIG. 11, (41). The Document Distribution Control FIG. 11 to 1A–3, "marks" the first Data Request selected (makes it unavailable to the scanner) and enters the Data Request register segment of the Comparitor FIG. 11 (41-b) and deletes the data stored there. The Data Request Register uses the empty Data Request register as a signal to enter the Data Request File, FIG. 11, (40) and copy the next oldest Data Request into the Data Request Register of the comparitor FIG. 11, (41-b). When the "data received" signal is returned to the Document Distribution Control, FIG. 11, (41) the next comparison of the Data Request numerals with those of the Retrieved Document header begins. This comparison, deletion, insertion, comparison loop continues until a match is found.

When the match between the header of the retrieved document and the modified client data request is found, a "match found" signal is sent to the Document Distribution Control FIG. 11, (41) which uses that signal to activate the control program to enter the Data Request File, FIGS. 11 (40) and select and copy the active data request register FIG. 11, (40-a) into the Document Distribution Center FIGS. 12A–12B, (42). This is the client's original unmodified FIG. 7A data request. The Document Distribution Center FIGS. 12A–12B, (42) has registers connected in a series, parallel configuration that enables the content of two registers to be combined or transmitted singly. The Document Distribution Center FIGS. 12A–12B, (42) returns a "document received" signal to the Document Distribution Control FIG. 11, (41) which uses that signal to activate the control program to enter the Retrieved Document File, FIG. 11, (41-a) and select and copy the contents of that register into the Document Distribution Center FIGS. 12A–12B, (42). The Document Distribution Center FIGS. 12A–12B (42) returns a "document received" signal to the Document Distribution Control FIG. 11, (41) which uses that signal to delete the content of the Data Request File registers FIG. 11, (40-a and -b) and makes them available for the next client data request.

The Document Distribution Center FIGS. 12A–12B, (42) contains a control program that combines the copy of the original client's data request with the retrieved document. It also records the number of the Combined Data Request/ Retrieved Document register that stored the document and data request in the Document Distribution Center registers FIGS. 12A–12B (42-a and 42-b). The program then sends the client data request, in its original form, and the number of the registers that contain entire retrieved document into a visual display. This is to enable the Document Distribution Clerk to enter the correct Combined Data Request/Retrieved Document Register FIGS. 12A–12B, (42) and download the content of those registers to the client. In addition, provision is made in the program to activate an audible/visual signal to alert Supermine™ staff personnel to down load the client's data request and the retrieved document to the client.

The Supermine™ Inventory in the Document Retrieval Process

As explained earlier, every document stored in the Supermine™ warehouse has the header for that document stored in the Supermine™ inventory unit FIGS. 1A–1C, (37). These headers are inserted into the inventory unit in the order of the Supermine™ document number that was assigned when the incoming document was received in the Data Receiver/Transmitters FIGS. 1A–1C, (9). This document number and the date it was received in Supermine™ remains with the document header as long as it is stored in Supermine™. This equips the inventory to be a source for Supermine™ clients and employees to determine whether the Supermine™ warehouse contains documents relating to a particular location or a specific subject matter. The Supermine™ document number (if known) is used to identify and retrieve the headers for the desired documents. Inserting the headers into the document retrieval process as previously described is the means of efficiently retrieving the complete document.

Referring to FIG. 14, the Supermine™ inventory unit contains an Inventory Search, Copy and Transport program FIG. 14, (37-a) that accept incoming document headers from the Document Transport Control FIGS. 6A–6B, (24). It assigns them to an inventory position by reading the header beginning with the twenty-ninth through the fortieth register positions, the Supermine™ number slots. It then assigns the document header in an Inventory Document Header Register FIG. 14, (37-b) in the order received. There are several ways the header can be retrieved from the Supermine™ Inventory unit by members of the staff, the industry analyst or a level three client. First, the header can be retrieved if the staff, analyst or client knows one or more of the following sets of numbers concerning the document header needed:

1. The Supermine™ document number.
2. The Supermine™ Template numbers.
3. The location that pertains to the subject matter needed (see FIG. 2).
4. The date the document was received. However, if this is the only identification number known and is the only number used, the requesting party will get the header for every document received on that date.
5. The subject matter that was used in the document.

If none of the above numbers are known, there is a way to obtain sufficient numbers to retrieve the header. As previously explained there is a Location Template and an Industry Template made for every document that is stored in Supermine™. Using our example of a person needing to know how to plant string beans in Pasadena, Tex. the numbers needed to obtain the header can be constructed easily. Referring to FIG. 2, if the location only is known, the thirteen digits that make up the location warehouse assignments can be determined by following the construction of the location template columns. That is all that is needed to recover the document header from the Supermine™ Inventory. However if that is all that is used, the requesting party will get every document that is stored concerning Pasadena, Tex.

Referring to FIG. 3, using the column numbers of the template is a means of easily deriving the numbers for a specific industry application. When these numbers, along with the location numbers are known, the document header can be obtained from the Supermine™ Inventory in the following manner. The requesting party addresses the Supermine™ Inventory Unit FIG. 14, (37) and types in a "search" command followed by the numbers relative to the document header needed.

A brief review of FIG. 4 would be helpful at this point. Notice that the last five digits of the register are not used. These can be used for the last five digits of the requesting party's personal Supermine™ number or the level three client's account number. At this time the requesting party puts the last five digits of his/her personal Supermine™ identification number in the register. A level three client will use the last five digits of the account number. If more digits are needed, those normally used for the date the document was received could be used in this instance because that date is not important if there are enough numbers to identify the header needed. However a modification of the Inventory Search Program, FIG. 14, (37-a) will be required to open the Inventory Search Register FIG. 14 (37-a) slots in the proper identification number sequence.

The Inventory Search Program FIG. 14, (37) inserts these numbers into the Inventory Search Register FIG. 14, (37-a). After a five-millisecond delay to assure that no more numbers follow, the Inventory Search Register sends a "numbers received" signal to the Inventory Search Program FIG. 14, (37-a). This starts a scanner that is programmed to "look" into the Inventory Search Register beginning with the twenty-ninth register slot continuing through the fortieth register slot looking for the Supermine™ document header number. If that number is present, the Search Program sends a command to the scanner to find a matching number. The scanner searches down the list of Supermine™ document header numbers until the match is found. See FIG. 14, (37-b) Document Number 0000000385. It then sends a "match" found signal to the Inventory Transport Program FIG. 14, (37-a) to copy the content of the entire header where the matching Supermine™ document number was found into the Inventory Transport Buffer FIG. 14, (37-d). When the document header is received, after a five-millisecond delay a "header received" signal is sent to the Inventory Search Transport Program, FIG. 14, (37-a). This activates the Transport program to copy the content of the Inventory Search Register FIG. 14, (37-a) into the Inventory Comparitor Buffer FIG. 14, (37-c). There all numbers are scanned to verify a match between the individual register slots in both registers. In this case, only the slots for the Supermine™ document header number will be filled. If these match, a "header match" signal is sent from the Inventory Comparitor FIG. 14, (37-c) to the Inventory Transport Program FIG. 14, (37-a). This activates this unit to enter the Inventory Search register FIG. 14, (37-a) and copy the content of the last five inventory search register slots into the last five register slots in the Inventory Transport Buffer. This is the means of getting the header to the requesting party. When the Inventory Transport Buffer FIG. 14, (37-d) signals that the last five slots in its register are filled, the Inventory Transport Program, FIG. 14, (37-a) begins the comparitor scan between the content of the inventory Comparitor Buffer FIG. 14, (37-c) and the Inventory Transport Buffer FIG. 14, (37-d). If there is a match in the numbers, a signal is sent to the Inventory Transport Program FIG. 14, (37-a) to copy the content of the Inventory Transport Buffer FIG. 14, (37-d) into the Retrieved Document header and text section of the Document Distribution Center FIGS. 12A–12B, (42-b).

In the event the requesting party does not know the Supermine™ document header number and uses identification from the templates as previously described, the operation sequence is the same with the exception that all slots in both the Inventory Comparitor Buffer FIG. 14, (37-c) and the Inventory Transport Buffer FIG. 14, (37-d) are scanned and compared to verify a match between the request and the offered document header. If there is substantial match, a "header match" signal is sent from the Inventory Comparitor FIG. 14, (37-c) to the Inventory Transport Program FIG. 14, (37-a) to copy the content of the Inventory Transport Buffer FIG. 14, (37-d) into the Document Distribution Center FIGS. 12A–12B, (42-b) where the clerk uses the requesting party's Supermine™ identification number or the client's account number to down load the retrieved header to the requesting party.

An Alternative Embodiment Based on Latitude/Longitude

To demonstrate the scope and flexibility of the Supermine™ System the practicability of utilizing Latitude and Longitude as the basis of a data acquisition, storage and distribution is described. The basic operation of Supermine™ would remain unchanged. There would be no changes required in the Block Diagrams FIGS. 1A–1C and 1A–1 to 1A–3 that describe the flow of data as it is processed into and from Supermine™. Referring to FIG. 2, the transition from the use of Nations, States, Cities and Communities as Location identification points to the use of Longitude and Latitude would require that the Nation, State, Cities and Communities shown on location template FIG. 2 be replaced with Longitude and Latitude in the various columns. The column configuration and scan lines would remain basically the same.

Since Supermine™ is a numerical system, there would be minor changes in the listing of Longitude and Latitude in that all references to North, South, East or West would entail assigning an arbitrary number to those directional letters. For example North could=1, South could=2, East could=3 and West could=4. The same change could be made for any lettered descriptions such as degrees and minutes. The Supermine™ analyst could make these transitions as the latitude and longitude location templates are prepared.

To reduce the size of the location templates and the corresponding digit registers, it would be more practical to construct two location templates, one for the Northern Hemisphere and one for the Southern Hemisphere with the equator being the natural dividing line between them. As stated in the basic disclosure, the design of the Data Receiver/Key Word Comparitors FIGS. 13A–13C, the Location and Industry Key Word Template Storage Unit, FIGS. 5A–5B, and other Supermine™ components make it possible to associate any location point with any industry. This means that any longitude and latitude point could be associated with any weather, soil, tide data, or topographical data that can be described on an industry template. More importantly, data for any point on the Globe could be polled in Supermine™ to obtain a wide variety of information using the same data retrieval process previously described in the disclosure.

Referring to FIG. 4, notice the position of the location register slots. The first thirteen slots plus one spacing slot would contain the longitude and latitude digits from a Global Positioning System that describes a precise point on the Globe down to a few feet. The next thirteen register slots plus one spacing slot used for the industry data would depict any information relative to that particular point on the earth. There would be no changes required in the basic design of the Supermine™ register assignments. Referring to FIGS. 5A–5B, converting Supermine™ location identification to a longitude and latitude system would require some modification of the Location and Industry Key Word Template Storage Unit FIGS. 5A–5B. The sheer size of the system would argue for greatly increasing the size of the language section FIGS. 5A–5B (30) and making provision to differentiate between inhabited land areas islands and oceans.

Changing the terminology in the Location Template section of FIGS. 5A–5B would accomplish this objective. Obviously the change to a latitude and longitude location identification system would greatly increase the size of FIGS. 5A–5B. This is the reason for suggesting a two-hemisphere location template.

Careful construction of a modified FIGS. 5A–5B would enable clients to enter a request into Supermine™ with only GPS longitude and latitude numbers and obtain data relative to that particular point on the earth. These data would be limited only to the amount of detail included on the equivalent of the industry templates FIG. 3. Referring to FIGS. 10A–10B, thoughtful consideration of this hypothetical storage unit will clearly demonstrate the feasibility of using longitude and latitude for the Supermine™ location assignments. The example shown uses the United States data storage unit to show the configuration of the industry data relative to the location storage shelves for every state. The position of the Location Template Columns FIGS. 10A–10B (15) could readily be converted into longitude and latitude by simply adding the necessary number of shelves to accommodate the listing of the latitude and longitude numbers. The size of the registers would dictate a two-hemisphere storage unit, FIGS. 10A–10B. The present assignment of the industry data would remain the same. However the Supermine™ analyst who prepares the industry templates would be required to use a much broader scope of knowledge to get oceanographic and topological data for uninhabited and oceanic locations.

It should be understood that the above changes to the Supermine™ system are only adaptations and modifications to the basic system that remains the same. This adaptation is included in the disclosure to demonstrate that the Supermine™ system has the potential to make major changes in the way industry acquires, process and distributes data throughout the world. Although the invention has been described in terms of specific embodiments set forth in detail, it should be understood that the embodiments disclosed are for illustrative purposes and the invention is not limited to the aforementioned embodiments. Alternative embodiments will be apparent to those skilled in the art in view of the disclosure. Accordingly, modifications are contemplated which can be made without departing from the spirit of the described invention.

What is claimed is:

1. A method of storing data objects in a data warehouse, comprising:
   receiving a data object;
   identifying a geographic location to which the data object is related;
   associating a numeric representation with the geographic location;
   identifying an industry to which the data object is related;
   associating a numeric representation with the industry; and
   indexing the data object in the data warehouse based on a header number, the header number including the numeric representations of the geographic location and the industry.

2. The method of claim 1, wherein identifying a geographic location comprises:
   providing a location template having a plurality of columns, the columns corresponding to nations, states, and cities.

3. The method of claim 2, further comprising:
   searching the data object for a term stored in a column of the location template, the term representing a specific nation, state, or city.

4. The method of claim 1, wherein identifying an industry comprises:
   providing an industry template having a plurality of columns, the columns corresponding to industry names and industry functions.

5. The method of claim 4, further comprising:
   searching the data object for a term stored in a column of the industry template, the term representing a specific industry name or industry function.

6. The method of claim 1, wherein the numeric representations of the geographic location and the industry are stored in specific slots in a register designated for the header number.

7. The method of claim 1, further comprising:
   providing location templates associated with different languages; and
   providing industry templates associated with different languages.

8. The method of claim 1, wherein the header number further includes a unique document number.

9. The method of claim 1, wherein the header number further includes a numeric representation of a date on which the data object was received.

10. The method of claim 1, further comprising:
    storing the data object in a location of the data warehouse that is associated with the header number.

11. A method of retrieving a data object stored in a data warehouse, comprising:
    receiving a request for the data object that is stored in the data warehouse;
    parsing the request to identify a geographic location to which the data object is related;
    associating a numeric representation with the geographic location;
    parsing the request to identify an industry to which the data object is related;
    associating a numeric representation with the industry;
    generating a header number that includes the numeric representations of the geographic location and the industry;
    searching a header number index of the data warehouse for the header number;
    identifying the data object based on the header number; and
    retrieving the data object from the data warehouse.

12. The method of claim 11, wherein parsing the request to identify a geographic location comprises:
    providing a location template having a plurality of columns, the columns corresponding to nations, states and cities; and
    searching the request for a term stored in a column of the location template, the term representing a specific nation, state or city.

13. The method of claim 11, further comprising:
    providing location templates associated with different languages; and
    searching the request by utilizing a location template associated with a specific language identified in the request.

14. The method of claim 11, wherein parsing the request to identify an industry comprises:
    providing an industry template having a plurality of columns, the columns corresponding to industry names and industry functions; and searching the request for a term stored in a column of the industry template, the term representing a specific industry name or industry function.

15. The method of claim 11, further comprising:

providing industry templates associated with different languages; and searching the request by utilizing an industry template associated with a specific language identified in the request.

16. The method of claim 11, wherein parsing the request to identify a geographic location or an industry to which the data object is related comprises:

searching the request for a first matching term in a first list of terms;

associating a first numeric representation with the first matching term; and searching the request for a second matching term in a second list of terms, wherein the searching for the second matching term is limited to a subset of terms, the subset of the second list of terms being associated with the first matching term.

17. The method of claim 16, wherein the first list of terms comprises a column corresponding to nations in a location template, and the second list of terms comprises a column corresponding to cities in a location template.

18. The method of claim 16, wherein the first list of terms comprises a column corresponding to industry names in an industry template, and the second list of terms comprises a column corresponding to industry functions in an industry template.

19. The method of claim 11, wherein the header number further includes a unique document number.

20. The method of claim 11, wherein the header number further includes a numeric representation of a date on which the data object was received.

21. The method of claim 11, wherein retrieving the data object further comprises:

retrieving the data object from a location of the data warehouse that is associated with the header number.

22. A computer system comprising:

a microprocessor;

a storage device coupled to the microprocessor, the storage device adapted to store software routines; and a software routine stored on the storage device to be executed by the microprocessor, wherein the software routine comprises instructions to perform a method of storing data objects in a data warehouse, said method comprising:

receiving a data object;

identifying a geographic location to which the data object is related;

associating a numeric representation with the geographic location;

identifying an industry to which the data object is related;

associating a numeric representation with the industry; and indexing the data object in the data warehouse based on a header number, the header number including the numeric representations of the geographic location and the industry.

23. A computer system comprising:

a microprocessor;

a storage device coupled to the microprocessor, the storage device adapted to store software routines; and a software routine stored on the storage device to be executed by the microprocessor, wherein the software routine comprises instructions to perform a method of retrieving a data object stored in a data warehouse, said method comprising:

receiving a request for the data object that is stored in the data warehouse;

parsing the request to identify a geographic location to which the data object is related;

associating a numeric representation with the geographic location;

parsing the request to identify an industry to which the data object is related;

associating a numeric representation with the industry;

generating a header number that includes the numeric representations of the geographic location and the industry;

searching a header number index of the data warehouse for the header number;

identifying the data object based on the header number; and retrieving the data object from the data warehouse.

24. A storage device readable by a machine, tangibly embodying a program of instructions executable by the machine to perform a method of storing data objects in a data warehouse, said method comprising:

receiving a data object;

identifying a geographic location to which the data object is related;

associating a numeric representation with the geographic location;

identifying an industry to which the data object is related;

associating a numeric representation with the industry; and indexing the data object in the data warehouse based on a header number, the header number including the numeric representations of the geographic location and the industry.

25. A storage device readable by a machine, tangibly embodying a program of instructions executable by the machine to perform a method of retrieving a data object stored in a data warehouse, said method comprising:

receiving a request for the data object that is stored in the data warehouse;

parsing the request to identify a geographic location to which the data object is related;

associating a numeric representation with the geographic location;

parsing the request to identify an industry to which the data object is related;

associating a numeric representation with the industry;

generating a header number that includes the numeric representations of the geographic location and the industry;

searching a header number index of the data warehouse for the header number;

identifying the data object based on the header number; and retrieving the data object from the data warehouse.

* * * * *